(12) United States Patent
Hollingsworth et al.

(10) Patent No.: US 12,118,178 B1
(45) Date of Patent: Oct. 15, 2024

(54) WAYFINDING SERVICES METHOD AND APPARATUS

(71) Applicant: Steelcase Inc., Grand Rapids, MI (US)

(72) Inventors: Evan Anthony Hollingsworth, Rockford, MI (US); Olivia Jenny Carroll, Grand Rapids, MI (US); Paul Noll, Grand Rapids, MI (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 17/224,788

(22) Filed: Apr. 7, 2021

Related U.S. Application Data

(60) Provisional application No. 63/006,987, filed on Apr. 8, 2020.

(51) Int. Cl.
*G06F 3/04815* (2022.01)

(52) U.S. Cl.
CPC ................ *G06F 3/04815* (2013.01)

(58) Field of Classification Search
None
See application file for complete search history.

(56) References Cited

U.S. PATENT DOCUMENTS

| | | | |
|---|---|---|---|
| 4,751,399 | A | 6/1988 | Koehring |
| 5,050,077 | A | 9/1991 | Vincent |
| 5,086,385 | A | 2/1992 | Launey |
| 5,097,672 | A | 3/1992 | Takenaka |

(Continued)

FOREIGN PATENT DOCUMENTS

| | | |
|---|---|---|
| AU | 2011203137 A1 | 7/2011 |
| AU | 2013203919 A1 | 5/2013 |

(Continued)

OTHER PUBLICATIONS

Citrix, GoToMeeting User Guide, Copyright 2015 Citrix Systems.

(Continued)

*Primary Examiner* — Beau D Spratt
*Assistant Examiner* — Amy P Hoang
(74) *Attorney, Agent, or Firm* — Quarles & Brady LLP

(57) ABSTRACT

A system and method for discovering space characteristics, the system comprising a data store storing a facility information dataset corresponding to a physical world facility, the facility information set including a 3D virtual world (VW) representation, a plurality of volume specifications, one volume specification for each of a plurality of different volumetric portions of the VW representation, an interface device including a display screen located within the facility associated with the VW representation, occupancy sensors, a processor linked to the interface device and the data store, the processor programmed to perform the steps of accessing the VW representation of the facility, presenting a first view of the VW representation via the display screen as a space discovery tool for a user to view, visually distinguishing volumetric portions of the VW representation corresponding to portions of the physical world facility that are currently unoccupied, receiving user input via the interface device to change the view of the VW representation on the display screen and changing the view of the VW representation on the display screen to a second view based on the received user input.

20 Claims, 33 Drawing Sheets

(56) References Cited

U.S. PATENT DOCUMENTS

| | | |
|---|---|---|
| 5,293,097 A | 3/1994 | Elwell |
| 5,406,176 A | 4/1995 | Sugden |
| 5,455,487 A | 10/1995 | Mix |
| 5,476,221 A | 12/1995 | Seymour |
| 5,489,827 A | 2/1996 | Xia |
| 5,717,856 A | 2/1998 | Carleton |
| 5,872,924 A | 2/1999 | Nakayama et al. |
| 5,898,579 A | 4/1999 | Boys |
| 5,915,091 A | 6/1999 | Ludwig |
| 5,933,597 A | 8/1999 | Hogan |
| 6,038,542 A | 3/2000 | Ruckdashel |
| 6,064,976 A | 5/2000 | Tolopka |
| 6,100,663 A | 8/2000 | Boys |
| 6,140,921 A | 10/2000 | Baron |
| 6,144,942 A | 11/2000 | Ruckdashel |
| 6,177,905 B1 | 1/2001 | Welch |
| 6,266,612 B1 | 7/2001 | Dussell |
| 6,266,691 B1 | 7/2001 | Watanabe |
| 6,288,716 B1 | 9/2001 | Humpleman |
| 6,297,621 B1 | 10/2001 | Hui |
| 6,304,068 B1 | 10/2001 | Hui |
| 6,342,906 B1 | 1/2002 | Kumar |
| 6,360,101 B1 | 3/2002 | Irvin |
| 6,361,173 B1 | 3/2002 | Vlahos |
| 6,424,623 B1 | 7/2002 | Borgstahl |
| 6,434,158 B1 | 8/2002 | Harris |
| 6,434,159 B1 | 8/2002 | Woodward |
| 6,466,234 B1 | 10/2002 | Pyle |
| 6,487,180 B1 | 11/2002 | Borgstahl |
| 6,501,364 B1 | 12/2002 | Hui |
| 6,532,218 B1 | 3/2003 | Shaffer |
| 6,546,419 B1 | 4/2003 | Humpleman |
| 6,548,967 B1 | 4/2003 | Dowling |
| 6,587,782 B1 | 7/2003 | Nocek |
| 6,691,029 B2 | 2/2004 | Hughes |
| 6,724,159 B2 | 4/2004 | Gutta |
| 6,760,412 B1 | 7/2004 | Loucks |
| 6,760,749 B1 | 7/2004 | Dunlap |
| 6,803,744 B1 | 10/2004 | Sabo |
| 6,839,417 B2 | 1/2005 | Weisman |
| 6,850,837 B2 | 2/2005 | Paulauskas |
| 6,888,438 B2 | 5/2005 | Hui |
| 6,906,495 B2 | 6/2005 | Cheng |
| 7,000,660 B2 | 2/2006 | Chen |
| 7,003,728 B2 | 2/2006 | Berque |
| 7,027,995 B2 | 4/2006 | Kaufman |
| 7,042,196 B2 | 5/2006 | Ka |
| 7,043,532 B1 | 5/2006 | Humpleman |
| 7,084,758 B1 | 8/2006 | Cole |
| 7,124,164 B1 | 10/2006 | Chemtob |
| 7,139,976 B2 | 11/2006 | Kausik |
| 7,149,776 B1 | 12/2006 | Roy |
| 7,163,263 B1 | 1/2007 | Kurrasch |
| 7,180,503 B2 | 2/2007 | Burr |
| 7,212,414 B2 | 5/2007 | Baarman |
| 7,221,937 B2 | 5/2007 | Lau |
| 7,239,110 B2 | 7/2007 | Cheng |
| 7,248,017 B2 | 7/2007 | Cheng |
| 7,266,383 B2 | 9/2007 | Anderson |
| 7,268,682 B2 | 9/2007 | Bialecki, Jr. |
| 7,293,243 B1 | 11/2007 | Ben-Shachar |
| 7,340,769 B2 | 3/2008 | Baugher |
| 7,370,269 B1 | 5/2008 | Prabhu |
| 7,393,053 B2 | 7/2008 | Kurrasch |
| 7,394,405 B2 | 7/2008 | Godden |
| 7,421,069 B2 | 9/2008 | Vernon |
| 7,474,058 B2 | 1/2009 | Baarman |
| 7,475,078 B2 | 1/2009 | Kiilerich |
| 7,495,414 B2 | 2/2009 | Hui |
| 7,499,462 B2 | 3/2009 | MacMullan |
| 7,518,267 B2 | 4/2009 | Baarman |
| 7,519,664 B2 | 4/2009 | Karaki |
| 7,522,878 B2 | 4/2009 | Baarman |
| 7,525,283 B2 | 4/2009 | Cheng |
| 7,526,525 B2 | 4/2009 | Hagale |
| 7,554,316 B2 | 6/2009 | Stevens |
| 7,554,437 B2 | 6/2009 | Axelsen |
| 7,576,514 B2 | 8/2009 | Hui |
| 7,577,522 B2 | 8/2009 | Rosenberg |
| 7,590,941 B2 | 9/2009 | Wee |
| 7,605,496 B2 | 10/2009 | Stevens |
| 7,612,528 B2 | 11/2009 | Baarman |
| 7,615,936 B2 | 11/2009 | Baarman |
| 7,619,366 B2 | 11/2009 | Diederiks |
| 7,622,891 B2 | 11/2009 | Cheng |
| 7,634,533 B2 | 12/2009 | Rudolph |
| 7,639,110 B2 | 12/2009 | Baarman |
| 7,639,514 B2 | 12/2009 | Baarman |
| 7,639,994 B2 | 12/2009 | Greene |
| 7,643,312 B2 | 1/2010 | Vanderelli |
| 7,649,454 B2 | 1/2010 | Singh |
| 7,664,870 B2 | 2/2010 | Baek |
| 7,689,655 B2 | 3/2010 | Hewitt |
| 7,693,935 B2 | 4/2010 | Weber |
| 7,707,249 B2 | 4/2010 | Spataro |
| 7,714,537 B2 | 5/2010 | Cheng |
| 7,715,831 B2 | 5/2010 | Wakefield |
| 7,734,690 B2 | 6/2010 | Moromisato |
| 7,735,918 B2 | 6/2010 | Beck |
| 7,741,734 B2 | 6/2010 | Joannopoulos |
| 7,810,025 B2 | 10/2010 | Blair |
| 7,825,543 B2 | 11/2010 | Karalis |
| 7,844,306 B2 | 11/2010 | Shearer |
| 7,847,675 B1 | 12/2010 | Thyen |
| 7,849,135 B2 | 12/2010 | Agrawal |
| 7,863,861 B2 | 1/2011 | Cheng |
| 7,868,482 B2 | 1/2011 | Greene |
| 7,868,587 B2 | 1/2011 | Stevens |
| 7,869,941 B2 | 1/2011 | Coughlin |
| 7,873,470 B2 | 1/2011 | Baba |
| 7,881,233 B2 | 2/2011 | Bieselin |
| 7,885,925 B1 | 2/2011 | Strong |
| 7,893,953 B2 | 2/2011 | Krestakos |
| 7,896,436 B2 | 3/2011 | Kurrasch |
| 7,898,105 B2 | 3/2011 | Greene |
| 7,904,209 B2 | 3/2011 | Podgorny |
| 7,915,858 B2 | 3/2011 | Liu |
| D636,333 S | 4/2011 | Kulikowski |
| 7,925,308 B2 | 4/2011 | Greene |
| 7,925,525 B2 | 4/2011 | Chin |
| 7,932,618 B2 | 4/2011 | Baarman |
| 7,941,133 B2 | 5/2011 | Aaron |
| 7,941,753 B2 | 5/2011 | Meisels |
| 7,948,448 B2 | 5/2011 | Hutchinson |
| 7,952,324 B2 | 5/2011 | Cheng |
| 7,953,369 B2 | 5/2011 | Baarman |
| 7,965,859 B2 | 6/2011 | Marks |
| 7,973,635 B2 | 7/2011 | Baarman |
| 7,973,657 B2 | 7/2011 | Ayed |
| 7,989,986 B2 | 8/2011 | Baarman |
| 7,999,669 B2 | 8/2011 | Singh |
| 8,004,235 B2 | 8/2011 | Baarman |
| 8,021,164 B2 | 9/2011 | Epstein |
| 8,022,576 B2 | 9/2011 | Joannopoulos |
| 8,024,661 B2 | 9/2011 | Bibliowicz |
| 8,026,908 B2 | 9/2011 | Ku |
| 8,028,020 B2 | 9/2011 | Huck |
| 8,032,705 B2 | 10/2011 | Klitsner |
| 8,035,255 B2 | 10/2011 | Kurs |
| 8,035,340 B2 | 10/2011 | Stevens |
| 8,039,995 B2 | 10/2011 | Stevens |
| 8,040,103 B2 | 10/2011 | Hui |
| 8,041,586 B2 | 10/2011 | Jethani |
| 8,049,301 B2 | 11/2011 | Hui |
| 8,054,854 B2 | 11/2011 | Poslinski |
| 8,055,310 B2 | 11/2011 | Beart |
| 8,055,644 B2 | 11/2011 | Crowley |
| 8,057,069 B2 | 11/2011 | Mangiardi |
| 8,061,864 B2 | 11/2011 | Metcalf |
| 8,069,100 B2 | 11/2011 | Taylor |
| 8,069,465 B1 | 11/2011 | Bartholomay |
| 8,073,614 B2 | 12/2011 | Coughlin |
| 8,076,800 B2 | 12/2011 | Joannopoulos |
| 8,076,801 B2 | 12/2011 | Karalis |

(56) References Cited

U.S. PATENT DOCUMENTS

| | | |
|---|---|---|
| 8,081,083 B2 | 12/2011 | Hinterlong |
| 8,084,889 B2 | 12/2011 | Joannopoulos |
| 8,091,029 B1 | 1/2012 | Gay |
| 8,093,758 B2 | 1/2012 | Hussmann |
| 8,097,983 B2 | 1/2012 | Karalis |
| 8,097,984 B2 | 1/2012 | Baarman |
| 8,102,235 B2 | 1/2012 | Hui |
| 8,106,539 B2 | 1/2012 | Schatz |
| 8,112,100 B2 | 2/2012 | Frank |
| 8,115,448 B2 | 2/2012 | John |
| 8,116,681 B2 | 2/2012 | Baarman |
| 8,116,683 B2 | 2/2012 | Baarman |
| 8,117,262 B2 | 2/2012 | Kumar |
| 8,120,311 B2 | 2/2012 | Baarman |
| 8,126,974 B2 | 2/2012 | Lyle |
| 8,127,155 B2 | 2/2012 | Baarman |
| 8,129,864 B2 | 3/2012 | Baarman |
| 8,138,875 B2 | 3/2012 | Baarman |
| 8,140,701 B2 | 3/2012 | Rajan |
| 8,141,143 B2 | 3/2012 | Lee |
| 8,149,104 B2 | 4/2012 | Crum |
| 8,150,449 B2 | 4/2012 | Onozawa |
| 8,159,090 B2 | 4/2012 | Greene |
| 8,164,222 B2 | 4/2012 | Baarman |
| 8,170,946 B2 | 5/2012 | Blair |
| 8,174,152 B2 | 5/2012 | Baumann |
| 8,180,663 B2 | 5/2012 | Tischhauser |
| 8,188,856 B2 | 5/2012 | Singh |
| 8,200,520 B2 | 6/2012 | Chen |
| 8,204,272 B2 | 6/2012 | Marks |
| 8,204,935 B2 | 6/2012 | Vernon |
| 8,209,618 B2 | 6/2012 | Garofalo |
| 8,214,061 B2 | 7/2012 | Westrick, Jr |
| 8,219,115 B1 | 7/2012 | Nelissen |
| 8,222,827 B2 | 7/2012 | Kuennen |
| 8,223,508 B2 | 7/2012 | Baarman |
| 8,228,025 B2 | 7/2012 | Ho |
| 8,228,026 B2 | 7/2012 | Johnson |
| 8,234,189 B2 | 7/2012 | Taylor |
| 8,238,125 B2 | 8/2012 | Fells |
| 8,239,890 B2 | 8/2012 | Kooman |
| 8,259,428 B2 | 9/2012 | Mollema |
| 8,262,244 B2 | 9/2012 | Metcalf |
| 8,266,535 B2 | 9/2012 | Brown |
| 8,269,456 B2 | 9/2012 | Hui |
| 8,270,320 B2 | 9/2012 | Boyer |
| 8,280,453 B2 | 10/2012 | Beart |
| 8,280,948 B1 | 10/2012 | Chen |
| 8,290,479 B2 | 10/2012 | Aaron |
| 8,296,669 B2 | 10/2012 | Madonna |
| 8,299,753 B2 | 10/2012 | Hui |
| 8,300,784 B2 | 10/2012 | Choi |
| 8,301,077 B2 | 10/2012 | Xue |
| 8,301,079 B2 | 10/2012 | Baarman |
| 8,301,080 B2 | 10/2012 | Baarman |
| 8,304,935 B2 | 11/2012 | Karalis |
| 8,315,561 B2 | 11/2012 | Baarman |
| 8,315,621 B2 | 11/2012 | Lau |
| 8,315,650 B2 | 11/2012 | Lau |
| 8,324,759 B2 | 12/2012 | Karalis |
| 8,327,410 B2 | 12/2012 | Andersen |
| 8,338,990 B2 | 12/2012 | Baarman |
| 8,339,274 B2 | 12/2012 | Van De Sluis |
| 8,341,532 B2 | 12/2012 | Ryan |
| 8,346,166 B2 | 1/2013 | Baarman |
| 8,346,167 B2 | 1/2013 | Baarman |
| 8,350,971 B2 | 1/2013 | Malone |
| 8,351,856 B2 | 1/2013 | Baarman |
| 8,352,296 B2 | 1/2013 | Taneja |
| 8,354,821 B2 | 1/2013 | Cheng |
| 8,362,651 B2 | 1/2013 | Hamam |
| 8,364,400 B2 | 1/2013 | Coughlin |
| 8,370,516 B2 | 2/2013 | Salesky |
| 8,373,310 B2 | 2/2013 | Baarman |
| 8,373,386 B2 | 2/2013 | Baarman |
| 8,375,103 B2 | 2/2013 | Lin |
| 8,380,255 B2 | 2/2013 | Shearer |
| 8,380,786 B2 | 2/2013 | Hoffert |
| 8,385,894 B2 | 2/2013 | Takehara |
| 8,390,669 B2 | 3/2013 | Catchpole |
| 8,395,282 B2 | 3/2013 | Joannopoulos |
| 8,395,283 B2 | 3/2013 | Joannopoulos |
| 8,400,017 B2 | 3/2013 | Kurs |
| 8,400,018 B2 | 3/2013 | Joannopoulos |
| 8,400,019 B2 | 3/2013 | Joannopoulos |
| 8,400,020 B2 | 3/2013 | Joannopoulos |
| 8,400,021 B2 | 3/2013 | Joannopoulos |
| 8,400,022 B2 | 3/2013 | Joannopoulos |
| 8,400,023 B2 | 3/2013 | Joannopoulos |
| 8,400,024 B2 | 3/2013 | Joannopoulos |
| 8,407,289 B2 | 3/2013 | Chen |
| 8,410,636 B2 | 4/2013 | Kurs |
| 8,415,897 B2 | 4/2013 | Choong |
| 8,421,407 B2 | 4/2013 | Johnson |
| 8,423,288 B2 | 4/2013 | Stahl |
| 8,432,062 B2 | 4/2013 | Greene |
| 8,438,333 B2 | 5/2013 | Edwards, III |
| 8,441,154 B2 | 5/2013 | Karalis |
| 8,441,354 B2 | 5/2013 | Padmanabhan |
| 8,443,035 B2 | 5/2013 | Chen |
| 8,446,046 B2 | 5/2013 | Fells |
| 8,446,450 B2 | 5/2013 | Mauchly |
| 8,450,877 B2 | 5/2013 | Baarman |
| 8,456,509 B2 | 6/2013 | Khot |
| 8,457,888 B2 | 6/2013 | Ranford |
| 8,461,719 B2 | 6/2013 | Kesler |
| 8,461,720 B2 | 6/2013 | Kurs |
| 8,461,721 B2 | 6/2013 | Karalis |
| 8,461,722 B2 | 6/2013 | Kurs |
| 8,461,817 B2 | 6/2013 | Martin |
| 8,466,583 B2 | 6/2013 | Karalis |
| 8,471,410 B2 | 6/2013 | Karalis |
| 8,473,571 B2 | 6/2013 | Penner |
| 8,476,788 B2 | 7/2013 | Karalis |
| 8,482,158 B2 | 7/2013 | Kurs |
| 8,482,160 B2 | 7/2013 | Johnson |
| 8,484,494 B2 | 7/2013 | Siegel |
| 8,487,480 B1 | 7/2013 | Kesler |
| 8,489,329 B2 | 7/2013 | Coughlin |
| 8,494,143 B2 | 7/2013 | DeJana |
| 8,497,601 B2 | 7/2013 | Hall |
| 8,499,119 B2 | 7/2013 | Balraj |
| 8,504,663 B2 | 8/2013 | Lowery |
| 8,508,077 B2 | 8/2013 | Stevens |
| 8,510,255 B2 | 8/2013 | Fadell |
| 8,519,668 B2 | 8/2013 | Hui |
| 8,527,549 B2 | 9/2013 | Cidon |
| 8,527,610 B2 | 9/2013 | Koike |
| 8,528,014 B2 | 9/2013 | Reynolds |
| 8,531,153 B2 | 9/2013 | Baarman |
| 8,531,294 B2 | 9/2013 | Slavin |
| 8,533,268 B1 | 9/2013 | Vernon |
| 8,538,330 B2 | 9/2013 | Baarman |
| D692,010 S | 10/2013 | Verghese |
| 8,552,592 B2 | 10/2013 | Schatz |
| 8,554,476 B2 | 10/2013 | Coughlin |
| 8,554,477 B2 | 10/2013 | Coughlin |
| 8,558,411 B2 | 10/2013 | Baarman |
| 8,558,693 B2 | 10/2013 | Martin |
| 8,560,024 B2 | 10/2013 | Beart |
| 8,560,128 B2 | 10/2013 | Ruff |
| 8,560,232 B2 | 10/2013 | Coughlin |
| 8,567,048 B2 | 10/2013 | Singh |
| 8,569,914 B2 | 10/2013 | Karalis |
| 8,587,153 B2 | 11/2013 | Schatz |
| 8,587,154 B2 | 11/2013 | Fells |
| 8,587,155 B2 | 11/2013 | Giler |
| 8,593,105 B2 | 11/2013 | Baarman |
| 8,594,291 B2 | 11/2013 | Bieselin |
| 8,596,716 B1 | 12/2013 | Caruso |
| 8,598,721 B2 | 12/2013 | Baarman |
| 8,598,743 B2 | 12/2013 | Hall |
| 8,600,670 B2 | 12/2013 | Kim |
| 8,604,714 B2 | 12/2013 | Mohan |

(56) References Cited

U.S. PATENT DOCUMENTS

| | | |
|---|---|---|
| 8,610,400 B2 | 12/2013 | Stevens |
| 8,610,530 B2 | 12/2013 | Singh |
| 8,618,696 B2 | 12/2013 | Kurs |
| 8,618,749 B2 | 12/2013 | Kuennen |
| 8,618,770 B2 | 12/2013 | Baarman |
| 8,620,484 B2 | 12/2013 | Baarman |
| 8,620,841 B1 | 12/2013 | Filson |
| 8,621,245 B2 | 12/2013 | Shearer |
| D697,477 S | 1/2014 | Jonas, III |
| 8,622,314 B2 | 1/2014 | Fisher |
| 8,629,578 B2 | 1/2014 | Kurs |
| 8,629,755 B2 | 1/2014 | Hashim-Waris |
| 8,630,741 B1 | 1/2014 | Matsuoka |
| 8,631,126 B2 | 1/2014 | Veiseh |
| 8,638,062 B2 | 1/2014 | Baarman |
| 8,643,326 B2 | 2/2014 | Campanella |
| 8,650,600 B2 | 2/2014 | Ogle |
| 8,653,927 B2 | 2/2014 | Singh |
| 8,659,417 B1 | 2/2014 | Trundle |
| 8,660,790 B2 | 2/2014 | Stahl |
| 8,665,310 B2 | 3/2014 | Verthein |
| 8,666,051 B2 | 3/2014 | Gilzean |
| 8,667,401 B1 | 3/2014 | Lozben |
| 8,667,452 B2 | 3/2014 | Verghese |
| 8,669,676 B2 | 3/2014 | Karalis |
| 8,669,844 B2 | 3/2014 | Walker |
| 8,670,018 B2 | 3/2014 | Cunnington |
| 8,680,960 B2 | 3/2014 | Singh |
| 8,683,345 B2 | 3/2014 | Lee |
| 8,686,598 B2 | 4/2014 | Schatz |
| 8,686,647 B2 | 4/2014 | Ono |
| 8,687,452 B2 | 4/2014 | Kishibe |
| 8,688,100 B2 | 4/2014 | Aaron |
| 8,690,362 B2 | 4/2014 | Wendt |
| 8,692,410 B2 | 4/2014 | Schatz |
| 8,692,412 B2 | 4/2014 | Fiorello |
| 8,692,639 B2 | 4/2014 | Baarman |
| 8,692,641 B2 | 4/2014 | Singh |
| 8,692,642 B2 | 4/2014 | Singh |
| 8,694,026 B2 | 4/2014 | Forstall |
| 8,694,165 B2 | 4/2014 | Smith |
| 8,694,597 B1 | 4/2014 | Raj |
| 8,698,590 B2 | 4/2014 | Singh |
| 8,698,591 B2 | 4/2014 | Singh |
| 8,700,060 B2 | 4/2014 | Huang |
| 8,707,546 B2 | 4/2014 | Singh |
| 8,710,948 B2 | 4/2014 | Singh |
| 8,712,858 B2 | 4/2014 | Blair |
| 8,713,112 B2 | 4/2014 | Hewitt |
| D705,745 S | 5/2014 | Kurs et al. |
| 8,716,903 B2 | 5/2014 | Kurs |
| 8,717,400 B2 | 5/2014 | Ranganath |
| 8,719,070 B2 | 5/2014 | Jabbour |
| 8,723,366 B2 | 5/2014 | Fiorello |
| 8,729,737 B2 | 5/2014 | Schatz |
| 8,731,116 B2 | 5/2014 | Norconk |
| 8,737,950 B2 | 5/2014 | Jonsson |
| 8,742,625 B2 | 6/2014 | Baarman |
| 8,743,171 B2 | 6/2014 | Hiller |
| 8,743,198 B2 | 6/2014 | Padmanabh |
| 8,756,348 B2 | 6/2014 | Beel |
| 8,760,007 B2 | 6/2014 | Joannopoulos |
| 8,760,008 B2 | 6/2014 | Joannopoulos |
| 8,760,265 B2 | 6/2014 | Krueger |
| 8,766,484 B2 | 7/2014 | Baarman |
| 8,766,485 B2 | 7/2014 | Joannopoulos |
| 8,766,487 B2 | 7/2014 | Dibben |
| 8,767,032 B2 | 7/2014 | Rodman |
| 8,768,309 B2 | 7/2014 | Robbins |
| 8,772,971 B2 | 7/2014 | Joannopoulos |
| 8,772,972 B2 | 7/2014 | Joannopoulos |
| 8,772,973 B2 | 7/2014 | Kurs |
| 8,782,527 B2 | 7/2014 | Karlson |
| 8,788,448 B2 | 7/2014 | Fadell |
| 8,792,912 B2 | 7/2014 | Gits |
| 8,797,159 B2 | 8/2014 | Kirkpatrick |
| 8,810,379 B2 | 8/2014 | Murphy |
| 8,812,028 B2 | 8/2014 | Yariv |
| 8,813,196 B2 | 8/2014 | Weller |
| 8,819,136 B1 | 8/2014 | Vernon |
| 8,819,138 B2 | 8/2014 | Houston |
| 8,825,597 B1 | 9/2014 | Houston |
| 8,838,681 B2 | 9/2014 | Motes |
| 8,842,153 B2 | 9/2014 | Ranganath |
| 8,843,816 B2 | 9/2014 | Stull |
| 8,849,914 B2 | 9/2014 | Bove |
| 8,856,256 B1 | 10/2014 | Srinivasan |
| 8,866,619 B2 | 10/2014 | Knibbe |
| 8,872,432 B2 | 10/2014 | Kercso |
| 8,875,195 B2 | 10/2014 | Ogle |
| 8,878,439 B2 | 11/2014 | Noguchi |
| 8,884,742 B2 | 11/2014 | Gits |
| 8,887,069 B2 | 11/2014 | Tipirneni |
| 8,896,656 B2 | 11/2014 | Epstein |
| 8,898,231 B2 | 11/2014 | Crawford |
| 8,904,293 B2 | 12/2014 | Bastide |
| 8,909,702 B2 | 12/2014 | Golovchinsky |
| 9,098,502 B1 | 8/2015 | Horling |
| 9,140,555 B1 | 9/2015 | Andersson et al. |
| 9,176,214 B2 | 11/2015 | Berrett et al. |
| 9,204,251 B1 | 12/2015 | Mendelson |
| 9,247,828 B2 | 2/2016 | Cvek |
| 9,339,106 B2 | 5/2016 | Epstein |
| 9,380,682 B2 | 6/2016 | Mead |
| 9,465,524 B2 | 10/2016 | Epstein |
| 9,642,219 B2 | 5/2017 | Mead |
| 9,703,274 B2 | 7/2017 | Li |
| 9,716,861 B1 | 7/2017 | Poel |
| 9,766,079 B1 | 9/2017 | Poel |
| 9,852,388 B1 | 12/2017 | Swieter |
| 9,871,978 B1 | 1/2018 | Epstein |
| 9,877,266 B1 | 1/2018 | Knas |
| 9,921,726 B1 | 3/2018 | Sculley |
| 9,955,316 B2 | 4/2018 | Jampani |
| 9,955,318 B1 | 4/2018 | Scheper |
| 9,980,112 B1 | 5/2018 | Newby |
| 10,021,530 B2 | 7/2018 | Sigal |
| 10,038,952 B2 | 7/2018 | Labrosse |
| 10,044,871 B2 | 8/2018 | Bargetzi |
| 10,057,963 B2 | 8/2018 | Mead |
| 10,121,113 B1 | 11/2018 | Swieter et al. |
| 10,161,752 B1 | 12/2018 | Poel |
| 10,225,707 B1 | 3/2019 | Scheper |
| 10,353,664 B2 | 7/2019 | Poel |
| 10,433,646 B1 | 10/2019 | Schmidt et al. |
| 10,459,611 B1 | 10/2019 | Sculley et al. |
| 10,561,006 B2 | 2/2020 | Mead et al. |
| 10,614,694 B1 | 4/2020 | Zwier et al. |
| 10,634,503 B2 | 4/2020 | Hill |
| 10,664,772 B1 | 5/2020 | Poel |
| 10,733,371 B1 | 8/2020 | Baloga et al. |
| 10,860,954 B1 * | 12/2020 | Yeluguri ............... G06F 3/0482 |
| 10,970,662 B2 | 4/2021 | Swieter |
| 11,085,771 B1 | 8/2021 | Scheper et al. |
| 11,100,282 B1 | 8/2021 | Baloga et al. |
| 11,143,510 B1 | 10/2021 | Poel et al. |
| 11,150,859 B2 | 10/2021 | Poel et al. |
| 11,168,987 B2 | 11/2021 | Poel et al. |
| 11,212,898 B2 | 12/2021 | Mead et al. |
| 11,402,216 B1 | 8/2022 | Scheper et al. |
| 11,402,217 B1 | 8/2022 | Scheper et al. |
| 11,687,854 B1 | 6/2023 | Swieter et al. |
| 11,690,111 B1 | 6/2023 | Sculley et al. |
| 11,713,969 B1 | 8/2023 | Poel et al. |
| 11,744,376 B2 | 9/2023 | Schmidt et al. |
| 2001/0051885 A1 | 12/2001 | Nardulli |
| 2002/0015097 A1 | 2/2002 | Martens |
| 2002/0130834 A1 | 9/2002 | Madarasz |
| 2003/0097284 A1 | 5/2003 | Shinozaki |
| 2003/0103075 A1 | 6/2003 | Rosselot |
| 2003/0107498 A1 | 6/2003 | Drennan |
| 2003/0218537 A1 | 11/2003 | Hoch |
| 2004/0001095 A1 | 1/2004 | Marques |
| 2004/0015401 A1 | 1/2004 | Lee et al. |

(56) References Cited

U.S. PATENT DOCUMENTS

| | | |
|---|---|---|
| 2004/0051644 A1 | 3/2004 | Tamayama |
| 2004/0051813 A1 | 3/2004 | Marmaropoulos |
| 2004/0141605 A1 | 7/2004 | Chen |
| 2004/0153504 A1 | 8/2004 | Hutchinson |
| 2004/0210933 A1 | 10/2004 | Dresti |
| 2004/0215694 A1 | 10/2004 | Podolsky |
| 2004/0261013 A1 | 12/2004 | Wynn |
| 2005/0018826 A1 | 1/2005 | Benco |
| 2005/0027581 A1 | 2/2005 | Kjesbu |
| 2005/0071213 A1 | 3/2005 | Kumhyr |
| 2005/0144259 A1 | 6/2005 | Buckley et al. |
| 2005/0160368 A1 | 7/2005 | Liu |
| 2005/0197877 A1 | 9/2005 | Kalinoski |
| 2005/0218739 A1 | 10/2005 | Maddin |
| 2005/0235329 A1 | 10/2005 | Karaoguz |
| 2005/0273372 A1 | 12/2005 | Bowne |
| 2005/0273493 A1 | 12/2005 | Buford |
| 2006/0009215 A1 | 1/2006 | Bogod |
| 2006/0015376 A1 | 1/2006 | Sattler |
| 2006/0021363 A1 | 2/2006 | Mizukoshi |
| 2006/0026502 A1 | 2/2006 | Dutta |
| 2006/0045107 A1 | 3/2006 | Kucenas |
| 2006/0080007 A1 | 4/2006 | Gerard |
| 2006/0080432 A1 | 4/2006 | Spataro |
| 2006/0168618 A1 | 7/2006 | Choi |
| 2006/0218027 A1 | 9/2006 | Carrion |
| 2007/0008181 A1 | 1/2007 | Rollert |
| 2007/0094065 A1 | 4/2007 | Wu |
| 2007/0118415 A1 | 5/2007 | Chen |
| 2007/0136095 A1 | 6/2007 | Weinstein |
| 2007/0162315 A1 | 7/2007 | Hodges |
| 2007/0197239 A1 | 8/2007 | Sane |
| 2007/0198744 A1 | 8/2007 | Wensley |
| 2007/0216131 A1 | 9/2007 | Potappel |
| 2007/0226034 A1 | 9/2007 | Khan |
| 2007/0282661 A1 | 12/2007 | Franco |
| 2007/0288291 A1 | 12/2007 | Earle |
| 2008/0028323 A1 | 1/2008 | Rosen |
| 2008/0091503 A1 | 4/2008 | Schirmer |
| 2008/0120370 A1 | 5/2008 | Chan et al. |
| 2008/0122635 A1 | 5/2008 | Fujikawa |
| 2008/0162198 A1 | 7/2008 | Jabbour |
| 2008/0184115 A1 | 7/2008 | Back |
| 2008/0201664 A1 | 8/2008 | O |
| 2008/0239994 A1 | 10/2008 | Xiong |
| 2008/0244417 A1 | 10/2008 | Simpson |
| 2008/0288355 A1 | 11/2008 | Rosen |
| 2008/0291021 A1 | 11/2008 | Bhogal |
| 2008/0300660 A1 | 12/2008 | John |
| 2009/0019367 A1 | 1/2009 | Cavagnari |
| 2009/0055234 A1 | 2/2009 | Li |
| 2009/0066486 A1 | 3/2009 | Kiekbusch |
| 2009/0094533 A1 | 4/2009 | Bozionek |
| 2009/0106567 A1 | 4/2009 | Baarman |
| 2009/0146982 A1 | 6/2009 | Thielman |
| 2009/0164581 A1 | 6/2009 | Bove |
| 2009/0210822 A1 | 8/2009 | Schindler |
| 2009/0212637 A1 | 8/2009 | Baarman |
| 2009/0265280 A1 | 10/2009 | Taneja |
| 2009/0271713 A1 | 10/2009 | Stull |
| 2009/0286556 A1 | 11/2009 | Yumoto |
| 2009/0300174 A1 | 12/2009 | Floris |
| 2009/0327227 A1 | 12/2009 | Chakra |
| 2010/0017245 A1 | 1/2010 | Kristiansen |
| 2010/0037151 A1 | 2/2010 | Ackerman |
| 2010/0070334 A1 | 3/2010 | Monteverde |
| 2010/0088239 A1 | 4/2010 | Blair |
| 2010/0102640 A1 | 4/2010 | Joannopoulos |
| 2010/0127575 A1 | 5/2010 | Joannopoulos |
| 2010/0133918 A1 | 6/2010 | Joannopoulos |
| 2010/0133919 A1 | 6/2010 | Joannopoulos |
| 2010/0133920 A1 | 6/2010 | Joannopoulos |
| 2010/0153160 A1 | 6/2010 | Bezemer |
| 2010/0153983 A1 | 6/2010 | Philmon |
| 2010/0179854 A1 | 7/2010 | Shafer |
| 2010/0187911 A1 | 7/2010 | Joannopoulos |
| 2010/0207458 A1 | 8/2010 | Joannopoulos |
| 2010/0219694 A1 | 9/2010 | Kurs |
| 2010/0219791 A1 | 9/2010 | Cheng |
| 2010/0231340 A1 | 9/2010 | Fiorello |
| 2010/0235216 A1 | 9/2010 | Hehmeyer |
| 2010/0256823 A1 | 10/2010 | Cherukuri |
| 2010/0259110 A1 | 10/2010 | Kurs |
| 2010/0274855 A1 | 10/2010 | Wassingbo |
| 2010/0277121 A1 | 11/2010 | Hall |
| 2010/0283600 A1 | 11/2010 | Herbert |
| 2010/0308939 A1 | 12/2010 | Kurs |
| 2010/0315483 A1 | 12/2010 | King |
| 2010/0319066 A1 | 12/2010 | Berry |
| 2011/0043049 A1 | 2/2011 | Karalis |
| 2011/0072482 A1 | 3/2011 | Lau |
| 2011/0074346 A1 | 3/2011 | Hall |
| 2011/0084804 A1 | 4/2011 | Khorashadi |
| 2011/0088056 A1 | 4/2011 | Ansari |
| 2011/0095618 A1 | 4/2011 | Schatz |
| 2011/0121920 A1 | 5/2011 | Kurs |
| 2011/0126127 A1 | 5/2011 | Mariotti |
| 2011/0149809 A1 | 6/2011 | Narayanaswamy |
| 2011/0153738 A1 | 6/2011 | Bedingfield |
| 2011/0223899 A1 | 9/2011 | Hiraide |
| 2011/0225563 A1 | 9/2011 | Kim |
| 2011/0231216 A1 | 9/2011 | Fyke |
| 2011/0244798 A1 | 10/2011 | Daigle |
| 2011/0267002 A1 | 11/2011 | Baarman |
| 2011/0270952 A1 | 11/2011 | Ray |
| 2011/0295392 A1 | 12/2011 | Cunnington |
| 2011/0296465 A1 | 12/2011 | Krishnan |
| 2012/0007441 A1 | 1/2012 | John |
| 2012/0016678 A1 | 1/2012 | Gruber |
| 2012/0022909 A1 | 1/2012 | Ayatollahi |
| 2012/0032484 A1 | 2/2012 | Cvek |
| 2012/0032522 A1 | 2/2012 | Schatz |
| 2012/0062345 A1 | 3/2012 | Kurs |
| 2012/0068549 A1 | 3/2012 | Karalis |
| 2012/0068832 A1 | 3/2012 | Feldstein |
| 2012/0072030 A1 | 3/2012 | Elliott |
| 2012/0078676 A1 | 3/2012 | Adams |
| 2012/0086284 A1 | 4/2012 | Capanella |
| 2012/0086867 A1 | 4/2012 | Kesler |
| 2012/0089722 A1 | 4/2012 | Enholm |
| 2012/0091794 A1 | 4/2012 | Campanella |
| 2012/0091795 A1 | 4/2012 | Fiorello |
| 2012/0091796 A1 | 4/2012 | Kesler |
| 2012/0091797 A1 | 4/2012 | Kesler |
| 2012/0091819 A1 | 4/2012 | Kulikowski |
| 2012/0091820 A1 | 4/2012 | Campanella |
| 2012/0091949 A1 | 4/2012 | Campanella |
| 2012/0091950 A1 | 4/2012 | Campanella |
| 2012/0098350 A1 | 4/2012 | Campanella |
| 2012/0112531 A1 | 5/2012 | Kesler |
| 2012/0112532 A1 | 5/2012 | Kesler |
| 2012/0112534 A1 | 5/2012 | Kesler |
| 2012/0112535 A1 | 5/2012 | Karalis |
| 2012/0112536 A1 | 5/2012 | Karalis |
| 2012/0112538 A1 | 5/2012 | Kesler |
| 2012/0112668 A1 | 5/2012 | Van de Sluis |
| 2012/0112691 A1 | 5/2012 | Kurs |
| 2012/0119569 A1 | 5/2012 | Karalis |
| 2012/0119575 A1 | 5/2012 | Kurs |
| 2012/0119576 A1 | 5/2012 | Kesler |
| 2012/0119698 A1 | 5/2012 | Karalis |
| 2012/0136572 A1 | 5/2012 | Norton |
| 2012/0139355 A1 | 6/2012 | Ganem |
| 2012/0143639 A1 | 6/2012 | Rollert |
| 2012/0184338 A1 | 7/2012 | Kesler |
| 2012/0192084 A1 | 7/2012 | Dura |
| 2012/0204272 A1 | 8/2012 | Svensson |
| 2012/0206050 A1 | 8/2012 | Spero |
| 2012/0206096 A1 | 8/2012 | John |
| 2012/0216129 A1 | 8/2012 | Ng |
| 2012/0223573 A1 | 9/2012 | Schatz |
| 2012/0228952 A1 | 9/2012 | Hall |
| 2012/0228953 A1 | 9/2012 | Kesler |
| 2012/0228954 A1 | 9/2012 | Kesler |

(56) References Cited

U.S. PATENT DOCUMENTS

| | | |
|---|---|---|
| 2012/0228960 A1 | 9/2012 | Karalis |
| 2012/0229592 A1 | 9/2012 | White |
| 2012/0233205 A1 | 9/2012 | McDermott |
| 2012/0235500 A1 | 9/2012 | Ganem |
| 2012/0235501 A1 | 9/2012 | Kesler |
| 2012/0235502 A1 | 9/2012 | Kesler |
| 2012/0235503 A1 | 9/2012 | Kesler |
| 2012/0235504 A1 | 9/2012 | Kesler |
| 2012/0235505 A1 | 9/2012 | Schatz |
| 2012/0235566 A1 | 9/2012 | Karalis |
| 2012/0235633 A1 | 9/2012 | Kesler |
| 2012/0235634 A1 | 9/2012 | Hall |
| 2012/0239117 A1 | 9/2012 | Kesler |
| 2012/0239202 A1 | 9/2012 | Voysey |
| 2012/0242159 A1 | 9/2012 | Lou |
| 2012/0243158 A1 | 9/2012 | Gentil |
| 2012/0248886 A1 | 10/2012 | Kesler |
| 2012/0248887 A1 | 10/2012 | Kesler |
| 2012/0248888 A1 | 10/2012 | Kesler |
| 2012/0248981 A1 | 10/2012 | Karalis |
| 2012/0254909 A1 | 10/2012 | Serdiuk |
| 2012/0256494 A1 | 10/2012 | Kesler |
| 2012/0274586 A1 | 11/2012 | Southworth |
| 2012/0284672 A1 | 11/2012 | Madonna |
| 2012/0313449 A1 | 12/2012 | Kurs |
| 2012/0313742 A1 | 12/2012 | Kurs |
| 2012/0324589 A1 | 12/2012 | Nukala |
| 2012/0331108 A1 | 12/2012 | Ferdowsi |
| 2012/0331394 A1 | 12/2012 | Trombley-Shapiro |
| 2013/0007949 A1 | 1/2013 | Kurs |
| 2013/0013750 A1 | 1/2013 | Butler |
| 2013/0018952 A1 | 1/2013 | McConnell |
| 2013/0018953 A1 | 1/2013 | McConnell |
| 2013/0020878 A1 | 1/2013 | Karalis |
| 2013/0033118 A1 | 2/2013 | Karalis |
| 2013/0038402 A1 | 2/2013 | Karalis |
| 2013/0041973 A1 | 2/2013 | Zhou |
| 2013/0054863 A1 | 2/2013 | Imes |
| 2013/0057364 A1 | 3/2013 | Kesler |
| 2013/0062966 A1 | 3/2013 | Verghese |
| 2013/0069441 A1 | 3/2013 | Verghese |
| 2013/0069543 A1 | 3/2013 | Mohan |
| 2013/0069753 A1 | 3/2013 | Kurs |
| 2013/0073094 A1 | 3/2013 | Knapton |
| 2013/0080255 A1 | 3/2013 | Li |
| 2013/0088154 A1 | 4/2013 | Van Hoof |
| 2013/0099587 A1 | 4/2013 | Lou |
| 2013/0113249 A1 | 5/2013 | Cvek |
| 2013/0117158 A1 | 5/2013 | Cvek |
| 2013/0157509 A1 | 6/2013 | Srivastava |
| 2013/0167039 A1 | 6/2013 | Howell |
| 2013/0171981 A1 | 7/2013 | Woo |
| 2013/0175874 A1 | 7/2013 | Lou |
| 2013/0181541 A1 | 7/2013 | Karalis |
| 2013/0198653 A1 | 8/2013 | Tse |
| 2013/0199420 A1 | 8/2013 | Hjelm |
| 2013/0200721 A1 | 8/2013 | Kurs |
| 2013/0208186 A1 | 8/2013 | Malone |
| 2013/0218829 A1 | 8/2013 | Martinez |
| 2013/0221744 A1 | 8/2013 | Hall |
| 2013/0234481 A1 | 9/2013 | Johnson |
| 2013/0234531 A1 | 9/2013 | Budgett |
| 2013/0241439 A1 | 9/2013 | Nishigaki |
| 2013/0246901 A1 | 9/2013 | Massano |
| 2013/0249410 A1 | 9/2013 | Thompson |
| 2013/0262687 A1 | 10/2013 | Avery |
| 2013/0278073 A1 | 10/2013 | Kurs |
| 2013/0278074 A1 | 10/2013 | Kurs |
| 2013/0278075 A1 | 10/2013 | Kurs |
| 2013/0278631 A1 | 10/2013 | Border et al. |
| 2013/0283325 A1 | 10/2013 | Chiniara |
| 2013/0300353 A1 | 11/2013 | Kurs |
| 2013/0304924 A1 | 11/2013 | Dhara |
| 2013/0307349 A1 | 11/2013 | Hall |
| 2013/0314543 A1 | 11/2013 | Sutter |
| 2013/0320773 A1 | 12/2013 | Schatz |
| 2013/0325526 A1 | 12/2013 | Tyler |
| 2013/0334892 A1 | 12/2013 | Hall |
| 2013/0334973 A1 | 12/2013 | Wagenaar Cacciola |
| 2014/0002012 A1 | 1/2014 | McCauley |
| 2014/0021798 A1 | 1/2014 | Kesler |
| 2014/0026025 A1 | 1/2014 | Smith |
| 2014/0028112 A1 | 1/2014 | Hui |
| 2014/0032327 A1 | 1/2014 | Prakash |
| 2014/0035378 A1 | 2/2014 | Kesler |
| 2014/0035704 A1 | 2/2014 | Efe |
| 2014/0044281 A1 | 2/2014 | Ganem |
| 2014/0044293 A1 | 2/2014 | Ganem |
| 2014/0046713 A1 | 2/2014 | Harvey et al. |
| 2014/0049118 A1 | 2/2014 | Karalis |
| 2014/0052974 A1 | 2/2014 | Masters |
| 2014/0054961 A1 | 2/2014 | Metcalf |
| 2014/0058778 A1 | 2/2014 | McLarty |
| 2014/0062211 A1 | 3/2014 | Hamam |
| 2014/0067865 A1 | 3/2014 | Kirigin |
| 2014/0074930 A1 | 3/2014 | Kumashio |
| 2014/0084703 A1 | 3/2014 | Hall |
| 2014/0084859 A1 | 3/2014 | Hall |
| 2014/0091636 A1 | 4/2014 | Ofstein |
| 2014/0091756 A1 | 4/2014 | Ofstein |
| 2014/0103738 A1 | 4/2014 | Campanella |
| 2014/0108084 A1 | 4/2014 | Bargetzi |
| 2014/0108956 A1 | 4/2014 | Varenhorst |
| 2014/0109210 A1 | 4/2014 | Borzycki |
| 2014/0111304 A1 | 4/2014 | Hashim-Waris |
| 2014/0135648 A1 | 5/2014 | Holoien |
| 2014/0139426 A1 | 5/2014 | Kryze |
| 2014/0149519 A1 | 5/2014 | Redfern |
| 2014/0150059 A1 | 5/2014 | Uchida |
| 2014/0159589 A1 | 6/2014 | Pandharipande |
| 2014/0159652 A1 | 6/2014 | Hall |
| 2014/0164934 A1 | 6/2014 | Yang |
| 2014/0167618 A1 | 6/2014 | Wang |
| 2014/0175898 A1 | 6/2014 | Kurs |
| 2014/0181704 A1 | 6/2014 | Madonna |
| 2014/0181935 A1 | 6/2014 | Beckmann |
| 2014/0195149 A1 | 7/2014 | Yang |
| 2014/0195291 A1 | 7/2014 | Aaron |
| 2014/0195805 A1 | 7/2014 | Koo |
| 2014/0203659 A1 | 7/2014 | Madawala |
| 2014/0203921 A1 | 7/2014 | Baker |
| 2014/0215551 A1 | 7/2014 | Allain |
| 2014/0217785 A1 | 8/2014 | Arens |
| 2014/0223313 A1 | 8/2014 | Aebi |
| 2014/0225978 A1 | 8/2014 | Saban et al. |
| 2014/0229578 A1 | 8/2014 | Chu |
| 2014/0236659 A1 | 8/2014 | Hapse |
| 2014/0244043 A1 | 8/2014 | Foster |
| 2014/0253813 A1 | 9/2014 | Bakar |
| 2014/0259047 A1 | 9/2014 | Bakar |
| 2014/0269531 A1 | 9/2014 | Luna |
| 2014/0274005 A1 | 9/2014 | Luna |
| 2014/0277757 A1 | 9/2014 | Wang |
| 2014/0277763 A1 | 9/2014 | Ramachandran |
| 2014/0278057 A1 | 9/2014 | Berns |
| 2014/0282013 A1 | 9/2014 | Amijee |
| 2014/0285113 A1 | 9/2014 | Huang |
| 2014/0297758 A1 | 10/2014 | Kidron |
| 2014/0300277 A1 | 10/2014 | Ono |
| 2014/0302795 A1 | 10/2014 | Chacon |
| 2014/0354429 A1 | 12/2014 | Henderson |
| 2014/0365568 A1 | 12/2014 | Huang |
| 2015/0005011 A1 | 1/2015 | Nehrenz |
| 2015/0012843 A1 | 1/2015 | Ouyang et al. |
| 2015/0015399 A1 | 1/2015 | Gleckler |
| 2015/0035440 A1 | 2/2015 | Spero |
| 2015/0069915 A1 | 3/2015 | Ogawa |
| 2015/0085063 A1 | 3/2015 | Fish |
| 2015/0149929 A1 | 5/2015 | Shepherd |
| 2015/0179012 A1 | 6/2015 | Sharpe |
| 2015/0193739 A1 | 7/2015 | Min |
| 2015/0195620 A1 | 7/2015 | Buchner et al. |
| 2015/0200982 A1 | 7/2015 | Velagaleti |
| 2015/0201480 A1 | 7/2015 | Ogawa |

(56) References Cited

U.S. PATENT DOCUMENTS

| | | | |
|---|---|---|---|
| 2015/0229644 A1 | 8/2015 | Nozawa | |
| 2015/0234468 A1 | 8/2015 | Hwang et al. | |
| 2015/0296594 A1 | 10/2015 | Blum | |
| 2015/0301727 A1 | 10/2015 | Miyazawa | |
| 2015/0324754 A1 | 11/2015 | Bathiya | |
| 2015/0330780 A1 | 11/2015 | Yuzawa | |
| 2015/0369612 A1 | 12/2015 | Nishimura | |
| 2015/0370272 A1 | 12/2015 | Reddy | |
| 2016/0044071 A1 | 2/2016 | Sandholm | |
| 2016/0049064 A1 | 2/2016 | McNabb | |
| 2016/0162844 A1 | 6/2016 | Rachuri | |
| 2016/0171566 A1 | 6/2016 | Pugh | |
| 2016/0231731 A1 | 8/2016 | Carver et al. | |
| 2016/0253048 A1* | 9/2016 | Silcock | G06F 3/04842 715/753 |
| 2016/0304013 A1 | 10/2016 | Wolas | |
| 2016/0327922 A1 | 11/2016 | Sekiguchi | |
| 2016/0342950 A1 | 11/2016 | Pignataro | |
| 2017/0046113 A1 | 2/2017 | Noyes et al. | |
| 2017/0060350 A1 | 3/2017 | Zheng et al. | |
| 2017/0083275 A1 | 3/2017 | Shin | |
| 2017/0208664 A1 | 7/2017 | Mead | |
| 2017/0223312 A1 | 8/2017 | McNelley et al. | |
| 2017/0238401 A1 | 8/2017 | Sadwick et al. | |
| 2017/0293458 A1 | 10/2017 | Poel | |
| 2017/0314803 A1* | 11/2017 | Jacobson | G06F 3/04847 |
| 2018/0004178 A1 | 1/2018 | Haines | |
| 2018/0107444 A1 | 4/2018 | Dunn | |
| 2018/0137369 A1 | 5/2018 | Roth | |
| 2018/0143025 A1 | 5/2018 | Kurata | |
| 2019/0053012 A1 | 2/2019 | Hill | |
| 2019/0118838 A1* | 4/2019 | Lequio | G06Q 10/02 |
| 2019/0141291 A1 | 5/2019 | McNelley et al. | |
| 2019/0272141 A1 | 9/2019 | Poel | |
| 2019/0294018 A1 | 9/2019 | Shrivastava | |
| 2019/0370700 A1* | 12/2019 | Ludwig | G06Q 10/00 |
| 2020/0007921 A1 | 1/2020 | Ojala | |
| 2020/0049509 A1 | 2/2020 | Hill | |
| 2020/0096346 A1* | 3/2020 | Dhandapani | G01C 21/383 |
| 2020/0096573 A1 | 3/2020 | Cha | |
| 2020/0116493 A1 | 4/2020 | Colburn | |
| 2020/0250879 A1 | 8/2020 | Foster | |
| 2020/0272163 A1 | 8/2020 | Ha et al. | |
| 2021/0027208 A1 | 1/2021 | Clark et al. | |

FOREIGN PATENT DOCUMENTS

| | | |
|---|---|---|
| AU | 2013203947 A1 | 5/2013 |
| CN | 102239633 A | 11/2011 |
| CN | 102439669 A | 5/2012 |
| CN | 102870338 A | 1/2013 |
| EP | 0935263 A2 | 8/1999 |
| EP | 2367146 A1 | 9/2011 |
| EP | 2388977 A1 | 11/2011 |
| EP | 2439686 A1 | 4/2012 |
| KR | 20140007006 A | 1/2014 |
| WO | 2007008646 A2 | 1/2007 |
| WO | 2008118178 A1 | 10/2008 |
| WO | 2009085896 A1 | 7/2009 |
| WO | 2009108958 A1 | 9/2009 |
| WO | 2009108959 A1 | 9/2009 |
| WO | 2010093997 A1 | 8/2010 |
| WO | 2011034759 A2 | 3/2011 |
| WO | 2011099873 A1 | 8/2011 |
| WO | 2011112795 A1 | 9/2011 |
| WO | 2012037279 A1 | 3/2012 |
| WO | 2012170278 A3 | 12/2012 |
| WO | 2013008252 A2 | 1/2013 |
| WO | 2013059441 A1 | 4/2013 |
| WO | 2013112185 A2 | 8/2013 |
| WO | 2013122483 A1 | 8/2013 |
| WO | 2014007656 A1 | 1/2014 |
| WO | 2014011059 A1 | 1/2014 |
| WO | 2014035260 A1 | 3/2014 |
| WO | 2014035263 A1 | 3/2014 |
| WO | 2014038966 A1 | 3/2014 |
| WO | 2014054953 A1 | 4/2014 |
| WO | 2014094107 A1 | 6/2014 |
| WO | 2014139781 A2 | 9/2014 |
| WO | 2017142541 A1 | 8/2017 |
| WO | 2019133264 A1 | 7/2019 |

OTHER PUBLICATIONS join.me forum and FAQ, Apr. 3, 2014.
Cisco, WebEx Meeting Center User Guide For Hosts, Presenters, and Participants, Version 8.23, Copyright 1997-2011 Cisco and/or its affiliates.
Krumm, et al., The NearMe Wireless Proximity Server, UbiComp 2004, The Sixth International Conference on Ubiquitous Computing, pp. 283-300, Sep. 7-10, 2004.
NFS Technology Group, Rendezvous—Technology for Meeting Room, Desk Scheduling and Event Management, http://myrendezvous.net/rendezvous-event-booking-software/calendar-management/.
Citrix, GoToWebinar User Guide, Copyright 2015 Citrix Systems.
CiviCRM Books: User and Administrator Guide for Version 4.5, Published Sep. 2014, http://book.civicrm.org/user/current/email/scheduled-reminders/.
Lee, TechnicLee—My Thoughts on Technology, Business, and Innovation, Posted in Outlook, Scripting, Jan. 20, 2012, http://techniclee.wordpress.com/2012/01/20/sending-a-meeting-reminder-email-in-outlook/.
Events and Room Reserve Scheduled Task Setup for Email Notifications, Article No. 268, Apr. 22, 2013, http://kb.evanced.info/article.php?id=268.
Oracle Communications, Oracle Data Sheet—Calendar Server, Copyright 2015 Oracle and/or its affiliates, http://www.oracle.com/us/industries/communications/communications-calendar-server-ds-071728.pdf.
Stirworks, Inc., The Height-Adjustable, Standing Stir Kinetic Desk, http://www.stirworks.com/, Copyright 2015 Stirworks, Inc., 6 pages.
Tam, et al., A Framework for Asynchronous Change Awareness in Collaborative Documents and Workspaces, International Journal of Human-Computer Studies, 2006, 64:583-598.
Davis, A Careful Return: How A Global Pandemic Changed a Workplace Design Firm's Office Spaces—And Its Business Direction Toward Safety-Tech Solutions, AV Technology, 2020, 13(6), 15(3), https://dialog.proquest.com/professional/printviewfile?accountid=131444, 3 pages.
NFS Technology Group, Rendezvous—Technology for Meeting Room, Desk Scheduling and Event Management, http://myrendezvous.net/rendezvous-event-booking-software/calendar-management/, Mar. 1, 2016, 2 pages.
Ah Kun et al., Co-Present Photo Sharing on Mobile Devices, 9th International Conference on Human Computer Interaction with Mobile Devices and Services (MobileHCI'07), 2007, pp. 277-284.
Lomas et al., Collaboration Tools, Educause Learning Initiative, 2008, 2(11):1-11.
Marrinan et al., SAGE2: A New Approach for Data Intensive Collaboration Using Scalable Resolution Shared Displays, 10th IEEE International Conference on Collaborative Computing: Networking, Applications and Worksharing, 2014, pp. 177-186.
Greenberg, S. et al., The Notification Collage: Posting Information to Public and Personal Displays, Proceedings of the ACM Conference on Human Factors in Computing Systems, [CHI Letters 3(1)], pp. 514-521.

* cited by examiner

Room Specification - SF-BB4E-002 — 60b, 74, 76

Room Volume Specification (For Room 104 (Fig. 6)) — 65

Room Attributes Specification — 66

| Affordances | | Environmental Chars. | Rating (1-10) |
|---|---|---|---|
| Number Seats | 4 | Visual Privacy | 4 |
| Media:Scape | Y | Sound Level | 8 |
| VirtualPuck | Y | Foot Traffic | 3 |
| Telepresence | Y | Natural Light | 3 |
| Electronic WB(s) | Y | HVAC White Noise | 10 |
| Surface Hub | N | Rest Room Convenience | 7 |
| Whiteboard(s) | N | Refresh Room Convenience | 6 |
| Handicapped | Y | Supply Convenience | 10 |
| Tinting Glass | Y | Available Supp. Room(s) | 7 |
| Open/Enclosed | E | User Rooom Rating(s) | 8 |

Use Statistics Record — 67

Room Occupancy

| Time | 7-8AM | 8-9AM | 9-10AM | 10-11AM | 11AM-12 | 12-1PM ... |
|---|---|---|---|---|---|---|
| % Occ | 12% | 32% | 28% | 45% | 55% | 50% |

| Affordances | Utilization Statistics (Ave when occupied) |
|---|---|
| Number Seats | 2/4 |
| Media:Scape | 74% |
| Telepresence | 55% |
| Electronic WB(s) | NA% |
| Surface hub | NA% |
| Handicapped | 12% |
| Tinting Glass | 70% |

Maintenance Tickets Record — 72

| Ticket # | Date/Time Generated | Target Time Slot |
|---|---|---|
| Ticket 1 | Time 1 | |
| Ticket 2 ... | Time 2 ... | 9:50AM-10:00AM |
| Ticket N | Time N | |

Fig. 3

WAYFINDING SERVICES METHOD AND APPARATUS

CROSS-REFERENCE TO RELATED APPLICATIONS

This application claims priority to U.S. provisional application Ser. No. 63/006,987 which was filed on Apr. 8, 2020 and which is titled "Wayfinding Services Method and Apparatus" which is incorporated herein in its entirety by reference.

STATEMENT REGARDING FEDERALLY SPONSORED RESEARCH OR DEVELOPMENT

Not applicable.

BACKGROUND OF THE DISCLOSURE

The field of the disclosure is space management and allocation as well as way finding within office space or other types of spaces.

Environments (e.g., enterprise spaces, rooms, groupings of affordances in an open plan; hereinafter "spaces" unless indicated otherwise) optimized for specific user activities increase individual and collaborative productivity through enhanced work product development, sharing, and consumption while also increasing individual wellbeing and team development. Optimized spaces require two things. First, optimized spaces include optimized affordances and characteristics that best support user activities to be performed in those spaces and that are aligned with specific user preferences. Second, optimized spaces need to be useable. "Useable" means clean and stocked and that affordances (e.g., (i) furniture affordances, (ii) content sharing affordances (e.g., telepresence systems, content sharing emissive surfaces and systems, etc.), and (iii) environmental control affordances (e.g., lighting, HVAC equipment, tinting glass walls, blinds, ceiling louvres, etc.)) within the spaces are all functioning properly and ready for use (e.g., a telepresence system is fully operational, chair components are not broken, all lighting devices work, etc.).

While optimized spaces are important, optimized space value is curtailed if specific spaces are not used in an optimal way (e.g., to facilitate activities that the spaces and associated affordances are optimized for). For instance, if a local space user is communicating with a remote user and would benefit from using a telepresence system but is unaware that a space with a telepresence system is available for use, while the optimized space is available, that space and its affordances would be underutilized. As another instance, if two people need a space to meet and are using a 12 person capacity room, that large room and all of its affordances could not be used during that time in a more optimized way by a larger group. For this reason, in addition to designing and configuring optimizes spaces for use, a system enabling users to discover and schedule optimized spaces is needed to reap the full benefits associated with space optimization.

To optimize and maintain spaces and render those spaces discoverable/schedulable, lots of people need different types of space related information. For instance, to design optimized spaces for user and activity needs and user preferences, designers rely upon occupancy rates of existing facility spaces over time and space characteristic information related to those spaces to discern use preferences (e.g., it is assumed space characteristics of highly occupied spaces are more preferred than space characteristics of less used spaces). Similarly, to assess affordance preferences in spaces, designers can collect information on affordance use within spaces. Spaces that are underutilized are redesigned to include preferred characteristics associated with highly used spaces in an effort to increase the rates of space utilization.

As another instance, janitors (e.g., space cleaners), IT specialists (e.g., employees tasked with maintaining content sharing affordances) and facility managers (e.g., employees tasked with maintaining non-content sharing affordances (e.g., furniture, environment controls (e.g., lighting, HVAC, audio equipment, etc.))) tasked with maintaining spaces and affordances in "useable" (e.g., clean and working) conditions, need to know when spaces and affordances require maintenance (e.g., cleaning, repair, replacement or replenishment), the nature of required maintenance (e.g., cleaning, a malfunctioning telepresence system, replenishment of refreshments, etc.), and when the spaces are not being used for other purposes so that they are available for required maintenance (e.g., when spaces are vacant). As yet one other instance, space users that need specific spaces (and affordances) to optimally facilitate specific activities need to know what spaces are available for use, when those spaces are available, which spaces include affordances required to facilitate specific activities and, optimally, space characteristics that may be preferred by the user when selecting space for use.

In known cases systems and processes have evolved for enabling people that need access to space information in order to perform space related tasks to obtain information required to perform those tasks. In many cases costs associated with automating capture and presentation of some information types needed to perform tasks when compared to manual capture and processing costs (e.g. where users develop information through their senses) have impeded development of automated systems and additional development of products that could be built thereon. In other cases, a perceived inability to capture and present all information that may be useful when performing space related tasks has resulted in either ignoring that information or requiring physical visits to spaces by system users in order to collect that information.

Manual in-space information collection and processing is time consuming and costly. In addition, manual in-space information collection and processing results in inefficiencies as task timing decisions either need to be made (i) prior to arriving at a space with imperfect space information or (ii) once a user arrives at a space and can perceive all space information affecting the timing decision. Moreover, where manual information sensing and processing is required for a process to work effectively, processes often fail as people fail to perform as expected.

Examples of different types of information collection and processing systems for supporting different people as they interact with facility space are instructive. As a first example, in the case of space preferences for specific users, there may be literally hundreds of factors and combinations of factors (e.g., light levels, temperature, air flow, presence of natural light, visual privacy, adjustability of visual privacy, level of visual distraction, many different aspects of furniture and Content sharing affordance arrangements and features, egress placement, etc.) that different users would take into account when deciding which space they prefer among a set of 50 different spaces. Discerning and then capturing all possible user preferences for each space in a facility would be difficult at best and in fact, in some cases, preferential characteristic combinations (e.g., combinations of multiple factors) can only really be appreciated via physical presence within a space.

In addition, differences between user preferences may be hard or close to impossible to describe as distinguishable options and therefore presenting those differences for user selection would be challenging. Even if a substantially fulsome set of user space preference options could be presented to a user, most users would never wade through textual representations of hundreds of similar and sometimes confusingly indistinguishable preference options in order to select an optimized space.

One other problem with developing more characteristic rich space selection systems that offer more preferences for user selection is that the best run enterprises routinely change out underperforming spaces through redesign and replacement of affordances and in some cases space defining structures. Thus, a fully descriptive space selection system rich in preference selections would quickly become dissociated from modified facility spaces and therefore essentially useless and frustrating to employ when looking for spaces and resources to use.

Faced with these realities, space selection systems have been designed that present only a small subset of space characteristics (e.g., capacity requirement, basic IT options, etc.) that may be needed for specific activities for user selection and available time slots and do not present more nuanced space characteristics as user preference options.

While these space selection systems help users reserve/use spaces that meet needs for supporting specific activities, these systems simply do not enable users to consider other space preferences (e.g., wants as opposed to needs) and therefore sub-optimal space scheduling routinely occurs. For instance, assume a case where three different conference spaces have 12 person capacities where a first space include 12 high end task chairs arranged about a single conference table, a second space has 12 mid-quality task chairs arranged about two split conference tables and a third space has 6 mid-quality task chairs arranged about a single small conference table, a three person couch and three bar stools lined up along a rear space defining wall. Here, if a system simply enables a user to specify that space capacity has to be 12, that user will not know which seating arrangement is located in a scheduled space prior to arriving for a meeting. In many cases the user finding an unexpected seating arrangement upon arrival in a space will be disappointed.

In some cases after a user schedules a space for use, the user may recognize that a different space supports activity needs and better aligns with the user's preferences. For instance, assume a user arrives at a facility location for a prescheduled meeting in a first space and is disappointed in first space characteristics after the user gets to the first space location. In this case, if a second space near the first space location includes affordances required to facilitate the user's scheduled activity and better meets the user's preferences and is available for scheduling, the user could switch from the first space to the second. Unfortunately switching spaces in real time often is not an option and when possible can cause user consternation as well as confusion for other people invited to participate in activities that arrive after a space switch is made.

As a second instance, assume a first space is proximate a restroom and a supply room, a second space is a substantial distance from a restroom and a supply room and that proximity to a restroom and to a supply room are not presented as user selectable options in a space scheduling system. Here, user selection of the first space that is better situated with respect to a restroom and a supply room and that the user would prefer would only be accidental.

As a second example where systems and processes have been developed to provide required information to support space related tasks, in the case of a space designer where space occupancy rates only need to be determined over a limited time (e.g., months) in order to develop space preference insights, systems have been developed for temporarily installing occupancy sensors in facility spaces where the sensors are removed once space preferences insights have been developed. Here, the sensing and processing costs associated with the occupancy sensing system and perceived lack of value to space designers of persistent occupancy sensing render permanent occupancy sensing systems for design cost prohibitive.

In the case of a space designer, perceived inability to capture and present some types of information to users has driven manual information collection processes where designers effectively operate as sensors to collect needed information to perform preference and occupancy rate association. In this regard, where space characteristics need to be correlated with occupancy rates to identified preferred space characteristics, again, as described above, many space characteristics that could operate as user preferences need to be experienced in person to be fully appreciated and therefore are difficult to capture in a data store. In cases where space characteristics need to be experienced in person to be perceived, designers are often forced to physically visit spaces in order to identify space characteristics that likely distinguish preferred spaces from others.

As a third example where systems and processes have been developed to access required information to support space related tasks, in the case of janitorial cleaning tasks between scheduled meetings, in many cases janitors are simply trained to watch scheduled meeting end times and to clean spaces between meeting occurrences. Here, a janitor typically travels with a cart and cleaning supplies so that whatever needs cleaning in an unoccupied space can be addressed in real time as encountered. Because janitorial labor has been viewed as relatively inexpensive in most cases, any inefficiencies related to janitors waiting around for the ends of meetings or for spaces to clear or where spaces are unexpectedly occupied when a janitor arrives to clean have been tolerated. Recent increasing labor costs and a constant drive to increase overall efficiency have rendered wasted janitorial time less tolerable.

In the case of IT, furniture or environmental control affordance malfunctions, known systems rely on users to detect and report malfunctions to IT specialists or facility managers for maintenance. Here, manual reporting may include notifying a receptionist of a malfunction or sending an e-mail or other electronic notification to a responsible specialist or manager. Once notified of a malfunction, the IT specialist or facility manager may use a space scheduling system as described above to schedule a time slot for space maintenance (e.g., repair, replacement, replenishment, etc.).

Unfortunately, in many cases, space users have no training or little experience in reporting affordance malfunctions and therefore are unclear how to report a malfunction (e.g., space, affordance, problem, time, etc.) and who to report to. Users in the middle of an activity (e.g., a conference) in a space when a malfunction is first discovered are usually more concerned with compensating for the malfunction to complete their activity within a scheduled use period for the space. In many cases users do not believe malfunction reporting is one of their duties and they simply forego malfunction reporting. In cases where malfunctions are reported, notifications are often incomplete (e.g., indicate a space but not the nature of the problem, indicate an affordance type but not a space, indicate an affordance and space but not malfunction specifics) so maintenance is delayed. Even where a malfunction notification is fulsome, maintenance may not be possible for some time so that the malfunction persists. In these cases any other users of the space prior to repair and that require the malfunctioning affordance will be disappointed and in many cases will be completely frustrated when the affordance does not work properly.

Thus, while systems and processes have been developed enabling people that perform various space related tasks to access at least basic space related information needed to perform those tasks, in known systems at least some of that basic information and supplemental information (e.g., preferences, space characteristics, detection of affordance malfunctions, etc.) useful to better facilitate those tasks and to enable other tasks and capabilities can only be accessed via physical presence within or near facility spaces.

It would be advantageous to have a space discovery and scheduling system that captures many more space characteristics that may be related to user preferences and that can present those characteristics in an intuitive and easy to consume form so that more optimal space selection and scheduling decisions can be made. It would also be advantageous if a rich set of space characteristics could be presented in a glanceable form so that space characteristics could be gleaned quickly without appreciable need for reading and deciphering text or other complex and imprecise information presentations. In addition, where an optimized facility view or space view exists for space discovery and scheduling, it would be advantageous if the optimized view maintained for discovery and scheduling could also be presented at low cost to other people that perform other space related tasks such as space designers and space maintainers (e.g., janitors, facility managers, IT specialists, affordance installers, kitchen aides, etc.). Moreover, where specific space related information is important to specific types of facility employees to perform space related tasks, it would be advantageous if that information could be intuitively presented to employee types that have a need for that information.

SUMMARY OF THE DISCLOSURE

It is often said that "a picture is worth a thousand words". In the case of presenting space/affordance based information, graphical representations of space and associated affordances are worth more than a thousand words. In this regard, it has been recognized that some existing space finding systems help space users locate spaces that have affordances they need for specific activities but none works well to help a user locate spaces with other affordances and characteristics that they want as well as need. Systems are described in this disclosure that enable users to view spaces and facilities in three dimensions to develop an optimally rich understanding of space characteristics including juxtapositions with other spaces in a facility, design and affordance characteristics, etc., that would be difficult if not impossible to provide to space users in a textual or other similar type format. In this regard, what appeals to one space user as opposed to others about a specific space layout or other characteristics is not always clear so it is difficult to even assess which space characteristics to capture and present to a user when the user is selecting a space to use. In addition, even if appealing characteristics could be identified, how to express those characteristics succinctly in text to convey meaning and for user consumption is unclear. Instead, a graphical 3D representation of spaces enables a user to quickly assess many space characteristics that are important to the user and to compare several spaces with each other to inform a final space selection decision.

In at least some embodiments 3D space representations that are developed for other purposes (e.g., other than space locating, scheduling, etc.) can be utilized as a foundational component to generate system interfaces in the present disclosure. Here, the idea is to springboard off existing 3D data sets to provide additional value at a relatively inexpensive cost.

In some cases the disclosed systems include a system for discovering space characteristics, the system comprising a data store storing a facility information dataset corresponding to a physical world facility, the facility information set including a 3D virtual world (VW) representation of the facility, a plurality of volume specifications, one volume specification for each of a plurality of different volumetric portions of the VW representation, an interface device including a display screen located within a facility associated with the VW representation, occupancy sensors within the facility for detecting occupancy of portions of the physical world facility corresponding to the volumetric portions of the VW representation, a processor linked to the interface device, the data store, and the sensors, the processor programmed to perform the steps of, accessing the VW representation of the facility, presenting a first view of the VW representation via the display screen as a space discovery tool for a user to view, visually distinguishing volumetric portions of the VW representation corresponding to portions of the physical world facility that are currently unoccupied, receiving user input via the interface device to change the view of the VW representation on the display screen and changing the view of the VW representation on the display screen to a second view based on the received user input.

In some cases the first view is from a first perspective angle and the second view is from a second perspective angle. In some cases the first view is from a first perspective elevation and the second view is from a second perspective elevation. In some cases the first view shows the entire VW representation and the second view shows a zoomed in view of a portion of the entire VW representation. In some cases wherein the VW representation includes representations of space dividing structures within the physical world facility as well as representations of furniture affordances within the physical world facility. In some cases the facility information dataset includes a first set of attributes associated with a first volumetric portion of the VW representation, the processor further programmed to receive an input selecting the first volumetric portion and in response to receiving the selection of the first volumetric portion, presenting at least a subset of the first set of attributes via the display screen.

In some cases the processor visually distinguishes volumetric portions of the VW representation corresponding to portions of the physical world facility that are currently unoccupied in a first way and visually distinguishes portions of the VW representation corresponding to portions of the real world or physical world facility that are currently occupied in a second way that is different than the first way. In some cases the first way is by overlaying a first color highlight and the second way is by overlaying a second color highlight. In some cases at least portions of the VW representation are not included in the volumetric portions. In some cases spaces associated with the volumetric portions of the VW representation can be scheduled and wherein the processor has access to scheduling information related to those volumetric portions and wherein the processor is programmed to identify an available unscheduled duration for each of those volumetric portions using the scheduling information. In some cases the processor is further programed to present a time available tag for at least a subset of the volumetric portions of the VW representation that are associated with physical world portions of the facility that are unoccupied on the display screen, each tag spatially associated with a different one of the volumetric portions.

In some cases each volumetric portion corresponds to a separate conference room within the real world or physical world facility. In some cases at least a subset of the portions of the physical world facility that correspond to the volumetric portions of the VW representation can be scheduled for use and wherein currently unoccupied means unoccupied and not scheduled for use within a threshold period of time. In some cases an indicator is provided spatially proximate each portion of the physical world space that is associated with one of the volumetric portions of the VW representation and wherein the processor controls each indicator to visually indicate when an associated portion of the physical world facility is unoccupied. In some cases the processor controls each indicator to visually indicate in a manner that is similar to the manner in which the volumetric portion of the VW representation associated therewith visually distinguishes. In some cases the processor causes each indicator to glow green to indicate that the associated portion of the physical world facility is unoccupied and highlights each volumetric portion green to indicate that an associated portion of the physical world facility is unoccupied. In some cases, once a portion of the physical world space is occupied, the processor causes the indicator to glow red and highlights an associated volumetric portion red to indicate occupancy. In some cases the VW representation includes a plurality of 3D parametric representations of affordances located within the physical world facility space.

Some embodiments include a system for discovering space characteristics, the system comprising a data store storing a facility information dataset corresponding to a physical world facility, the facility information set including a 3D virtual world (VW) representation of the facility, a plurality of volume specifications, one volume specification for each of a plurality of different volumetric portions of the VW representation, an interface device including a display screen located within a facility associated with the VW representation, occupancy sensors within the facility for detecting occupancy of portions of the physical world facility corresponding to the volumetric portions of the VW representation, an indicator provided spatially proximate each portion of the physical world facility that is associated with one of the volumetric portions of the VW representation, a processor linked to the interface device, the data store, and the sensors, the processor programmed to perform the steps of, accessing the VW representation of the facility, presenting a first view of the VW representation via the display screen as a space discovery tool for a user to view, visually distinguishing volumetric portions of the VW representation corresponding to portions of the physical world facility that are currently unoccupied, receiving user input via the interface device to change the view of the VW representation on the display screen and changing the view of the VW representation on the display screen to a second view based on the received user input and controlling each indicator to visually indicate when an associated portion of the physical world facility is unoccupied.

In at least some embodiments the disclosure includes a system for discovering space characteristics, the system comprising a data store storing a facility information dataset corresponding to a physical world facility, the facility information set including a 3D virtual world (VW) representation of the facility, a plurality of volume specifications, one volume specification for each of a plurality of different volumetric portions of the VW representation, the VW representation including a plurality of 3D parametric representations of affordances located within the physical world facility space, an interface device including a display screen located within a facility associated with the VW representation, occupancy sensors within the facility for detecting occupancy of portions of the physical world facility corresponding to the volumetric portions of the VW representation, an indicator provided spatially proximate each portion of the physical world facility that is associated with one of the volumetric portions of the VW representation, a processor linked to the interface device, the data store, and the sensors, the processor programmed to perform the steps of accessing the VW representation of the facility, presenting a first view of the VW representation via the display screen as a space discovery tool for a user to view, visually distinguishing volumetric portions of the VW representation corresponding to portions of the physical world facility that are currently unoccupied, receiving user input via the interface device to change the view of the VW representation on the display screen and changing the view of the VW representation on the display screen to a second view based on the received user input and wherein each of the VW representations includes different a 3D perspective view.

BRIEF DESCRIPTION OF THE SEVERAL VIEWS OF THE DRAWINGS

FIG. 3 is an exemplary room specification from FIG. 2 that is consistent with at least some aspects of the present disclosure;

DETAILED DESCRIPTION OF THE DISCLOSURE

Figure 1:
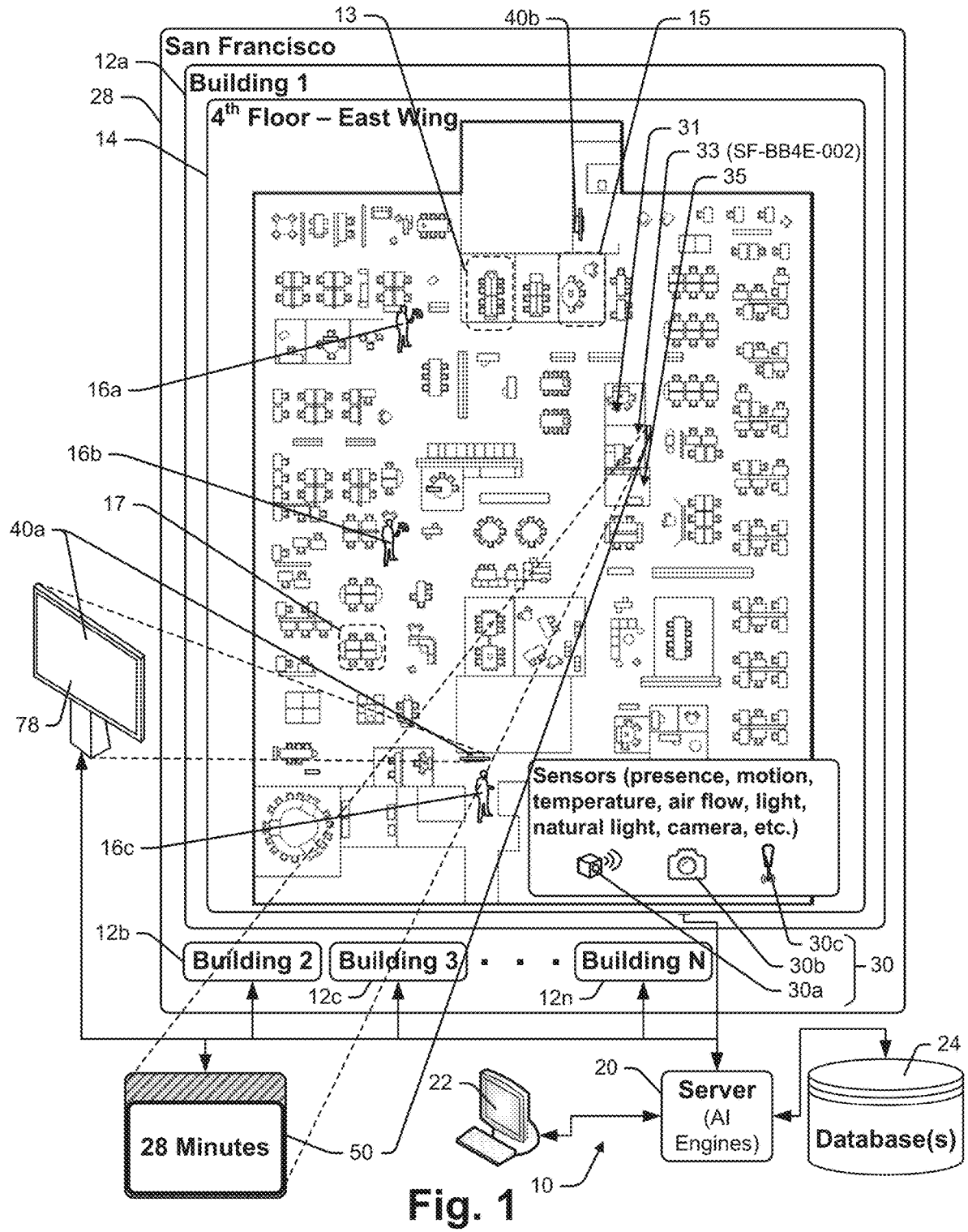
FIG. 1 is a schematic representation of a space discovery and guidance system that is consistent with at least some aspects of the present disclosure for use with a set of enterprise facilities including a fourth floor east wing of a building.

U.S. patent application Ser. No. 16/190,592 (the "'592 application" hereafter) which was filed on Nov. 14, 2018 and which is titled "Method And System For Locating Resources And Communicating Within An Enterprise" is incorporated herein in its entirety for all purposes. In addition, U.S. patent application Ser. No. 16/247,070 which was filed on Jan. 14, 2019 and which is titled "Space Guidance And Management System And Method" is incorporated herein in its entirety for all purposes.

The various aspects of the subject disclosure are now described with reference to the drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

In the following detailed description, reference is made to the accompanying drawings which form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular method, device, or system, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views and, more specifically, referring to FIG. 1, the present disclosure will be described in the context of an exemplary set of enterprise facilities located in San Francisco 28 and an exemplary space discovery and wayfinding system 10 that is consistent with at least some aspects of the present disclosure. The enterprise facilities include first through Nth buildings 12a, 12b, 12c and 12n on a San Francisco campus. While the system is described in the context of a San Francisco campus, it should be appreciated that the system may be used with additional enterprise facilities located on other campuses in other cities or stand-alone facilities at other locations. In the interest of simplifying this explanation, first building 12a is shown to include an east wing of a fourth floor 14 that includes a plurality of space or room defining structures and affordance sets within each of the defined spaces or rooms.

One of the exemplary conference rooms is labelled SF-BB4E-002. It should be appreciated that first building 1 would also include a fourth floor west wing, other building 1 floors, etc., where each of the other floors and wing would include defining structures and affordances in other arrangements akin to, albeit typically different than, those shown in FIG. 1. Unless indicated otherwise, in the interest of simplifying this explanation, the fourth floor east wing will be referred to as "the facility" hereafter.

Exemplary space defining structures within the buildings may include, for instance, interior wall structures, wall frames and glazed wall structures, book shelf and other storage structures, screen assemblies, doors and other assemblies. Some of the spaces or rooms have complete visual privacy when egress doors or the like are closed while others may have see-through glass walls or a subset of glass walls so that people inside and outside the space can see out of or into the space. In other cases a space may be in an open office plan so that that space is open to one or more sides within the larger fourth floor. In still other cases glass wall opacity may be controllable so that transparency can be adjusted per space user preference.

Some of the figures include colors that are applied as overlays or that indicate different states as described hereafter. In some cases different colors are represented by different cross hatching. For instance, left up to right diagonal cross hatching indicates a red color or highlight, double diagonal cross hatching indicates a green color or highlight, left down to right diagonal cross hatching indicates a yellow color or highlight, and horizontal cross hatching indicates a pink color or highlight, unless indicated otherwise.

In the illustrated case defined spaces include large and small spaces that are dimensioned to accommodate different capacities and different affordance sets. For instance, a large space may include 12 task chairs and a large conference table as well as several large content sharing emissive surfaces which a small space may include only two task chairs and a small side table with no sharing emissive surface. In most cases one central theme when designing facility spaces is to provide many differently sized and afforded spaces so that many different activity types, group sizes and user preferences can be accommodated. While the exemplary east wing includes many different defined spaces and affordances, conference room 33 as labelled in FIG. 1 will be referred to hereinafter as a "first room" unless indicated otherwise.

Affordances within the defined spaces may include but are not limited to tables, workstations, task chairs, lounge chairs, sofas, stools, benches, credenzas, book shelves and other storage affordances, telepresence systems, MediaScape (e.g., content sharing system sold by Steelcase, Inc.), Virtual Puck (e.g., content sharing system sold by Steelcase, Inc.), and other content sharing systems, Microsoft Surface Hub systems, analog whiteboards, digital whiteboards, emissive surfaces, etc. Hereafter chairs, tables, shelving and storage units, sofas, lounge chairs, privacy screens, and other furniture affordances will be referred to collectively as "furniture affordances" while MediaScape, Virtual Puck, Surface Hub, electronic whiteboards, whiteboards, etc., will be referred to collectively as "content sharing affordances".

Referring still to FIG. 1, space defining structure and open space affordances may be arranged to control different general space characteristics related to how people use space including, for instance, general foot traffic flow rates, ambient noise levels, visual privacy (what others can see within a space/room), visual noise levels (e.g., what a user can see outside an occupied space), air and other HVAC flow patterns, etc. For instance, when designing space, designers typically assume there will be greater foot traffic rates near restrooms, refreshment rooms and supply rooms than at locations remote from those affordances. As another instance, workstations near main travel arteries through a space are assumed to have greater ambient noise levels than other stations remote from those travel paths. Travel paths can be modified by reconfiguring space defining structures and affordances.

Referring yet again to FIG. 1, system 10 includes an administrator's computer interface device 22, system data stores 24 (shown in more detail in FIGS. 2 and 3), a plurality of sensor devices 30, interface display screens 40, 50 (shown in more detail in FIG. 4) and a server 20 that is hardwired or wirelessly linked to each of the interfaces 22, 40, 50, data stores 24, and sensor devices 30. Server 20 is shown as a single server assembly but it should be understood that server 20 may include a plurality of computing devices that operate together to perform various functions and processes that are described in this specification. In some cases servers may be remotely located from each other and linked via any type of communication lines or links.

Interface 22 is an interface that may be used by a system administrator, often a facilities manager, an IT specialist or other facility employee, to manage or maintain facility operations in spaces and rooms.

Figure 2:
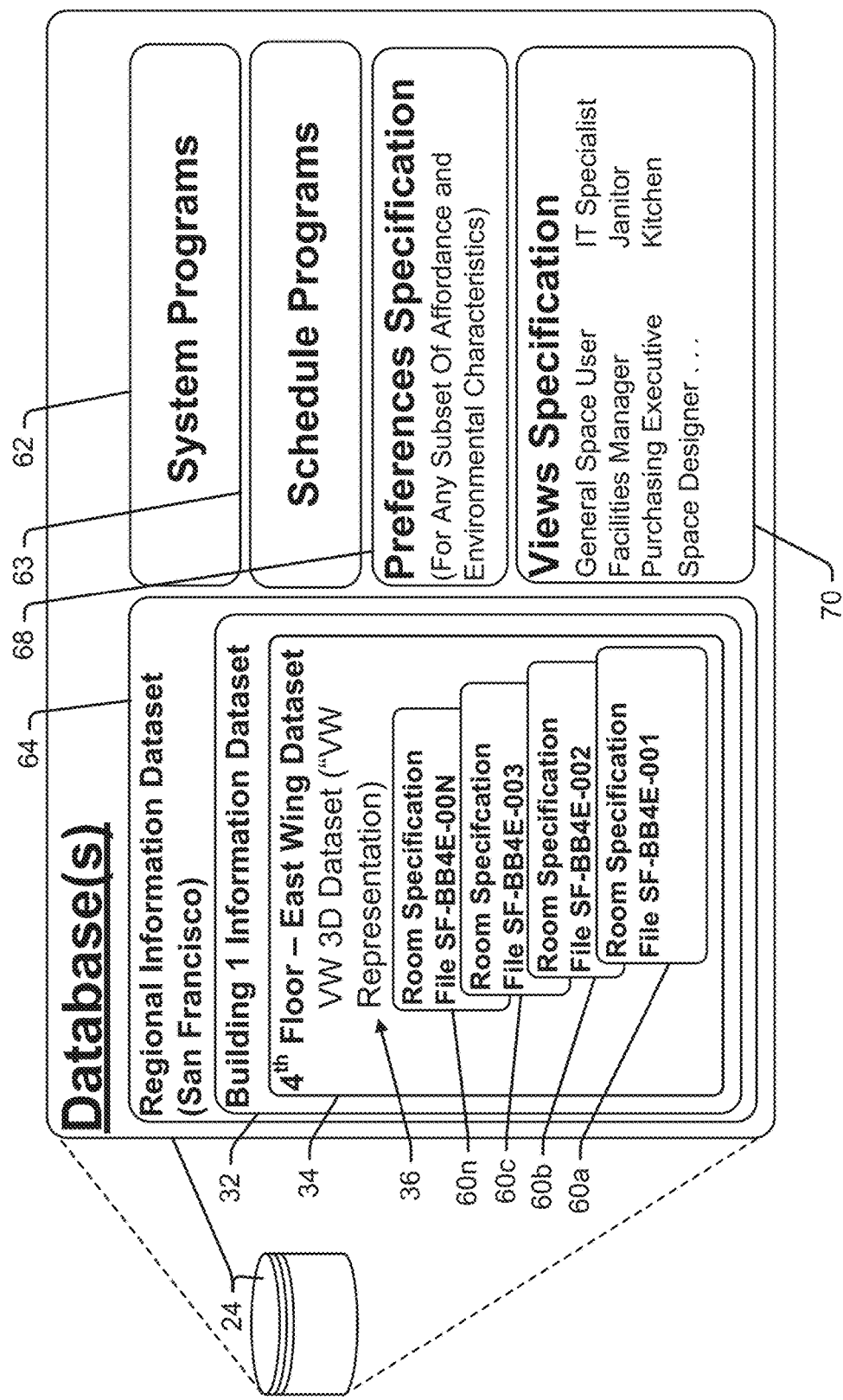
FIG. 2 is a schematic diagram illustrating an exemplary data store from FIG. 1 that is consistent with at least some aspects of the present disclosure.

Referring also to FIG. 2, exemplary data store 24 may include any data storing construct including, for instance, a dedicated storage server or memory device that stores a database used by the disclosed systems and configurations, a dataset that is stored in a cloud based storage environment, a distributed dataset that is stored among several servers or other computing devices, etc. As shown, the exemplary data store 24 includes system programs 62, schedule programs 63, a regional information dataset 64, a user preferences specification 68, and a user views specification 70. Server 20 runs programs 62 to perform functions and processes described in this disclosure as well as other functions and processes.

In at least some cases schedule system 63 is implemented using a conventional calendar software package (e.g., Microsoft Outlook or a comparable package) where each resource that can be scheduled or reserved is represented by an calendar package account so that each of the resources can be independently scheduled for use. In at least some embodiments the disclosed system links via an API to the calendaring package. Here, schedulable resources include spaces (and associated affordances) and rooms as well as people. In some cases individual affordances within space may be schedulable such as, for instance, workstations, lounge chair arrangements, Microsoft Surface Hubs, Steelcase MediaScape arrangements, etc., located within open office plans and, in those cases, each of those schedulable affordances would have its own scheduling address. Here, a system program communicates with the calendar software package via an API to determine schedule states of facility resources, those states being used to drive different views of the facility spaces presented to system users. In addition, in at least some cases, the system program communicates with the calendar software package via an API to change space states (e.g., to reserve space for use or render used space available during time slots) as users interact with the disclosed system or the system responds to sensed conditions (e.g., space occupancy, number or users in a space, etc.) at different locations within the facility.

Referring still to FIG. 2, regional information dataset 64 includes system data corresponding to all buildings or other facilities that are associated with the disclosed system that are located within the San Francisco region. In the illustrated example, dataset 64 includes a subset of data associated with building 1 as shown at 32. While not illustrated, data subsets akin to the building 1 set 32 would also be included in the regional dataset 64, one for each other building in the San Francisco region. The building 1 dataset 32 in turn includes data sets for different larger spaces (e.g., building floors, wings, etc.) within the building including, as illustrated, the dataset 34 associated with the fourth floor east wing (e.g., "the facility" using the above described parlance). Again, while not shown, data sets akin to the set 34 would also be included in the building 1 set for each other larger space that exists within the building (e.g., fourth floor, west wing, first floor east wing, etc.).

How larger spaces are divided up to be represented within the system is a matter of the sizes of different spaces and the complexity of the space designs. In some cases how spaces are divided up for data storage and viewing may also be based on the sizes of user interface screens (e.g., 40*a* in FIG. 1) as well as screen imaging capabilities (e.g., screen resolution, etc.). The idea is to divide floor spaces within buildings into other spaces where 3D representations of the spaces including affordances therein have sufficient size and detail that a typical user can see at least basic information in the representations that is useable to discern space attributes that may operate as user preferences. Thus, for instance, in an exemplary 3D representation of a larger space like facility 14 (see again FIG. 1), the size of facility 14 is selected so that when a 3D rendering thereof is presented on a display screen with a specific resolution, a typical seeing user could perceive that room 13 includes eight task chairs arranges on opposite sides of a long table while room 15 includes seven chairs arranges around two different sized tables and all generally facing in the same direction.

The fourth floor east wing dataset 34 corresponding to facility 14 (see again FIG. 1) includes a VW 3D dataset 36 as well as a plurality of room specification files 60a through 60n. The VW 3D dataset 36 includes data includes a three dimensional volumetric set of voxels that define a VW representation 100 of all the space dividing and defining wall structures that exist in the real world east wing of the fourth floor (e.g., "the facility") as shown in FIG. 1. Some of the voxels are opaque and represent wall, floor, door and other dividing structures while some of the voxels are clear and represent open spaces (e.g., air) within a building. In some cases voxels are semi-transparent and represent glazed clear or tinted wall structures, glazed doors, etc.

In addition to representing all the space dividing and defining wall and other structures within the VW representation, the VW 3D dataset also includes datasets (e.g., "affordance datasets" or "affordance representations") that define the appearances of affordances located in the real or physical world spaces defined by real world wall structures that are represented in the VW representation. For instance, four workstations including four height adjustable tables and four chairs shown at 17 in the real world top plan view in FIG. 1 would be represented at the same location (see 17a in FIG. 6) in the VW representation as a 3D voxel set viewable from any angle and any elevation. When affordances within the real world are changed (e.g., eliminated, added, moved to different locations or to different juxtapositions within the real world spaces, etc.), the associated affordance representations in the VW representation are similarly modified. Thus, for instance, if the four workstation configuration at 17 were removed and replaced with a lounge chair in the real world, the affordance representation associated with the configuration 17 could likewise be removed from the VW representation and replaced with a lounge defining representation. Unless indicated otherwise, hereafter a full VW 3D dataset for a space and affordances therein will be referred to as a "VW representation" and a view of that representation from a specific angle and elevation will be referred to as a "VW view".

Figure 5:
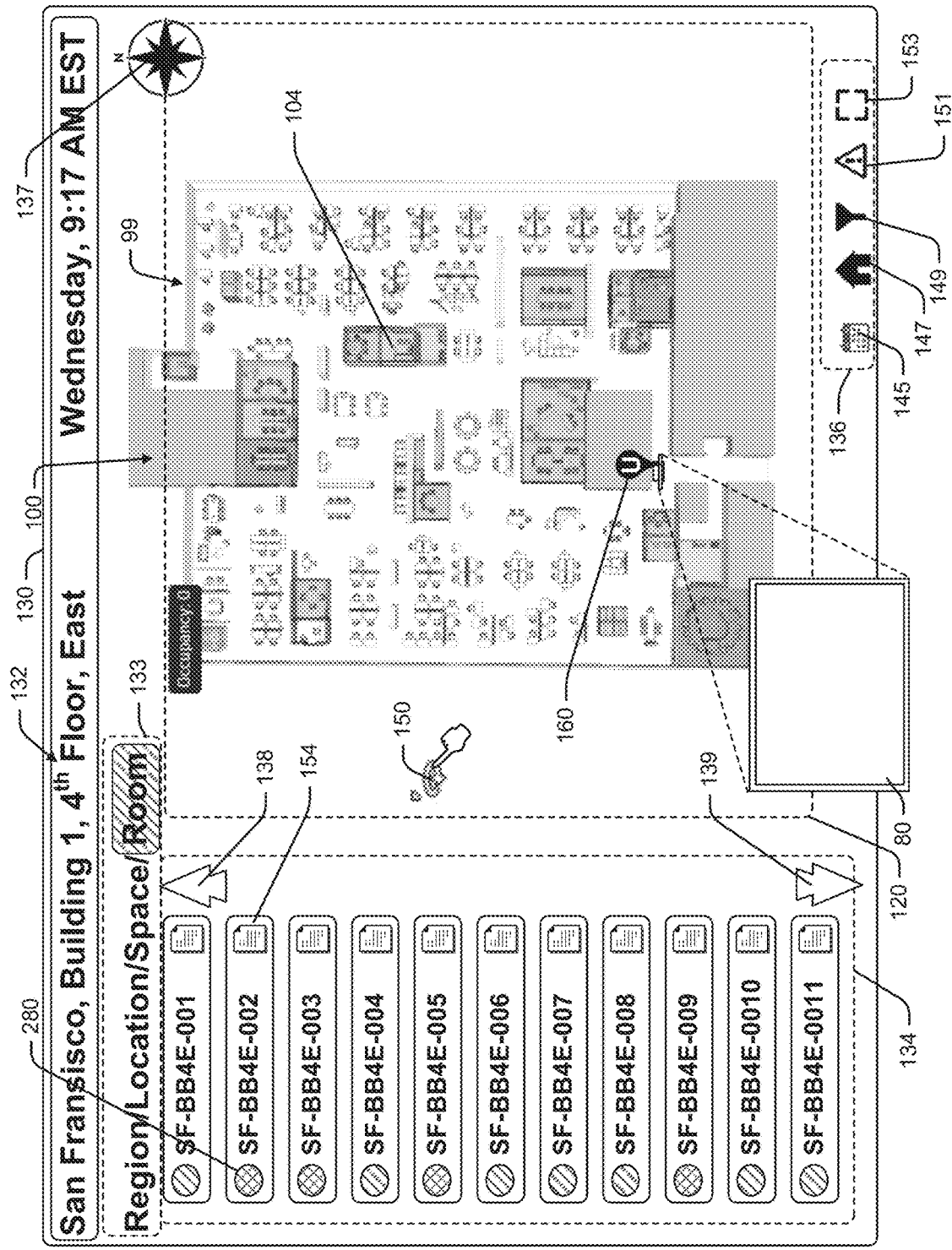
FIG. 5 is an exemplary screen shot that may be presented via the display screen of the kiosk shown in FIG. 4 showing a substantially top plan view of a VW representation of physical world space.
Figure 6:
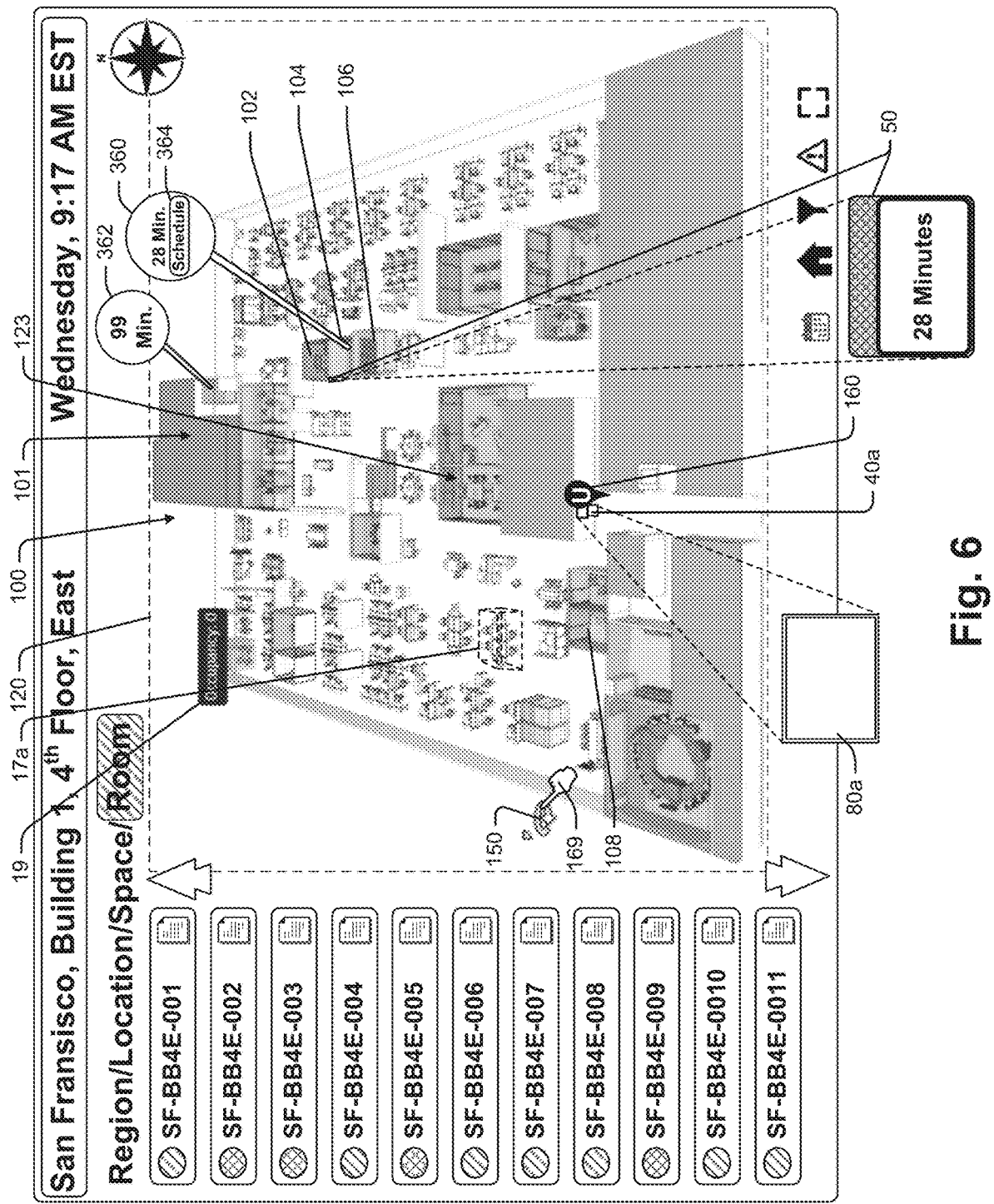
FIG. 6 is similar to FIG. 5, albeit showing a different screen shot with a different view of a VW representation.
Figure 7:
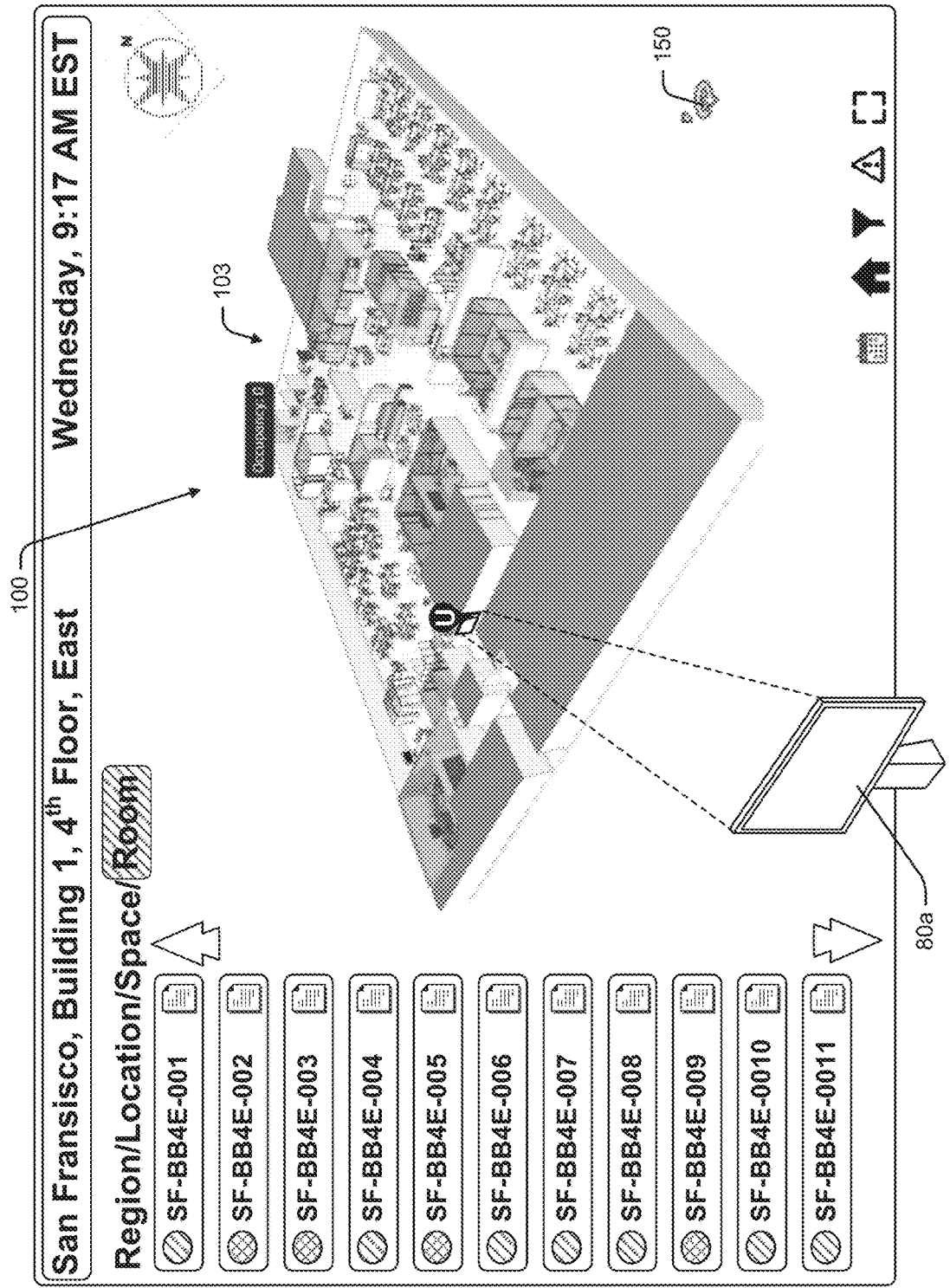
FIG. 7 is similar to FIG. 5, albeit showing a different screen shot with a different view of a VW representation.
Figure 8:
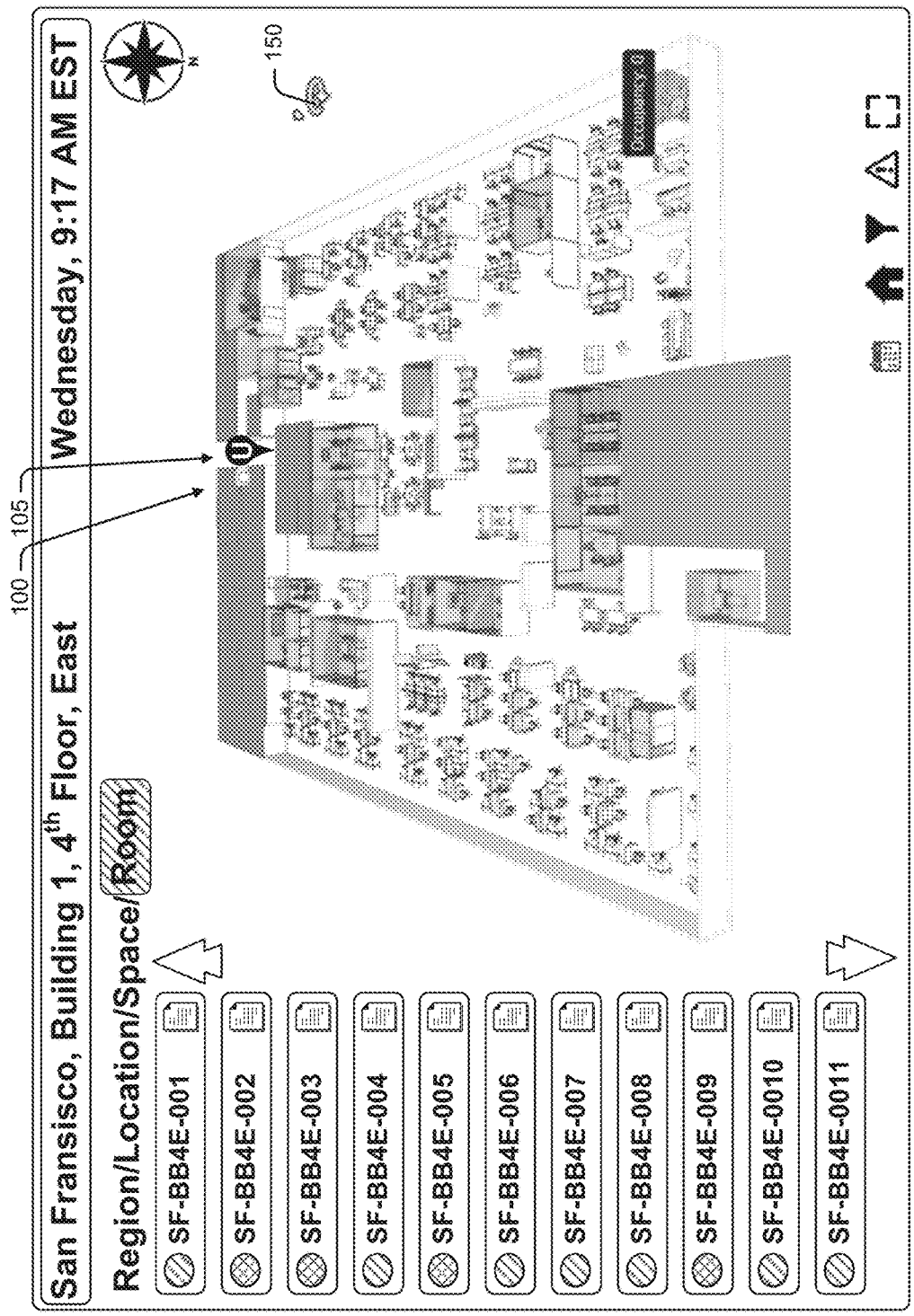
FIG. 8 is similar to FIG. 5, albeit showing a different screen shot with a different view of a VW representation.
Figure 9:
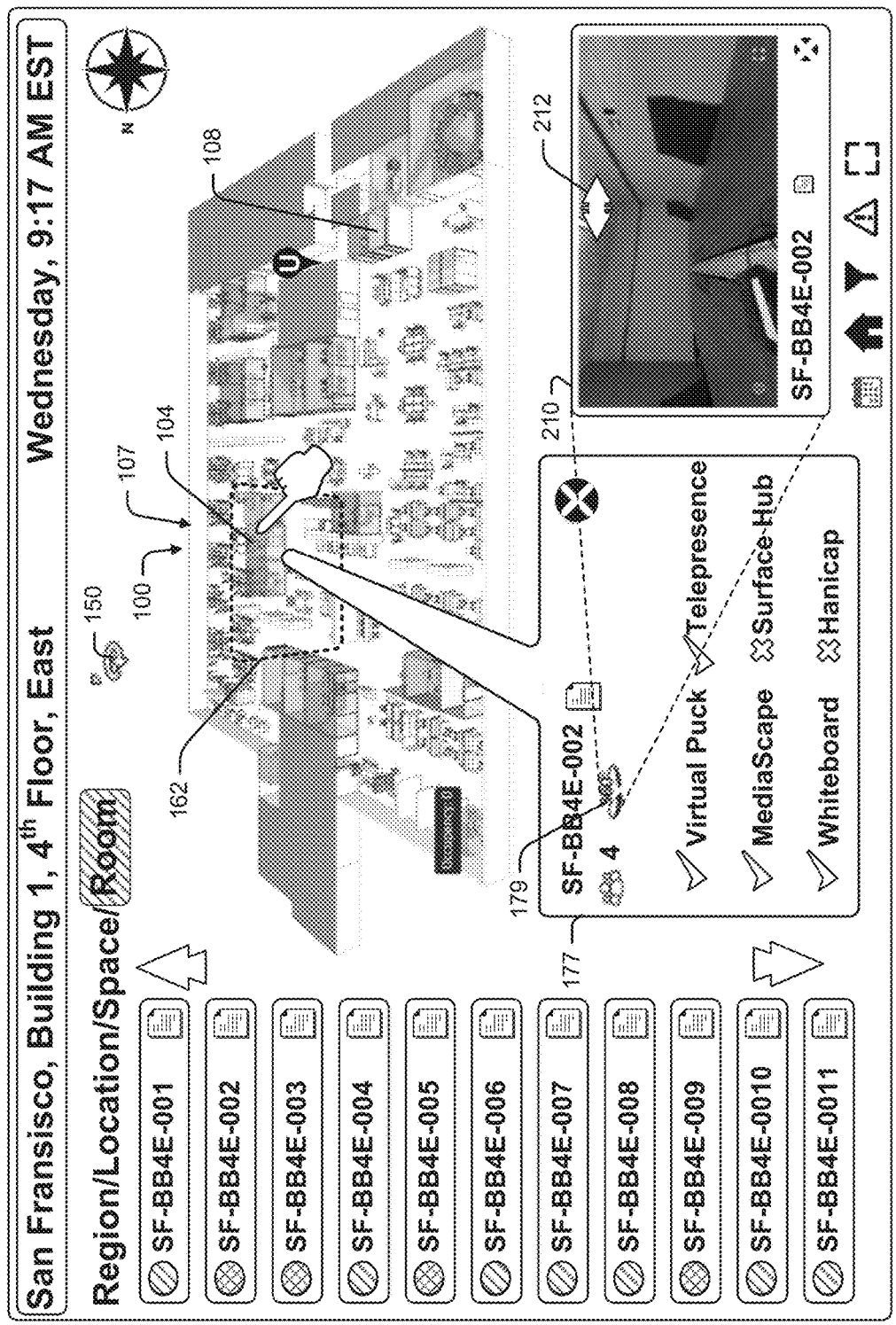
FIG. 9 is similar to FIG. 5, albeit showing a different screen shot with a different view of a VW representation.
Figure 10:
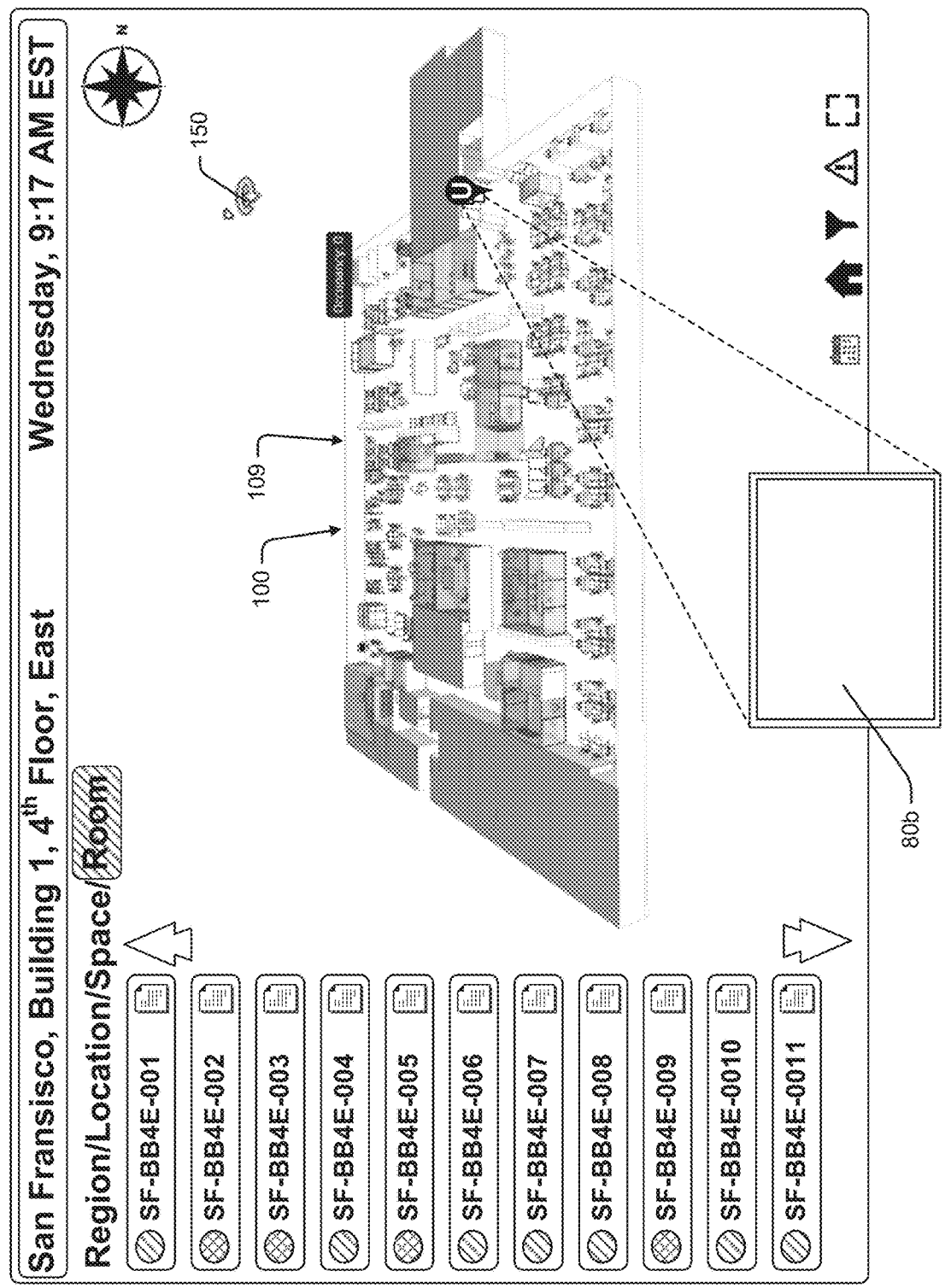
FIG. 10 is similar to FIG. 5, albeit showing a different screen shot with a different view of a VW representation.

Referring now to FIG. 6, an exemplary north facing elevation perspective 3D VW view 101 of a VW representation 100 of the fourth floor east wing facility space is shown in a viewing field 120 that may be presented to a system user as part of an exemplary user interface screenshot according to at least some aspects of the present disclosure. Referring also to FIG. 1, real world room 33 is associated with room 104 in VW representation 100. Similarly, real world rooms 31 and 35 in FIG. 1 are associated with rooms 102 and 106 in VW representation 100. FIG. 7 shows a northwest facing elevation perspective view or VW representation 100, FIG. 8 shows a south facing elevation perspective view or VW representation 100, FIG. 9 shows an east facing elevation perspective view or VW representation 100, and FIG. 10 shows a west facing elevation perspective view or VW representation 100. FIG. 5 shows a substantially vertical elevation perspective view 99 of VW representation 100.

While many different types of software packages may be used to develop VW representation 100, in particularly advantageous systems a building information modeling (BIM) program (e.g., Revit by AutoCAD which operated on Microsoft Windows used with the Forge Design Automation API by AutoCAD) is utilized. As well known in the facilities construction business, BIM systems represent a facility design as combinations of "objects" (e.g., vague and undefined, generic or product-specific, solid shapes or void-spaces (e.g., a shaped room)), that maintain geometry and spatial relationships (e.g. relative juxtapositions). BIM rendering tools allow extraction of different views from a building model for view rendering and other uses. These different views are automatically consistent, being based on persistent definitions of each object instance. BIM software also defines objects parametrically (e.g., the objects are defined as parameters and relations to other objects, so that if a related object is amended, dependent objects automatically change to accommodate the related object modifications). In the present case, BIM model elements include data used to render 2D and 3D models of associated real world structures including walls, furniture affordances, content sharing affordances, etc.

In addition to providing rendering tools, BIM software programs allow space architects to assign many different types of "attributes" to model elements where the attributes are then used to drive application programs. For instance, in the case of a seating unit (e.g., chair, sofa, etc.), seating capacity (e.g., number of people that can sit on the unit; 1, 2, 3, etc.), a seating unit description, a cost estimate, parts list, purchase date, maintenance record, ordering information attributes, etc., can be assigned to an associated seating unit model element for subsequent access for various purposes (e.g., to simply use that raw data as a reference, to drive application programs, etc.). As another instance, similar types of information can be assigned to a furniture set (e.g., a combination including a table, six task chairs used with the table, a MediaScape system and a telepresence system integrated into the table assembly). The attributes go beyond 3D representations and may include attributes associated with time, cost, and environmental analysis and life-cycle facility management aspects.

Three dimensional spaces (e.g., a room, an arbitrary space within an open office plan, etc.) within a VW BIM representation may be automatically or manually defined as separate model elements and attributes can be assigned to each of those elements to drive application programs. To this end, see again FIG. 6 where a subset of the defined spaces within VW representation are shown colored red, green and blue while other spaces. In the FIG. 6 example it is contemplated that each of the colored spaces represents a three dimensional space that has been defined as a model element (e.g., a "volumetric portion") where element specific attributes are assigned to each of those elements. Where walls in a BIM file define a space, a system processor may automatically define that space as a model element to which attributes are assigned and/or can be assigned by a space designer.

Referring still to FIG. 6, it should be appreciated that where a room element is colored or highlighted to indicate a state or other characteristic, external surfaces of the room defining walls are only shown highlighted if the walls are transparent (e.g., glazed) while all internal wall surfaces in highlighted rooms are highlighted. In cases where walls of a highlighted room are opaque, external surfaces are not highlighted. In addition, where an affordance or space dividing structure is located in a view in front of a highlighted room, the affordance or structure is shown blocking the room's highlighted color. By presenting highlighted rooms in this fashion, a more intuitive 3D VW representation results and glazed walls and opaque walls are clearly discernible in VW representational views.

While the FIG. 6 example only shows actual clearly defined rooms within the overall facility space as being associated with model elements, in at least some embodiments it is contemplated that any volume within the larger VW representation could be assigned its own model element. For instance, volume 17a in FIG. 6 corresponding to the workstation subassembly 17 in FIG. 1 which is located within an open portion of the plan shown could be assigned its own model element and then attributes could be assigned to that volume as if the volume were a room defined by wall and other architectural structures. Unless indicated otherwise, volume defining model elements within a VW representation (e.g., volumetric portions of the VW representation) will be referred to as "room elements" hereafter.

Instead of defining open office volumes as model elements, in other cases individual instances of affordance representations may be treated as model elements so that attributes can be assigned thereto. For instance, again in FIG. 6, the four workstation configuration at 17a may be its own model element with assigned attributes (e.g., capacity, chair types, table types (e.g., stationary or height adjustable), parts lists, cost information, etc.).

In at least some cases it is contemplated that attributes may be associated with affordance types so that when an instance of an affordance type (e.g., an affordance representation) is added to a VW representation, the attributes associated with the affordance representation are assigned to the affordance instance within the VW representation unless changed by a space designer. Thus, for instance, in the case of the four workstation configuration shown at 17a in FIG. 6, assume configuration 17a is an instance of a generic four person workstation type supported by the system where that type has two preassigned attributes, a first attribute specifying that the type has a four person capacity and a second attribute specifying that all workstations include height adjustable tables. Here, if a space designer adds another instance of the four person workstation type to VW representation 100 by dragging an associated affordance representation from an affordance selection tool (now shown) to a location within representation 100 or otherwise specifying a location for the instance, that instance in the VW representation would automatically have the two attributes (e.g., four person capacity and height adjustable tables) associated with the affordance type.

In some cases it is contemplated that where affordance instances have preassigned attributes and an instance is added to a room element in a VW representation, the room element will automatically take on attributes of the affordance instance added to the room element. Thus, for instance, assume a sofa affordance type has a 3 person capacity attribute preassigned to it and that room 123 in FIG. 6 has an 8 person capacity. Assume a space designer moves an instance of the sofa affordance type into room 123 in the VW representation 100. Here, the three person capacity attribute of the sofa would automatically be added to the prior room 123 capacity attribute so that the total capacity value associated with room 123 would increase to 11 (e.g., the original 8 plus 3 associated with the sofa instance). If there were other attributes associated with the sofa, those attributes, in at least some cases, may also be added to the room 123 attributes.

While this is a simple example, many more complex cases are contemplated where affordances may have many attributes and the task of keeping room attributes updated would be burdensome and prone to human error. For instance, in at least some cases a space designer may define other model elements such as an element that corresponds to the entire fourth floor east wing as shown in FIG. 6 (e.g., the entire VW representation 100) so that capacity and other attributes associated with that larger space are definable and trackable. Here, any seating change in the entire representation 100 would result in a modification to the capacity attribute and keeping track of even that simple attribute would be complicated.

In at least some cases it is contemplated that sensors located within a facility space may be able to automatically detect affordances added to different spaces or removed from spaces in the real world and may be able to modify the BIM file to reflect additions and subtractions as well as to add and subtract attributes from VW representation spaces. To this end, see for instance U.S. patent application Ser. No. 16/190,592 (the "'592 application") which has been incorporated by reference in its entirety by reference above which teaches Bluetooth beacons mounted to affordances within a facility space where signals from the beacons are used to identify affordance types and locations within the space. In at least some cases it is contemplated that a system like that described in the '592 application may be used to track affordance locations in the real world and that information would then be added to the BIM file to update space affordances and characteristics automatically as changes are made.

Referring yet again to FIG. 6, while room elements are only assigned to a subset of the spaces (e.g., those colored red, green or blue) that comprise the entire facility illustrated, in other embodiments most if not all of the spaces that include affordances of any type may comprise defined model elements in the VW representation. Thus, for instance, each grouping of workstations or other affordance groupings shown in FIG. 6 and associated 3D volume of space may comprise a separate model element. In still other cases each separate sitting affordance (e.g., chair, sofa, etc.) may comprise a separate model element.

In many cases BIM software is used to plan space layouts during space design activities prior to installing space defining wall structures and affordances. Thus, for instance, a 3D facility representation like representation 100 shown in FIG. 6 may be developed and stored during an initial space design process. In these cases, the VW representation for design activities can be used as a foundational data structure 100 in the disclosed space discovery and wayfinding systems. By leveraging a VW representation developed for a different purpose, system costs associated with development of the disclosed system are minimized.

To track attributes associated with each room element defined within VW representation 100, room specification files 60a-60n include a separate file for each room element that exists within the VM representation. Similarly, where the VW representation 100 defines affordance elements, there may be a separate affordance specification file for each of those elements where affordance attributes are assigned to those elements. In FIG. 2 four exemplary room specification files are labelled 60a, 60b, 60c and 60n. In a real world case there would typically be hundreds or even thousands of room specification files for each building associated with the system. Each of the room specification files 60a-60n stores similar information and is used in a similar fashion and therefore, in the interest of simplifying this description, only exemplary file 60b will be described in detail. In the present example file 60b corresponds to real world room 33 (see again FIG. 1) which is labelled 104 in the FIG. 6 VW.

Referring to FIG. 3, exemplary file 60b includes a room volume specification 65, a room attributes specification 66, a use statistics record 67 and a maintenance ticket record 72 corresponding to associated room 104 (see again FIG. 6). Room volume (i.e., 3D area, not sound level) specification 65 includes information that defines a specific 3D volume within a VW representation 100 as a BIM model element to which attributes are assigned. For instance, in FIG. 6, the volume specification associated with room 104 would define the entire VW 3D volume associated with room 104. Similarly, volume specifications for the rooms labelled 102 and 106 in FIG. 6 would define the VW volumes associated with those rooms, respectively.

Room attributes specification 66 includes data specifying a plurality of attributes that have been assigned to associated room 104 including information 74 specifying affordances located within the room as well as a set of environmental characteristics 76 associated with the room. The exemplary affordances associated with room 104 include a room capacity (e.g., number of seats), if the room includes a MediaScape system, a Virtual Puck system, a telepresence system, electronic whiteboards, a Surface Hub system, and/or a standard whiteboard(s), if the room is equipped to accommodate physically handicapped persons (e.g., is a table top height low enough to accommodate a person in a wheel chair), if the room is equipped with tint control glass so that visual privacy can be controlled, and if the room is open (e.g., exists within an open office plan) or is enclosed by wall or other room defining structure. Many other furniture and content sharing affordances and attributes are contemplated and the examples descried here should not be considered exhaustive.

Exemplary environmental characteristics or attributes associated with room 104 include visual privacy, sound level, foot traffic level, natural light intensity, HVAC white noise level, restroom convenience, refreshment room convenience, supply room convenience, availability of proximate supplemental rooms and user room ratings. At least a subset of the room specific environmental characteristics or attributes may be identified during a commissioning session and stored in a persistent fashion. For instance, convenience with respect to a restroom, a refreshment room and a supply room can be determined once and memorialized persistently for subsequent use.

In at least some cases, temporary sensors may be installed in a room for detecting other environmental characteristics once or over a period of interest and resulting characteristic values may be stored for persistent use. For example, natural light sensors may be temporarily installed in a room to detect natural light level within that the room and a natural light rating may then be stored for that room.

In some cases an environmental characteristic may be time of day and/or time of year dependent and in these cases, sensors may be used to detect a time based characteristic metric and store that dynamic metric with different times. For instance, in the case of natural light, level of natural light in a room varies with time of day and also time of year. Here, time dependent natural light metrics can be generated for an entire day or even a year and stored for use by the system. Similarly, time based sound level and foot traffic metrics may be generated and stored for a typical day.

At least some environmental characteristics will be dynamic. For instance, the available proximate supplemental room(s) characteristic indicates general availability of rooms near a specific room that are available (e.g., unscheduled for use) at any particular time. This characteristic changes as other rooms are scheduled and with respect to current time as rooms are occupied by other users. As another example, in some cases a permanent natural light level sensor may be located in a room to detect and report instantaneous natural light levels in the room (e.g., natural light levels change daily based on cloud cover and other dynamic weather related conditions). Other sensors for sensing current room characteristics are contemplated. Other dynamic environmental characteristics are contemplated.

The user room rating(s) characteristic (see end of list 76 in FIG. 3) is related to user reviews associated with actual room use. While indicated as a single characteristic which may represent an average overall satisfaction rating for a room, in other cases users may rate many different room specific characteristics including, for instance, noise level, affordance effectiveness, visual privacy, light level, acoustics, etc. In some cases user ratings may be used to modify or set one or more of the other environmental characteristic values (e.g., user visual privacy ratings may drive the visual privacy rating shown at the top of the list at 76 in FIG. 3).

Referring again to FIG. 3, use statistics record 67 include room and affordance use attributes that are assigned to associated room 104. Here, the attributes take the form of statistics related to room occupancy rates and affordance use rates when associated room 104 is occupied. The room occupancy statistics include % room use during different time slots during a day. For instance, the exemplary statistics indicate that room 104 is used an average of 12% of the time between 7 and 8 AM on weekdays, 32% between 8 and 9 AM, 28% of the time between 9 and 10 AM, and so on. Here, use means any occupancy irrespective of the number of occupants. Temporal granularity of the average occupancy statistics may vary in other cases.

The affordance use statistics for room 104 indicate average number of persons occupying room 104 when the room is occupied. Thus, as illustrated, on average when room 104 is occupied, 2 people are present in the room. As shown, MediaScape system is used 74% of the time the room is occupied, telepresence 55% of the time the room is occupied, and so on. Many other room occupancy and affordance use statistics are contemplated. For instance, use statistics may further break down the % occupancy statistics to indicate percentages when one person occupies the room, when two people occupy the room, when three people occupy the room, etc. As another instance, another use statistic may be what percentage of time the room is occupied when both MediaScape and telepresence systems are utilized.

In addition to assigning static attributes to model elements, real time sensor values from sensors (e.g., occupancy) located in a real world facility (see again FIG. 1) can be assigned as dynamic attributes. For instance, where an occupancy sensor is located within real world room 33 in FIG. 1, real time occupancy data may be associated with a model element for that space in the VW dataset and used to drive application programs.

Still referring to FIG. 3, maintenance tickets record 72 includes maintenance attributes that are at least temporarily assigned to associated room 104. Here the assigned attributes take the form of open maintenance request tickets (hereinafter "maintenance requests") for room 104 or for affordances within room 104. For instance, ticket 1 may indicate that a telepresence system in room 104 stopped working, a user's perception of the problem with the telepresence system, who submitted the ticket, the time the ticket was submitted (see Time 2 associated with Ticket 2 in FIG. 3), etc. In some cases the system may also store a target time slot during which a ticket should be addressed (e.g., a time during which maintenance associated with the ticket should occur). For instance, see that a target time slot for t2 in FIG. 3 is between 9:50 AM and 10 AM meaning the ticket should ideally be addressed in that time period.

Some tickets may be generated by space users that observe or experience problems within room 104 that need to be addressed and others may be automatically generated by system server 20. For instance, a space user may generate ticket 1 when a telepresence system fails. In other cases, system server 20 (FIG. 1) may automatically generate a cleaning ticket for room 104 along with a target time slot that occurs between meetings in room 104. Thus, for instance, the FIG. 3 time slot 9:50 AM-10:00 AM may be a cleaning type maintenance ticket.

Referring again to FIG. 2, user preferences specification 68 lists a set of user preferences for at least a subset of separate room users (e.g., users for which preferences are known either through a specifying process or through the system learning user preferences over time from use, user room ratings, etc.) indicating space, room and affordance preferences. Here, the preferences listed may include affordance preferences (e.g., chair type, table type, Surface Hub and not MediaScape, tint control glazed walls, etc.), environmental characteristics (e.g., visual privacy, natural light, environmental sound level, etc.) or any other user preferences such as generally preferred building or floor locations, relative convenience to space resources like a supply room, restrooms, refreshment rooms, etc., some of which may be qualified by time of day, day of the week, etc. Thus, a first user may prefer rooms with tint control glazed walls, a Surface Hub system and task chairs near a supply room but remote from restrooms and those preferences would be stored in specification 68 for the first user.

User preferences may be specified by a user during some type of system commissioning procedure in some cases. Where a user does not specify preferences, there may be default preferences specified by the system. In some cases the system may automatically learn a user's preferences over time as the user selects and uses different rooms and affordances within facilities or as the user rates experiences with different rooms or affordances. For instance, if a user routinely selects rooms or affordances that receive substantial natural light and have low noise ratings, the system may automatically generate natural light and noise preferences for that user which are stored in specification 68 for subsequent use.

In FIG. 2, views specification 70 includes information specifying different space views developed to support specific types of users that perform specific tasks within facility space and that require different space related information to facilitate those tasks. Exemplary user types include general space users, facility managers, space designers, IT specialists, janitors, and kitchen employees. Many other user types are contemplated and different space views are contemplated for each of the different user types. The idea here is that different people operating within a facility interact with and experience facility spaces and rooms differently and ideally have access to different types of space related information to facilitate user type specific tasks. For instance, while a general space user searching for a conference room in which to have a meeting may be highly interested in current availability of many differently afforded spaces, a janitor that needs to clean spaces between meetings may only be interested in a next room that needs to be cleaned prior to the start of a next meeting in that room. As another instance, while an IT specialist may be interested in IT maintenance requests for rooms in a large space and may have no interest in space use statistics, a space designer would be interested in space use statistics and may have little interest in IT maintenance requests.

For this reason, in at least some embodiments, different information is added to VW views like view 101 shown in FIG. 6 based on who (e.g., user identity or user type) is accessing the VW representation 100. For example, a system user searching for a conference room to use in real time may be presented with a facility view that color codes all conference rooms red or green indicating occupied/scheduled or unoccupied/unscheduled, respectively. In contrast, a janitor looking for a next room to clean may be presented with a view that highlights only the next room or two that the janitor should clean and that does not include any indication of occupied/scheduled statuses of other facility rooms.

As one other example, an IT specialist that maintains content sharing affordances may be presented with a view that highlights a room where the specialist is next scheduled to repair a teleconference system as well as another room that includes a MediaScape system that does not appear to be working properly and that is currently vacant, again, without showing occupancy/scheduled information for other facility rooms. As another instance, a space designer view may present interface tools for accessing room use as well as affordance use statistics that can be used to develop preferences insights that drive space redesign activities. Many other user type views are contemplated, each view developed to support users of specific types that have specific space related information needs.

Referring again to FIG. 1, in at least some embodiments one or more kiosk or user interface assemblies 40a, 40b are provided at one or more locations within a facility space for use by space users. Kiosks 40a, 40b are typically located within common areas or spaces and often at entry areas to larger facility spaces (e.g., at an elevator location, at an entryway to a floor or a floor wing, within a primary foot travel corridor, etc.) so that they are easily locatable.

Figure 4:
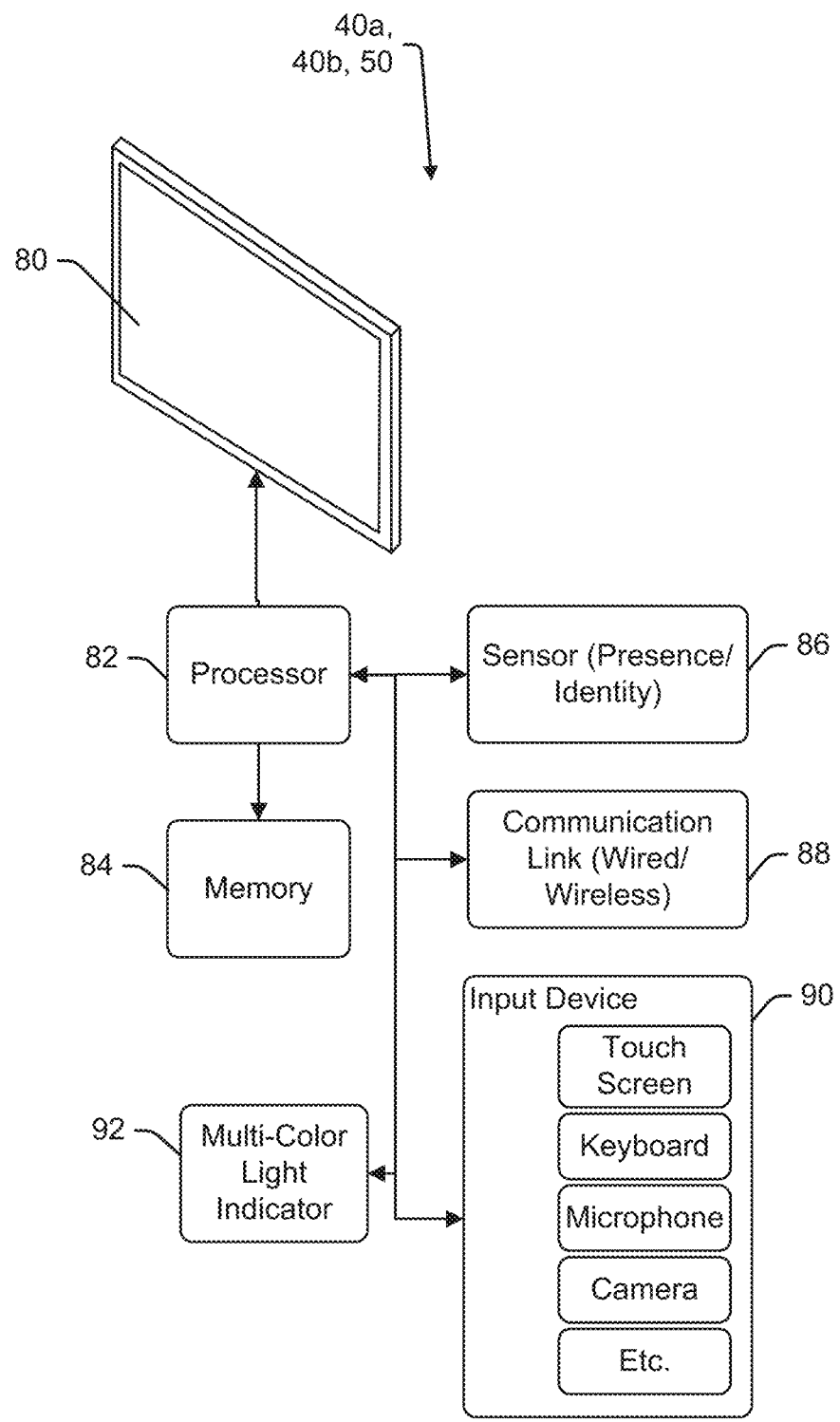
FIG. 4 is a schematic illustrating an exemplary kiosk interface or threshold interface that are consistent with various aspects of the present disclosure.

Referring also to FIG. 4, an exemplary kiosk 40a includes a local memory 84, a communication component or link 88 (e.g., wired or wireless), and a large flat panel display or emissive surface 80a as well as a processor 82 linked to other kiosk components. Processor 82 is linked to system server 20 (see again FIG. 1) for two way communication therewith.

In at least some embodiments display 80a may have width dimensions within a range between 2 feet and 6 feet and a height dimension within a range between 2 feet and 6 feet so that relatively large VW representations (e.g., see again 100 in FIG. 6) can be presented to a kiosk user. Large and high resolution presentation of the VW representations is important as the amount of detail in a wing or floor representation can be appreciable and more detail provides a richer informational experience to users that informs user preferences. For example, at a minimum, a typical user (e.g., with typical sight capabilities) should be able to view the space and affordances that are presented in viewing space 120 with sufficient detail that the user can distinguish individual chairs or other seating units when views of those units are not blocked by representations of other affordances or opaque space dividing structures in the view. In some cases this means that the minimum viewed dimension (e.g., height in side view, width in top view, etc.) of a typical chair presented in a view, for instance, may be one thirty second of an inch, one sixteenth of an inch, one eighth of an inch or one quarter of an inch. The minimum dimension will also be a function of the resolution of the display screen 80 so that higher resolution screens may be able to present affordances with smaller viewable dimensions. In cases where views are presented on extremely high resolution display screens like those currently available on portable computing devices, the minimum viewed dimensions may be substantially smaller (e.g., 1/100th of an inch or less). The idea here is that at least seat assemblies and perhaps general seat assembly features should be distinguishable within room elements in VW views so that a general space user can quickly assess, among other things, different room capacities in a glanceable fashion for any room represented in a view.

In some cases kiosk 40*a* may also include a presence sensor 86 or may at least have access to data that can be used to determine if a user is present/proximate the kiosk (e.g., from a camera in the general area of the kiosk, from a presence sensor proximate the kiosk, etc.). In addition, in some cases the sensor 86 may be able to identify a user's identity, either personal identity or user type (e.g., general space user, IT specialist, janitor, space designer, etc.). In this regard, information from a user's smart phone, a user's security badge or some other portable device may be obtained by sensor 86 to detect user identity and/or user type.

Kiosk 40*a* also includes some type of user input interface so that a user can interact with information and interface tools presented on display screen 80*a*. For instance, the interface may include a touch sensor integrated into the display screen 80*a* to recognize different types of user contacts and gestures on the face of the display 80*a*.

Throughout the figures, a hand icon 169 (see FIG. 6) is used to indicate a user touching the emissive surface of a display. In other cases the interface may be able to detect user gestures in front of the display 80*a* in a gesture sensing field that do not require a user to touch the display surface to avoid wear and tear on display 80 and to avoid dirt and other types of display contamination. Other interface types are contemplated.

Referring yet again to FIG. 1, in some embodiments other interface devices such as threshold interfaces 50 may be provided at different locations within a facility to perform all or a subset of the functions that are performed via kiosk 40*a*. Here, in at least some cases the threshold interfaces 50 will have a substantially smaller display screen (e.g., a width range between 4 inches and one foot and a height range between 4 inches and one foot), will typically have a higher resolution than display 80*a*, and will typically be located at a room egress or in proximity to a specific affordance (e.g., a workstation) within an open office plan. In some cases a separate threshold interface 50 will be provided outside each conference room or other reservable or schedulable space within a facility. In cases where separate workstations are reservable or schedulable, a separate threshold interface 50 may be provided at each of those affordances. Each threshold interface 50 may have components akin to those described above in the context of exemplary kiosk 40*a* and as shown in FIG. 4.

In addition, each threshold may include an indicator device such as, for instance, a multicolor LED light indicator or the like 92 that is controllable by processor 82 to generate any of several different colors of illumination to indicate different states as described hereafter. The indicator light should be clearly viewable by users proximate interface 50 as well as located at a distance (e.g., down a hallway) therefrom when other facility structures and affordances do not block a remote user's view.

In at least some embodiments it is contemplated that space users may carry portable communication devices like smart phones, tablet computing devices, laptops or even wearable devices such as smart glasses or the like where VW representations and system interface tools may be presented to the user via one of those device types.

Referring again to FIG. 1, a plurality of sensor devices collectively represented by numeral 30 are installed within facility 14 rooms and other spaces and a similar set of sensor devices would likewise be installed in other facility wings and floor spaces. In some cases sensors 30 include only a few simple sensor devices such as for instance, occupancy sensors 30*a* (see occupancy reading at 19 in FIG. 6) for sensing occupancy of rooms in which the sensors are installed, foot traffic volume through corridors, hallways, or open spaces, etc. In some cases there may be one occupancy sensor in each defined room within wing 14. In other cases there may be a plurality of occupancy sensors in each room so that redundant occupancy sensing can occur. In still other cases it is contemplated that there may be occupancy sensors integrated into or otherwise associated with each chair within a room, each chair in each defined space or each chair or other seating affordance located within wing 14 so that seat occupancy can be determined for a set or for each seating affordance in wing 14.

In some cases cameras 30*b* or presence sensors may be used as occupancy sensors within spaces. In addition to being used to detect occupancy, camera images or data from other occupancy sensors in rooms may also be processed by a system server (see 20 in FIG. 1) to generate other information like space count (e.g., number of people located within a room), locations and orientations of people within rooms and relative juxtapositions of people within rooms and relative to affordances within those spaces. Cameras and other sensors 30 may also generate data useable to determine identities or types (e.g., IT specialist, space user, janitor, etc.) of people within facility rooms.

Referring yet again to FIG. 1, sensors 30 may also include wireless access points 30*c* for receiving and transmitting wireless information from and to portable or wirelessly afforded devices within facility spaces. Thus, for instance, communication with kiosks 40*a* and 40*b* or threshold interfaces 50 may be wireless via access points. In some cases personal portable devices (e.g., smart phones or the like) may be carried by space users and may communicate with the access points to identify associated space users and signals therefrom may also be used to identify device and hence associated device user location within the facility.

Sensors 30 may also include acoustic (e.g., sound) sensors, light (e.g., natural or device generated) intensity sensors, airflow sensors, temperature sensors, humidity sensors, odor sensors, activity sensors, etc., placed in different spaces or throughout a facility for generating environmental characteristic information at specific locations throughout the facility spaces.

Still other sensors may detect affordance use within rooms or generate information that can be used by server 20 to determine when room resources are used. For instance, in some cases when a telepresence system is used within a room, the telepresence system itself may operate as a sensor and generate a signal transmitted to server 20 indicating telepresence system use. In other cases, a camera within a room may operate as a sensor to generate images from which server 20 can detect when a telepresence system is used. Here, the images may simply capture when are remote user's image is presented on a system display screen and assume system use at those times. Any environmental characteristics sensed or any affordance utilization information generated may be used to modify the use statistics 67 and the environmental characteristic information 76 for the room as shown in FIG. 3.

In still other cases it is contemplated that sensor information may be useable to automatically determine when room affordances malfunction or need maintenance for other reasons. For instance, where a user attempts to initiate a telepresence session in a space but fails to do so because the system malfunctions, server 20 may be programmed to automatically assume telepresence malfunction and may automatically generate a maintenance ticket for the room and system located therein. Here, the ticket may include a record of what the user did while attempting to use the telepresence system or the point in system operation at which the system failed as an aid to an IT specialist attempting to address the failure.

In some cases the system may enforce a hysteretic delay in generating certain types of maintenance tickets such as, for instance, requiring two different users to consecutively fail session initiation with a single telepresence system. In some cases a telepresence system or other content sharing affordance itself may track failed attempts and transmit a ticket initiation signal to serer 20 which is stored as a maintenance ticket attribute (see again 72 in FIG. 3) for the associated space. In other cases, a camera or other sensor(s) in a space may generate information useable by server 20 to identify failed telepresence initiation attempts or other malfunctions and the server may generate appropriate maintenance tickets as needed. For instance, server 20 may run simple artificial intelligence programs that apply a small set of rules to camera images obtained in a room to determine that a user attempted but failed to initiate a telepresence session and may generate a ticket pursuant thereto.

Referring now to FIG. 5, an exemplary screen shot 130 that may be presented on a kiosk display screen 80 that is consistent with at least some aspects of the present disclosure is illustrated. In the interest of simplifying this description screen shot 130 and other screen shots shown in subsequent figures will be referred to generally as "interfaces" unless indicated otherwise. Interface 130 divides a screen face into a plurality of different fields including a current view field 132, a facility hierarchy field 133, a space list field 134, a viewing field 120 and an interface tools field 136.

Referring still to FIG. 5, a view 99 of the VW 3D dataset or VW representation 36 (FIG. 2) associated with the fourth floor east wing space shown in FIG. 1 is presented in viewing field 120. View 99 is generally a downward perspective view and therefore has an appearance that is similar to a 2D view of the facility shown. The perspective angle and elevation of view 99 can be changed using a perspective control icon 150. For instance, in some cases a user can touch icon 150 and move that icon about within viewing field 120 to change elevation and viewing angle. In this regard, compare the FIGS. 5 and 6 facility views where icon 150 has been moved downward from the FIG. 5 view to the FIG. 6 view causing the elevation angle to change so that the view changes from 99 in FIG. 5 to view 101 in FIG. 6. Also, compare the FIGS. 6 and 7 views where icon 150 has been moved to the right from the FIG. 6 view to the FIG. 7 view causing the side view angle to change so that the view changes from 101 in FIG. 6 to view 103 in FIG. 7. Icon 150 can be moved to other viewing field locations to change perspectives and develop a detailed sense of rooms and affordances within the represented facility space. FIG. 6 shows an elevation north looking perspective view, FIG. 7 shows an elevation northwest looking perspective view, FIG. 8 shows an elevation south looking view, FIG. 9 shows an elevation east looking view and FIG. 10 shows an elevation west looking view. In the present example it is assumed that a system user is located at location 160 which corresponds to the location of a kiosk 40a in the FIG. 5 view 99. Hereinafter, unless indicated otherwise, user location in a view will be indicated by a dark pin icon 160 with a "U" label. Icon 160 helps orient the user to her position within a facility view 99.

Referring again to FIG. 6, in at least some embodiments, server 20 will track user location within a facility and specifically when the user is viewing a kiosk display screen and will default to presenting a space view via the kiosk that is best aligned with the location and orientation of the kiosk in the real world. Thus, in FIG. 6 where kiosk display 80a is located and oriented in the real world as illustrated (e.g., facing south), the default view with the user facing north will be an elevation view facing north. Similarly, in FIG. 10 where a second kiosk display 80b is located and oriented in the real world as illustrated (e.g., facing east), the default view with the user facing west will be an elevation view facing west. In each case, again, a user will be able to change the angle and elevation of their view via icon 150, but the system will always revert back to the default view that is best aligned with kiosk location in the real world. In some cases reversion back to a home view aligned with the real world location and orientation of the kiosk will happen shortly after a user leaves a location (e.g., a sensing zone) in front of a kiosk so that when a new user enters the zone, the aligned home view is presented. In other cases, the system may require a user to select home button 147 to cause server 20 to revert back to the home view.

Referring still to FIG. 5, current view field presents information indicating a current facility view that is presented within viewing field 120. To this end, in the illustrated example, the current view field indicates "San Francisco, Building 1, 4th Floor, East" to indicate that view 99 corresponds to the fourth floor in building 1. A compass icon 137 is also provided in the upper right hand corner of viewing field 120 to indicate a current viewing direction corresponding to the view in 9 in space 120. As shown by icon 137, north is upward in view 99.

Facility hierarchy field 133 and space list field 134 operate together. Hierarchy field 133 includes a facilities granularity selection tool that enables a user to select any one of region, location, space or room options to move within the system dataset to access different levels of facility and space related information. For instance, in FIG. 5, the "Room" option is shown selected (e.g., highlighted in left up to right cross section) so that room options for the facility indicated in field 132 are presented within space list field 134. If a user were to select the "Space" option (e.g., via a touch gesture or otherwise) within field 133, the system would jump up one level in the facilities hierarchy and present a list of larger spaces (e.g., floors, wings, etc.) in space list field 134 for a user to select from. Similarly, if the user were to select "Location" option (e.g., via a touch gesture or otherwise) within field 133, the system would jump up another level in the facilities hierarchy and present a list of the buildings in the San Francisco region (e.g., see 12a through 12n in FIG. 1) in space list field 134 for a user to select from. If the user were to select the "Region" option (e.g., via a touch gesture or otherwise) within field 133, the system would jump up yet one more level in the facilities hierarchy and present a list of regions where enterprise buildings exist including San Francisco in list field 134 for a user to select from. Field 134 is shown to include scrolling arrows 138 and 139 that are useable to scroll through list options in cases where the entire list of spaces at any level cannot be presented via interface 130 at the same time.

In FIG. 5, space list field 134 includes a separate selectable icon for each room included in the list. To this end, see for instance icon 154 for room SF-BB4E-002 that corresponds to room 104 in view 99. In at least some cases icon 154 is selectable to access information in a pull down window or other data construct that is related to associated room 104. For instance, any of the attributes in records 66, 67 or 72 in FIG. 3 may be presented to a user upon selection of icon 154 in at least some cases.

When one of the icons in list field 134 is selected, the selected icon and associated room in view 140 may be highlighted or otherwise visually distinguished so that the user has a spatial understanding of which room any presented information is associated with. Each room icon in field 134 has a circular availability indicating field (e.g., see 280 in FIG. 5) that indicates if the room associated with the icon is currently available or currently occupied. Left up to right cross hatching indicates a red color and an occupied room while double diagonal cross hatching (see field 280) indicates a green color and an available room.

In at least some embodiments rooms of special and specific types or other affordances within facility views will be color coded to indicate locations of those rooms within the views. For instance, in FIG. 6, supply rooms are colored blue to clearly distinguish those rooms from other rooms in the view. While not shown, other special rooms that may be specially colored include restrooms, refreshment rooms, kitchens, cafeterias, storage rooms, walk in closets, etc. In some cases different enterprise departments may also be color coded such as, for example, IT, legal, engineering, human resources, specific project teams, etc.

In addition to being able to change the elevation and angle of viewing, the system also enables a user to zoom in on a 3D VW representation presented in field 120 to see space and affordance details. Zooming may be initiated via a two finger touch and expanding gesture on the kiosk display screen as known in the computer interface arts or via some other type of input device. In other cases a user may be able to select (e.g., double tap) a room in a presented view causing the system to zoom in on that room to an optimal degree and to change perspective with respect to the room (e.g., change from west looking in a zoomed out view to north looking in a zoomed in view) so that the view of the room is optimized given room orientation, locations of other facility features (e.g., opaque walls or affordances that may block portions of some views of the room), affordances that are located within the room, and affordance juxtapositions (e.g., room locations and orientations; e.g., so that all tables, seating units, content sharing affordances and other interesting features of the room are visible).

Figure 11:
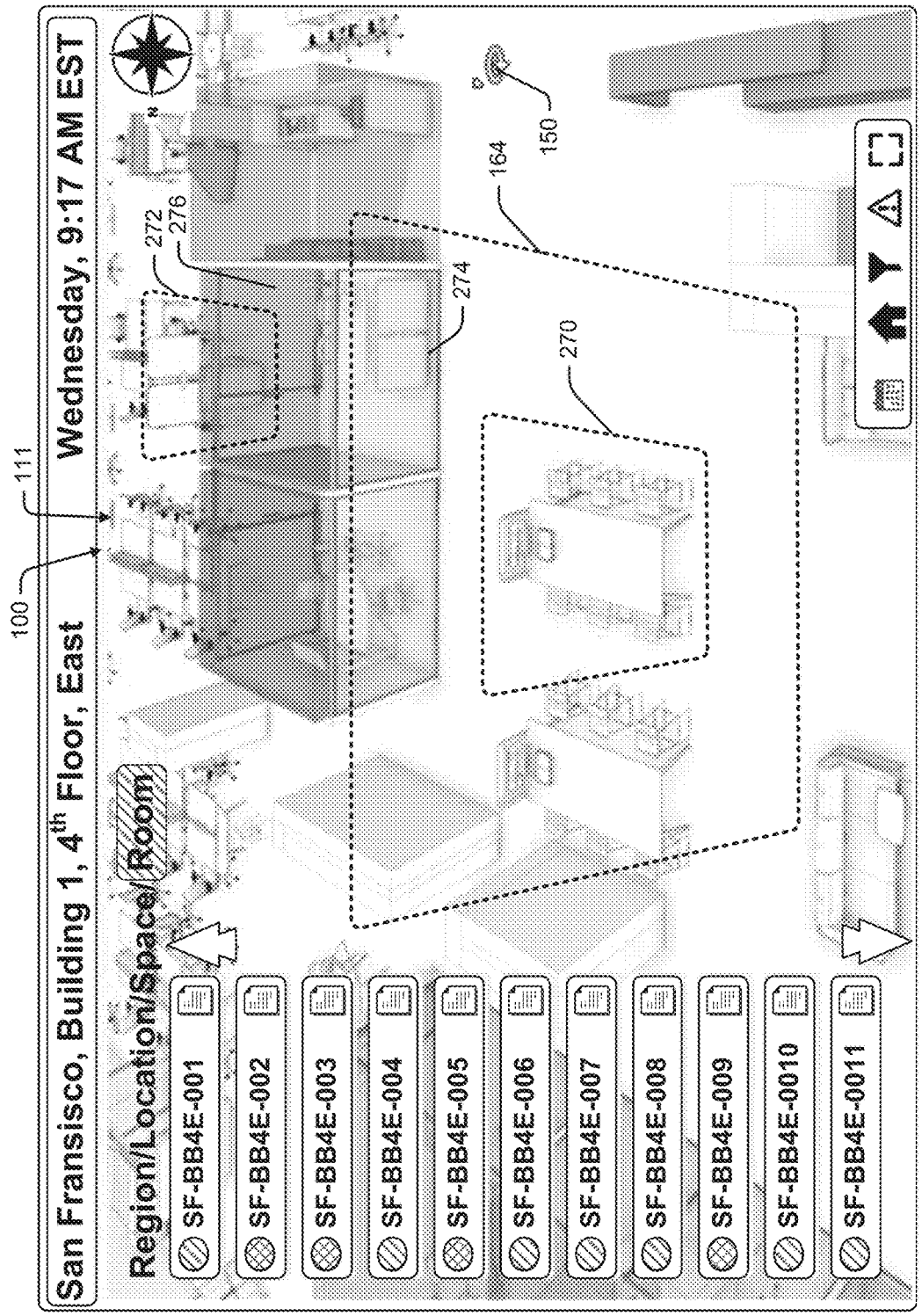
FIG. 11 is similar to FIG. 5, albeit showing a different screen shot with a different view of a VW representation that is zoomed in on a subfield of the representation shown in FIG. 10.
Figure 12:
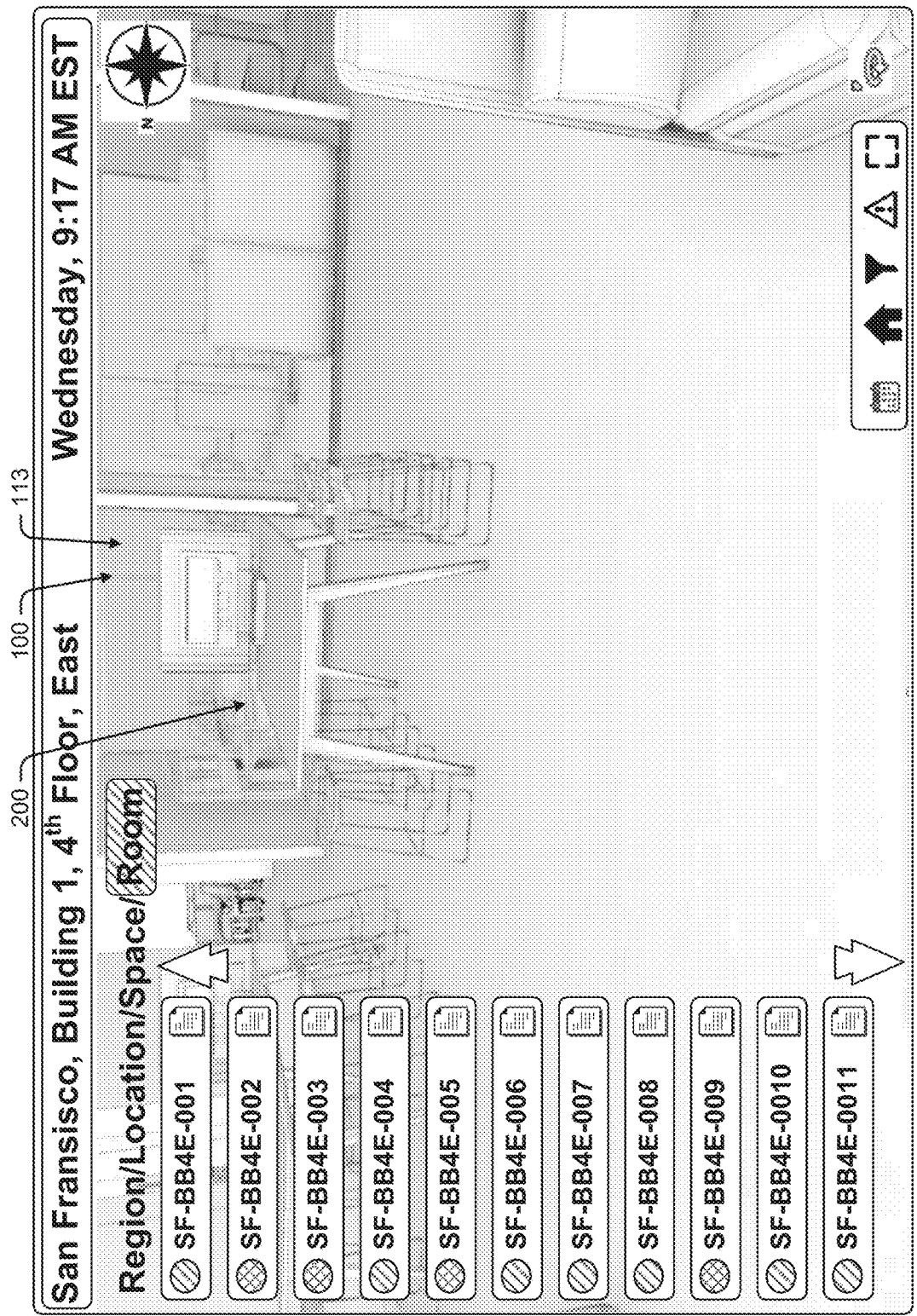
FIG. 12 is similar to FIG. 5, albeit showing a different screen shot with a different view of a VW representation that is zoomed in on a subfield of the representation shown in FIG. 11.
Figure 13:
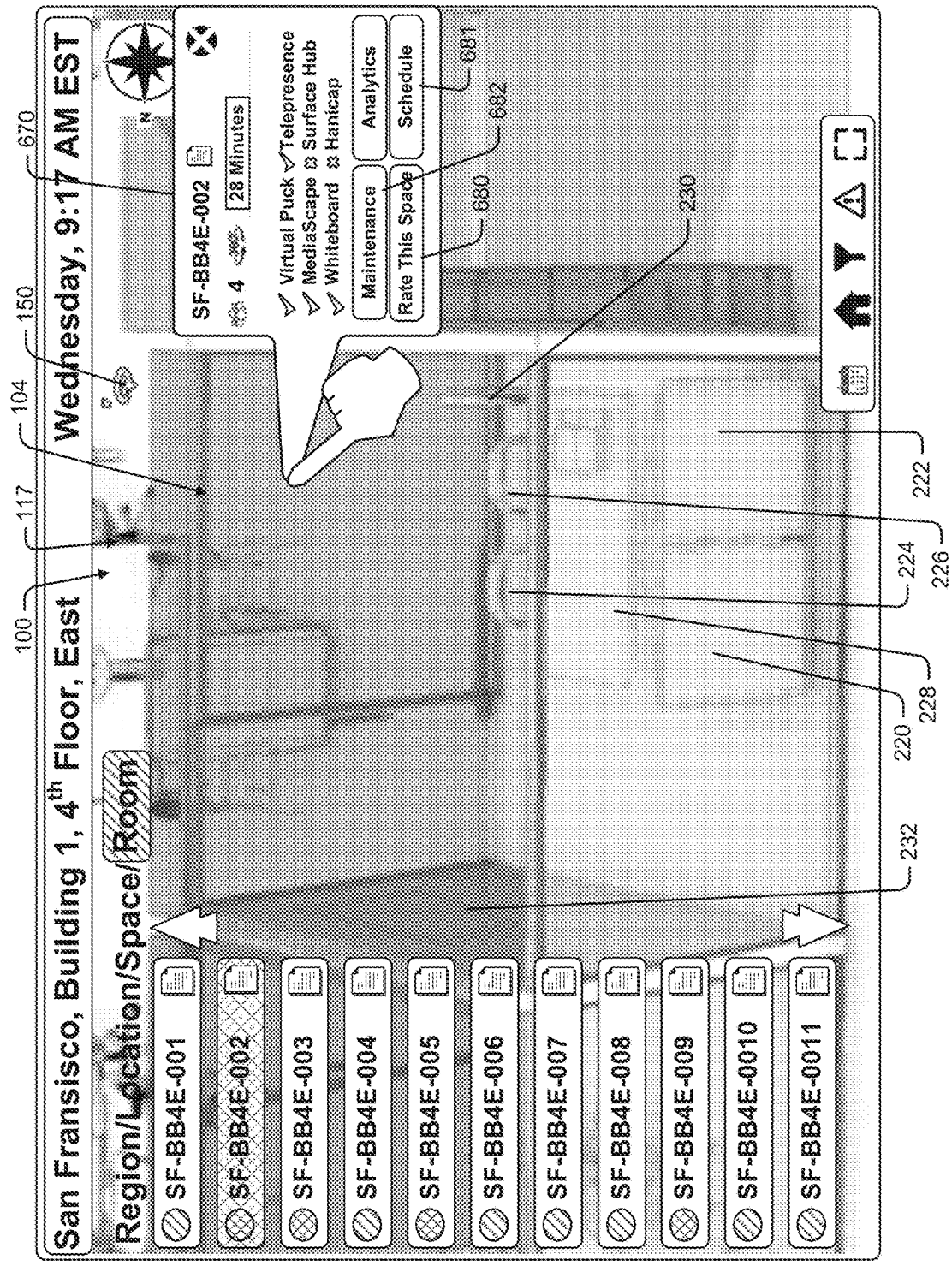
FIG. 13 is similar to FIG. 5, albeit showing a different screen shot with a different view of a VW representation that is zoomed in on a subfield corresponding essentially to a single room in the representation.

FIG. 11 shows a zoomed in view corresponding to the FOV indicated by the dashed box 162 shown in FIG. 9. The result of further zooming action into the area indicated by dashed box 164 in FIG. 11 is shown in FIG. 12 and still further zooming is shown in FIG. 13. Studying the progression of zoomed images shown in FIGS. 9, 11, 12 and 13, it should be understood that the 3D VW voxel based representation of real world facilities enables a kiosk or threshold interface user to zoom in at any location within a VW representation to assume perspectives that are literally immersed within the 3D VW representation. For instance, in FIG. 12 it should be appreciated that the perspective shown is from a location among space affordances as if the user is present within the VW view.

While VW immersive views of space where room states are color coded enable a user to determine room availability states, these views impart much more information that informs space choices in ways that are not possible using other known space search tools. To this end, while other space search tools may indicate capacity and IT affordances associated with a room 104, the immersive interface offers much more information a user can visually perceive and use to select preferred space/rooms/affordances. For instance, a user viewing space 104 in the zoomed in FIG. 13 view 117 can understand (i) seating types (e.g., task, lounge, sofa, etc.), (ii) seating arrangements and (iii) rearrangement capabilities, (iv) table types (e.g., stationary, height adjustable, etc.) and (v) rearrangement capabilities, (vi) IT affordance locations and (vii) juxtapositions within a room, (viii) enclosure characteristics (e.g., opaque walls, transparent walls, tint controllable walls, etc.), (ix) juxtapositions of seating, tables and other affordances within a room and (x) relative to transparent or tint controlled walls, etc.

In addition and importantly, a user can perceive all of these space attributes and more in a glanceable and essentially intuitive fashion. In this regard, consider the complexity associated with clearly describing all of features (i) through (x) and more in some cases in text or list format and then presenting that text description to a user via an interface. In addition, consider the complexity of consuming that text or list description when a user encounters the description via an interface. Instead, a simple glance at space 104 as shown in FIG. 13 yields all of this information and more. The 3D representation is like a different, more intuitive and more informative language than text.

Referring to FIG. 11, consider view 111 where affordance sets 270 and 272 can be seen outside opposite glazed side walls 274 and 276, respectively, so a user can quickly surmise what it would be like to have people using those adjacent spaces and viewable through the glazed walls. Again, textually describing and conveying effects of affordances outside glazed walls would be extremely difficult.

See also in FIG. 11 that the user can see each of rooms 102 and 104 and can compare affordances in each of those spaces (e.g., different seating types) and can draw quick conclusions on which of those rooms would be preferred. In contrast, assessing differences between two room affordance sets or other attributes via text descriptions would be difficult. See also in the interface figures generally that locations of specially colored rooms or affordances (e.g., the blue supply rooms) relative to conference rooms are easy to see and so preferences related thereto can be quickly and glanceably discerned.

Referring again to FIG. 5, tools field 136 includes a set of tool icons that are selectable (e.g., via a touch double tap or the like) to either manipulate presentation of information on the interface or to access application programs for performing different tasks. A scheduling icon 14 is selectable to access space scheduling information and, in at least some cases, to schedule current or future use of rooms/affordances presented in viewing field 120.

A home icon 147 is selectable to return to the default or "home" view of a facility VW representation (e.g., see the north facing elevation view in FIG. 6 that is best aligned with the location and orientation of kiosk display 80a and the west facing elevation view in FIG. 10 that is best aligned with the location and orientation of the second kiosk display 80b).

Filter icon 149 is selectable to access filter capabilities enabling a user to search a facility for rooms or other spaces that meet user specified criteria. For instance, in at least some cases a user may be able to specify all rooms having an integrated Surface Hub system causing server 20 to identify those rooms and highlight or otherwise visually distinguish those rooms in the VW representation.

Maintenance icon 151 is selectable by a user to generate a maintenance ticket or request for a room or other space.

Figure 14:
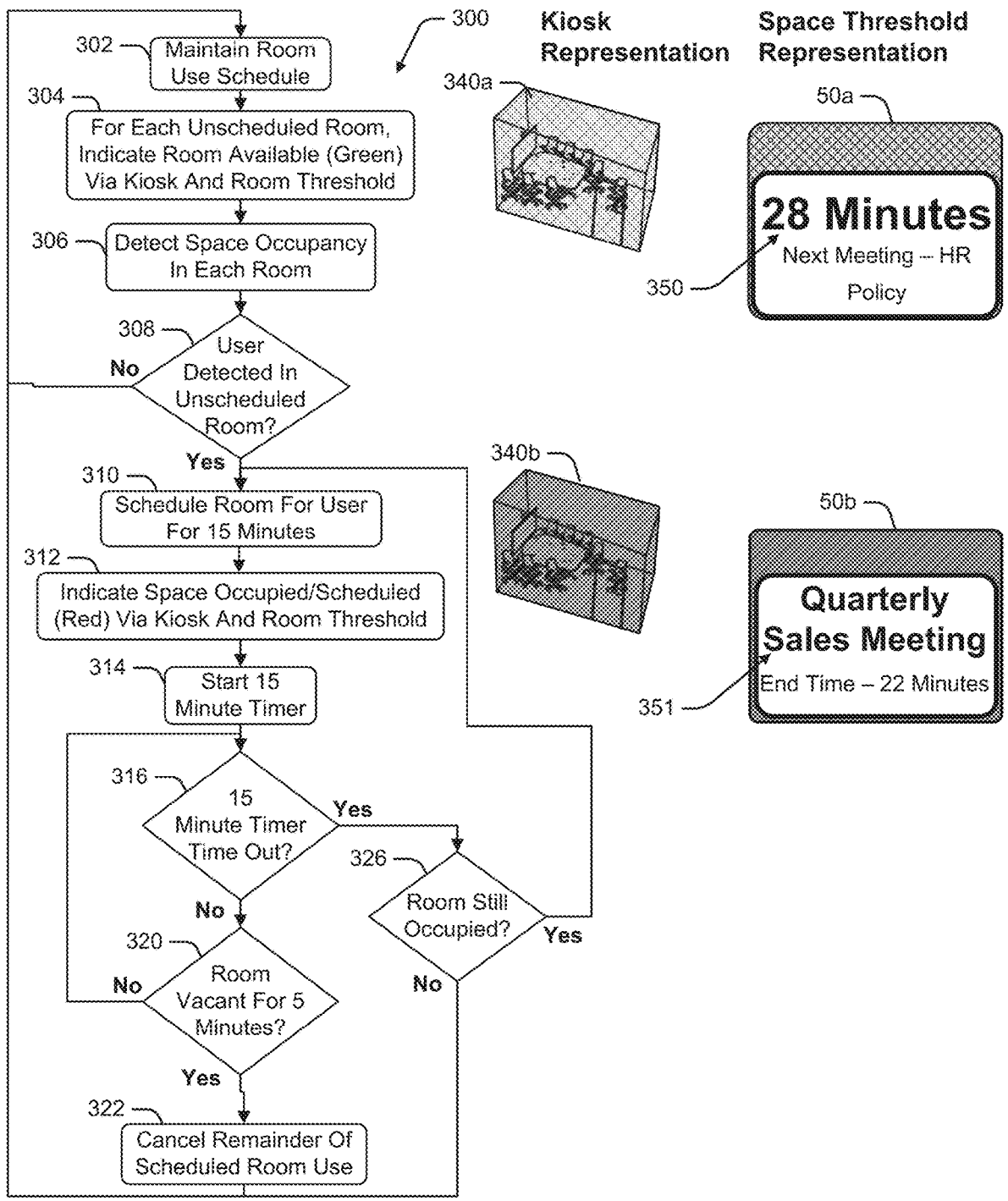
FIG. 14 is a flow chart that illustrates a process or method that for scheduling space use and indicating scheduled use that is consistent with at last some aspects of the present disclosure.

Full view icon 153 is selectable to increase the size of the viewing field 120 to include essentially the entire face of a kiosk display screen 80*a* (see FIG. 14, for instance).

As described above, different people will use the disclosed space viewing and information system differently to view different information types and to use different system applications. Hereafter several exemplary system operations that will be useful to different typed of system users and how the system supports those user are described.

Space Finding

1. General System User Looking for Space to Use

Referring again to FIG. 6, in at least some cases threshold interfaces 50 may be provided outside each room associated with one of the room elements (e.g., 102, 104, etc.) in the VW representation. According to one aspect of the present disclosure, server 20 may monitor instantaneous use of each room associated with one of the VW representation room elements and simply change the colored light indicators on each of the threshold interfaces 50 to indicate red or green when an associated room is currently occupied and currently unoccupied. Here, if a user looking for a room to use enters a room associated with a green illuminated interface indicator, a presence or occupancy detector may detect the user in the space and server 20 may automatically reserve that room for that user for an initial duration (e.g., 15 minutes) and change the interface indicator color to red. At the end of the initial reserved duration, server 20 may automatically extend the reserved period for another short duration (e.g., an additional 15 minutes) assuming the room is not reserved for use by some other user during the extended period. This processes of continuing to increase a reserved duration may continue until a next extension would conflict with a different user's reserved use or the space is unoccupied. When a conflict occurs, server 20 may provide some type of indication to the user in a room that they need to seek a different room to avoid the conflict. For instance, the other indication may be an audible indication, a message presented on a display screen within the room, where a user's identity and contact information is known, an e-mail of text message to a device associated with the user's contact information, etc.

Referring to FIG. 6, while room threshold interface 50 indicators outside each room indicate current occupied or unoccupied states, server 20 may automatically control the appearances of representations of the related rooms on VW representation 100 presented on the facility kiosks 40*a*, 40*b*, etc., to show similar color coded states. For instance, where the threshold interface indicator for room 104 is green, room 104 in view 101 would likewise be highlighted green and where a threshold interface indicator outside room 102 is red, room 102 in view 101 would likewise be highlighted red. Thus, one way for a user that is searching for a room to use and that arrives at kiosk 40*a* to get a general sense of where in the east wing of the fourth floor a suitable room may be available is to quickly look at kiosk display 80*a* and see representation 100 without more. Recognizing room 104 is colored green and therefore is available, the user can simply travel to that space and enter that room to reserve it without more. Here, the idea is that a user can get a general sense of a room she likes including general size, affordances, location relative to other resources (e.g., restrooms, supply rooms, etc.), etc., and then physically walk to that space to experience the space in person prior to scheduling use. If the user passes by another room associated with a green colored threshold interface indicator, the user may find that room appealing and may simply enter that room to initiate use thereof automatically.

FIG. 14 illustrates a process 300 that is consistent with the space finding and scheduling process described above. Appearances of a room on a kiosk interface representation are shown at 340*a* and 340*b* at different times to indicate different occupancy states. Similarly, threshold interface indicator coloring is shown at 50*a* and 50*b* at the times corresponding to room appearances 340*a* and 340*b*, respectively, where double cross hatching indicates green and left up to right hatching indicates red. At initial process step 302, a room use schedule if maintained for a plurality of rooms represented in a VW representation 100 that is presented via the kiosk displays in a space (see again the FIG. 6 representation 100). At process block 304, for each instantaneously unscheduled room, the room is highlighted green to indicate an available status. In addition, for each unscheduled room, the threshold interface indicator is also colored green to indicate available status (see 50*a* in FIG. 14).

At block 306, space occupancy is detected in each room. At decision block 308, if a room remains unoccupied, control passes back up to block 302 where the process described above continues to cycle. If a user enters a previously unoccupied room, at block 308 control passes to block 310 where the room is scheduled for use for a short duration (e.g., 15 minutes) and at block 312 the room representation for the newly occupied room is changed from green to red to indicate a current occupied or scheduled status. In addition, the threshold interface indicator is colored red to indicate unavailable status (see 50*b* in FIG. 14). In other cases the server 20 may present an option to a user entering an unoccupied space offering the room for use and the space indicators may only change to indicate an occupied state (e.g., red) once the user accepts the offer or if the user does not reject the offer within some threshold duration of time.

Continuing, at block 314 a 15 minute timer is started to time out the scheduled period for the room and control passes to decision block 316 where server 20 monitors the timer value. While the timer is counting down, control passes to block 320 where server 20 continues to monitor the room for occupancy. At block 320, if the room is unoccupied for 5 minutes, control passes to block 322 where the remainder of the scheduled period for the room is cancelled and then control passes back up to block 302 where the process continues to cycle and the room representation and interface indicator are reset to green colors to indicate availability. If the room remains occupied (e.g., is not vacant for at least 5 minutes at block 320), control continues to loop back up to block 316 where the timer value is monitored.

Referring still to FIG. 14, at block 316, once the timer times out, control passes to block 326 wherein server 20 determines if the room remains occupied. If the space is not occupied at block 326, control passes back up to block 302 where the process continues to cycle as described above, again, changing the room representation and interface indicator to green colors to indicate availability. At block 326, if the room remains occupied, control passes back up to block 310 where the room is scheduled for another 15 minute duration.

Variations on process 300 are contemplated such as, for instance, restarting the 15 minute timer prior to the end of a 15 minute period (e.g., after 10 minutes of a prior 15 minute duration), resetting a shorter or longer duration for an extended occupancy period (e.g., shorter or longer than the original 15 minute duration), etc. As another variation, even unoccupied spaces that are scheduled to be occupied imminently may be considered occupied for the purposes of coloring room representations of kiosks as well as threshold interface indicators to avoid a user entering a space that will be occupied by another in a short time. For instance, if a space is scheduled for use within the next 20 minutes, that space may be considered occupied and unavailable and therefore may be indicated as red throughout the system.

In at least some cases it is contemplated that the threshold display screen may present different information types at different times and in different sizes so that users searching for space to use are presented with optimized information for assessing if they should occupy a space. To this end, a primary consideration when assessing if a space should be temporarily occupied for some activity is how long the space is available for. For example, if a user thinks he needs a space for 25 minutes, if a first space is only available for 20 minutes but a second space is available for an hour, all other things being equal, the user should select the second space. In this example, while other space and scheduling related information may also be presented on a threshold interface screen, in at least some embodiments a time available indication may be presented in a large format that should be easy to see from a remote distance (e.g., 8-25 feet away). In this regard, see threshold interface 50a in FIG. 14 where a time available indicator 350 is shown in bold large font (e.g., ½ inch to 3 inches tall depending on interface screen size) while other information is shown in a smaller non-bolded font. Thus, here, a user seeking a room and walking generally in the vicinity of interface 50a can quickly surmise if the time available will meet her needs by viewing the large available time indication on the threshold interface.

Once a room is occupied or is considered occupied (e.g., within a short time of a scheduled occupancy), the server may change the threshold interface information to again provide optimized information more prevalently than other information types so that information can be consumed from remote distances. For instance, after a meeting starts in a space, server 20 may switch over to presenting a title for the meeting in large bold print (see 351 in FIG. 14) with other information in smaller font and non-bold so that passersby know which meeting is currently in progress. Here, meeting identity is more important than timing when the meeting starts and therefore is provided for distant viewing. Near the end of an ongoing meeting, server 20 may automatically switch to presenting a scheduled end time for the meeting in large bold font (not illustrated) so others considering use of that space have a sense of when the space may be available.

Referring again to FIG. 6, in at least some embodiments time available indicators or tags may be associated with each green or available room shown on VW representation 100. To this end, see exemplary hovering tags 360 and 362 indicating 28 minutes and 99 minutes of availability for associated rooms, respectively. In some cases availability tags may be presented for each of the green colored available rooms on representation 100. In some cases remaining scheduled use duration tags akin to the availability tags 360 and 362 may be presented for all or some (e.g., rooms where meetings are nearing an end (e.g., ending in next 5 minutes) of the red colored unavailable rooms on representation 100.

In FIG. 6, in addition to presenting the time available, tag 360 also presents a selectable "Schedule" icon 364 which is selectable to schedule either current or future use of the associated room 104. In some cases when icon 364 is selected, a scheduling window including scheduling tools will open up on the kiosk display. In other cases when icon 364 is selected, the selection will result in immediate scheduling of the associated space 104 for current use. Thus, for instance, in FIG. 6 if a user selects icon 364, room 104 would be scheduled for immediate use by that user for at least a portion of the 28 minute availability of that room. For example, selection of icon 364 may cause space 104 to be reserved for the entire 28 minutes of current availability or any portion thereof. In at least some cases, once reserved for immediate use, all system indicators will indicate that room 104 is occupied even though it will take some time for the user to travel to and occupy room 104. Thus, for instance, once the user selects icon 364, room 104 on representation 100 would be colored red and the indicator light on threshold interface 50 would also be colored red.

When a space is selected for immediate/current use via a kiosk, in most cases the user will travel to that space shortly after selecting scheduling icon 364. For this reason, while room 104 may be reserved for the entire 28 minute current availability period, server 20 may start tracking a travel timer so that if the user does not arrive at room 364 within the duration of the travel timer, room 104 is again released for others to use. Thus, in some cases once the user selects icon 364, server 20 will initiate count down of a 10 minute travel timer and if the room 104 is not occupied prior to that timer timing out, server 20 will release room 104 for others to use. In at least some cases once icon 364 is selected, kiosk 40a will provide a message to the user that the space should be occupied within 10 minutes or else it will be released for general use for the remainder of the current availability period.

In at least some cases when tags or indicator fields in addition to space representation 100 are provided in the viewing field 120, the tags may be presented at locations that do not or that only minimally obscure viewing of VW representation information. For instance, see in FIG. 6 that the tags 360 and 363 are presented at locations that are spaced above representation 100 with thin finger members extending to associated spaces where the finger members minimally restrict viewing of representation information. While tags above the VW representation 100 are preferred, in other cases where tags are too large or there are too many tags to be presented completely above the representation 100, the tags may overlap parts of the representation 100. In these cases, preferably, the tags are presented in areas where they only block portions of the VW representation other than reservable spaces (e.g., other than the colored rooms in representation 100 in FIG. 6). In this regard, see the % use tags shown in FIG. 30 that are described hereafter, where each tag is located so that it does not obscure a view of any of the colored rooms in representation 100. At a minimum, whenever possible, if a user selects a specific room in a representation for viewing additional room information in a tag, the tag should be located such that it does not obscure a view of the selected room so that the user can perceive all visible characteristics of the room that may affect a user's preferences.

In cases where tags are assigned to rooms in a representation 100, as the current view of that representation is changed by changing the viewing angle and/or elevation, the tags in at least some embodiments will rotate so that they continue to be fully observable within the new view. In these cases, as the view changes, the locations of the tags may also change so that the tags minimally obstruct a user's view of representation 100 or of the colored rooms in that representation.

As another example of using the present system to search for a preferred room, referring again to FIG. 6, assume that a system user arrives at kiosk 40a including display 80a at the location indicated by user pin icon 160 and is looking for a conference space that can accommodate 4 people, that is conveniently located with respect to a supply room, that includes a MediaScape system, a whiteboard, and a telepresence system. The FIG. 6 initial north facing home view 101 of the fourth floor east space 14 (see again FIG. 1) that is best aligned with the location and orientation of kiosk display 80a is presented. In the exemplary home view, as described above, supply rooms are color coded blue while conference rooms are colored only one of two colors, either red indicating currently occupied or scheduled imminent use or green indicating no imminent scheduled use and unoccupied. Again, imminent scheduled use may mean scheduled to be used in the next 20 minutes or some other short duration.

Upon initially viewing screen 80a, the user can quickly ascertain which conference rooms are available for immediate use by observing the green colored rooms as well as which of those rooms are conveniently located with respect to a supply room. If restrooms, refreshment rooms or other special room types were colored differently, convenience with respect to those rooms for each of the green available rooms can also be glanceably discernable.

Recognizing that the green colored conference room labelled 104 in FIG. 6 is next to a supply room and that room 108 is also colored green and is next to a different supply room, those two rooms would immediately be of greater interest to the user than the other green rooms because of their proximity to the supply rooms. In the FIG. 6 view 101, while rooms 104 and 108 are viewable, the views are not very good as none of the detail in those rooms can be seen in view 101. To obtain a better view of room 104, the user selects icon 150 and rotates the representation 100 until the east looking view 107 in FIG. 9 results where room 104 can be better observed. While room 104 is better observed in FIG. 9, the room rendering is still small so that observation is challenging.

To better understand how room 104 is afforded and if the room meets the user's requirements, the user may select room 104 in the FIG. 9 view to access additional room related information in a popup window 177. Here, window 177 indicates room capacity (e.g., 4 as shown) and presents information indicating at least some affordances provided within the selected room that are difficult to represent visually such as, for instance, content sharing affordances (e.g., MediaScape, Virtual Puck, Surface Hub, Telepresence, etc.), handicap ready affordances, etc. Looking at the affordances available within the selected room, the user can see that her need for a MediaScape system and a telepresence system can be met in room 104.

At this point the user could stop searching for a room to use and could instead schedule use of room 104 prior to travelling to and occupying that room. In the alternative, the user may want to access even more information or attributes about room 104 that is not easy to express in text or list form. For instance, what does the room look like, what is the arrangement of affordances within the room, can the affordances be moved within the room to different locations, if others can see into the room, to what extent and from which directions, if people in the room can see out of the room, to what extent and in which directions, what is the orientation of any whiteboards or common emissive surfaces within the room with respect to glazed walls, etc.

In some cases the user may select a 360 degree view icon 179 to open up a 360 degree image viewer window as shown at 210 which can be manipulated to change the FOV from a central location within the room via a panning tool 212. While 360 degree views are interesting, they only allow a user to select FOVs from a single location within a room and typically present distorted images that are not very useful when attempting to discern many different types of space characteristics.

One other alternative to access additional useful information about room affordances that is consistent with at least some aspects of the present disclosure is to simply zoom in on a room of interest. For instance, the user may double tap on room 104 causing the system to automatically zoom in and present an optimized view (e.g., zoom level, viewing angle and viewing elevation) of the room 104 including affordances located therein. To this end, see the zoomed in view 117 shown in FIG. 13 where room 104 and affordances therein are observable. Note that the optimized view is seen through a glazed wall and that it can be seen that the opposite wall is glazed (e.g., other affordances are observable through the opposite wall). Thus, the optimized view represents the glazed walls in a way that is perceivable by the user. See also that the arrangement of two lounge seating units 220 and 222 as well as two task chairs 224 and 226 can be seen on opposite sides of a small conference table 228. A MediaScape screen is seen at 230 where the glazed side walls of the space are perpendicular to the front surface of the MediaScape screen. It can be seen that a whiteboard 232 is located on a wall opposite the MediaScape screen. Tool 150 can be used to change the viewing angle of the zoomed in view if the user wants a different perspective. Further zooming can move the user's perspective directly into room 104 so the user can see the room and surrounding spaces through the glazed walls from any desired location.

It should be appreciated that the user's sense of the fourth floor east space as well as room 104 and associated affordances is substantially greater using the 3D space representations described above. The 3D representations are like a different, more informative, and far more efficient language that conveys more information about preferred room affordances in a shorter time than any other known type of space finding interface type.

Continuing with the example above, if the user is dissatisfied with room 104 when viewed in a close up zoom mode (e.g., the user may not want a room with two glazed walls) or at any other time while using kiosk 40a, the user can zoom back out to the FIG. 9 view or another view and then double tap room 108 to zoom in on an optimized view of room 108 in a fashion similar to that described above with respect to room 104. By quickly comparing affordances and optimized views of each of rooms 104 and 108, the user should be able to discern which room is most preferred.

If, after having considered optimized views of each of rooms 104 and 108, the user is still dissatisfied with those choices, the user can again zoom back out to see a more expansive view of VW representation 100, select another green space to zoom in on, and attempt to locate a space that is better suited to the user's preferences.

Figure 15:
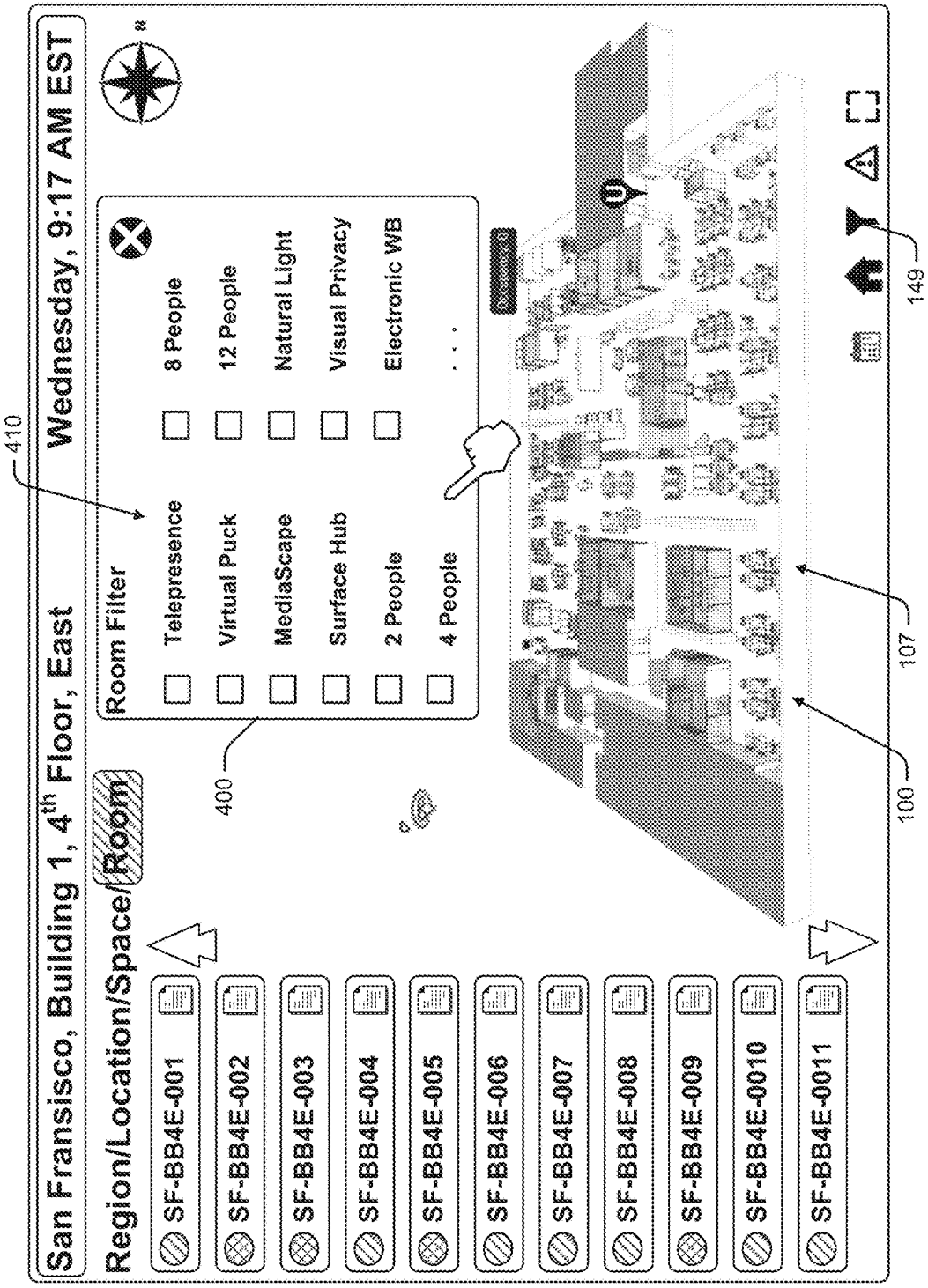
FIG. 15 is similar to FIG. 5, albeit showing a different screen shot with a different view of a VW representation.

As yet another alternative, at least some embodiments of the present disclosure enable a user to use a space filtering tool to identify spaces that meet at least a subset of user requirements for a space. For example, referring to FIG. 15, in at least some cases when a user selects filter icon 149, a filter window 400 opens up which enables a user to select different room requirements for a room in which the user wants to perform some activity. Exemplary room requirements are listed in window 400 at 410 where a separate check box is associated with each requirement option. The requirement options include a telepresence system, a Virtual Puck system, a MediaScape system, a Surface Hub system, capacities of 2, 4, 8 and 12 people, natural light, visual privacy and an electronic whiteboard system. Many other room filter requirements are contemplated. In at least some embodiments, window 400 is placed at a hovering location above representation 100 so that it does not interfere with the view 107.

Figure 16:
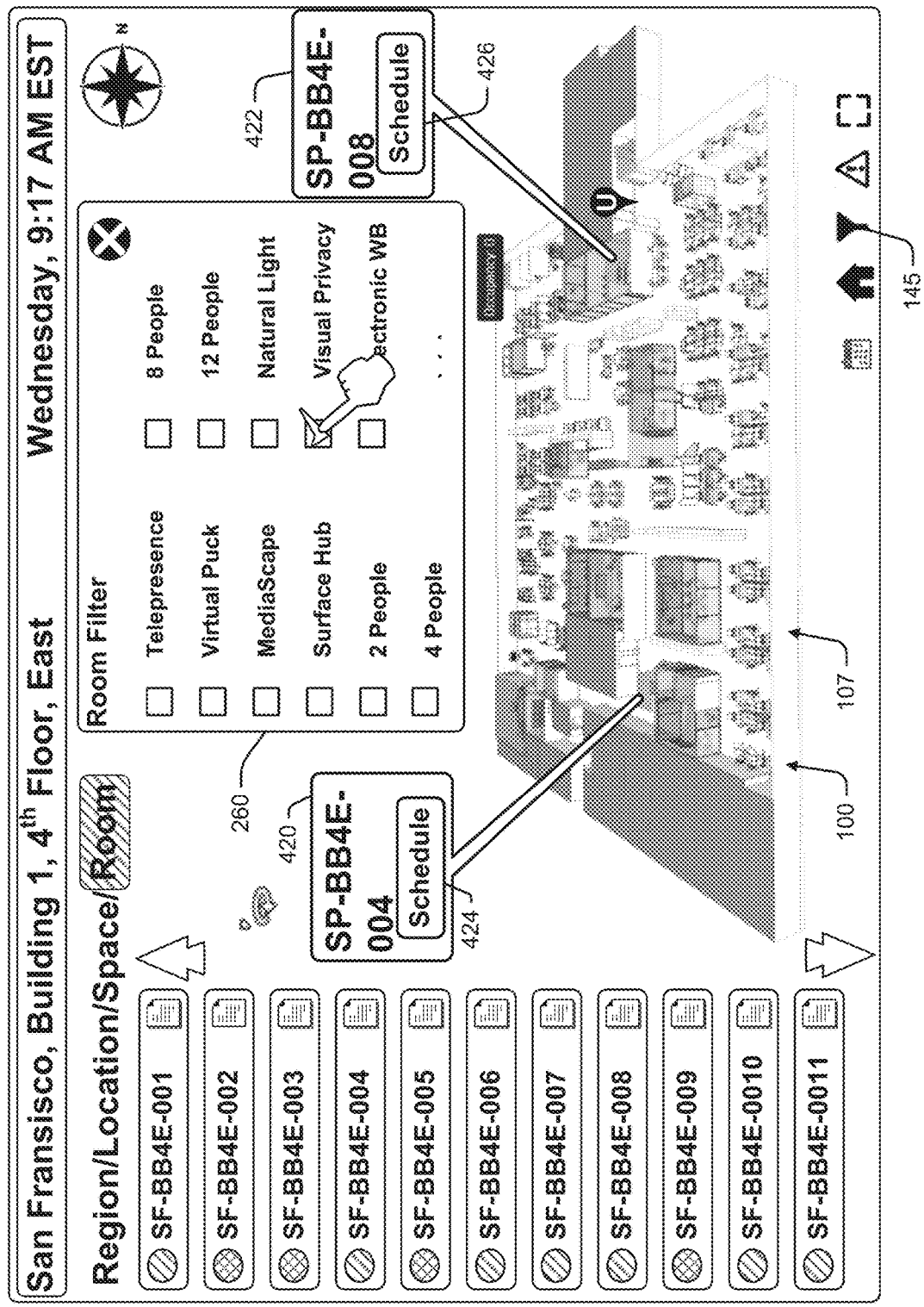
FIG. 16 is similar to FIG. 5, albeit showing a different screen shot with a different view of a VW representation and also showing exemplary space discovery search tools.
Figure 17:
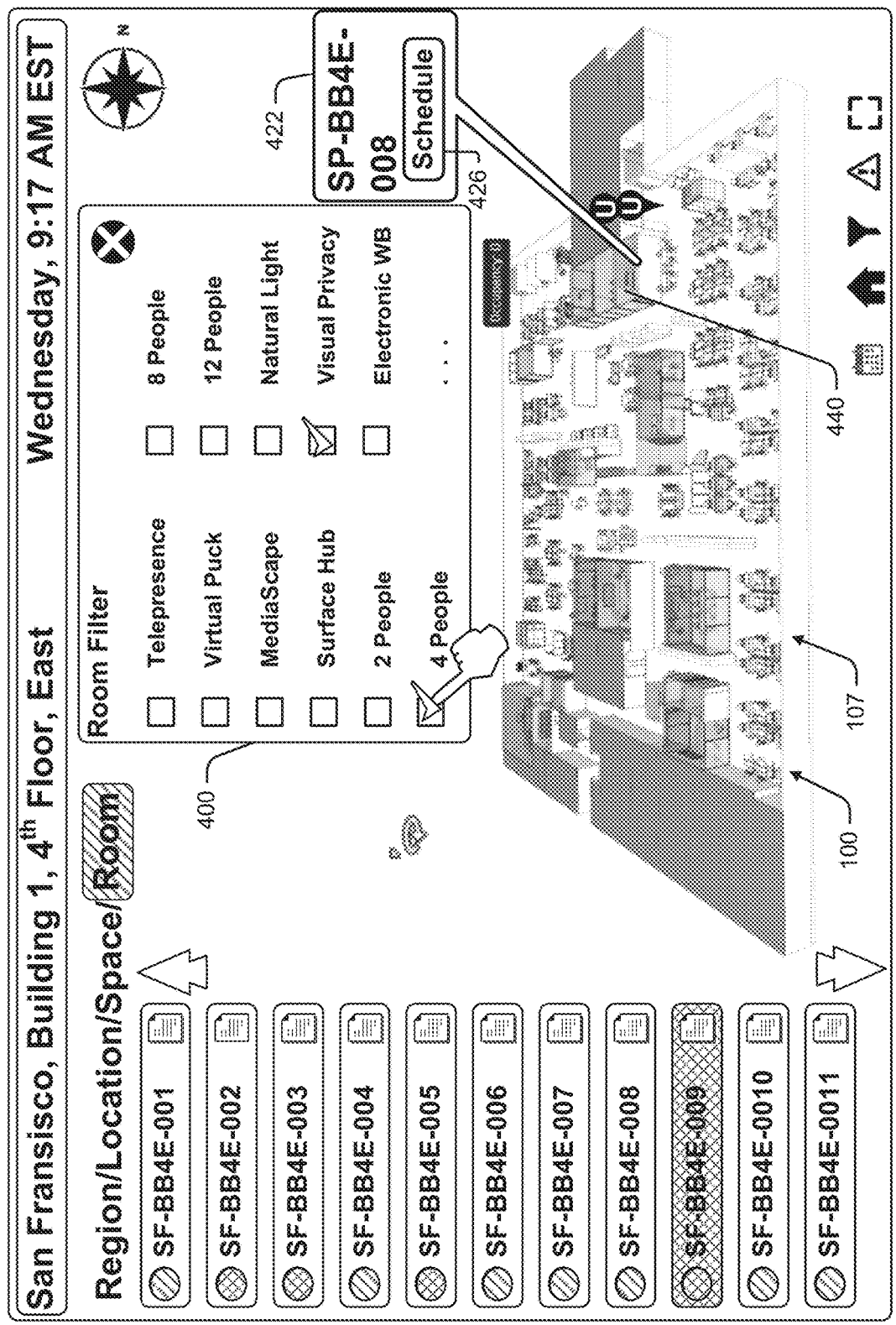
FIG. 17 is similar to FIG. 5, albeit showing a different screen shot with a different view of a VW representation and also showing exemplary space discovery search tools.

Referring to FIG. 16, as the user selects checkboxes associated with the requirements options, the system filters the room affordances based on the selected options and provides option tags for at least a subset of the rooms in view 107 that fit the option requirements selected. In the illustrated example shown in FIG. 16, when the user selects the visual privacy option as shown, the system identifies two rooms that are consistent with that option and provides a separate option tag for each (see exemplary option tags at 420 and 422). In addition to indicating the name of an associated room, each tag includes a "Schedule" icon 424, 246 that can be selected if the user wants to schedule use of the associated room. FIG. 17 shows that if the user selects a second requirement option for a space that has a capacity for at least four people, the system filters with the combination of 4 person capacity and visual privacy and in the illustrated example, comes up with the single option represented by option tag 422.

Again, at any time, the user can zoom in to any one of the rooms or a more focused area that includes multiple rooms to glanceably see many more aspects of room design and affordances that may affect user preferences. Thus, in FIG. 17 the user may double tap on space 440 associated with option tag 422 to optimally zoom in on that room and to assume an optimal angle and elevation for seeing visually apparent attributes and characteristics of that room that may affect user preferences. In at least some cases where a user has filter window 400 open and an option tag 422 or other tag information is presented, when the user zooms in or changes the viewing angle or elevation, the system may automatically reposition the filter window, option tag, or other informational tags so that they do not block a view of the room the user is trying to see while still providing the additional space related information the user may desire when making a room selection decision.

Figure 18:
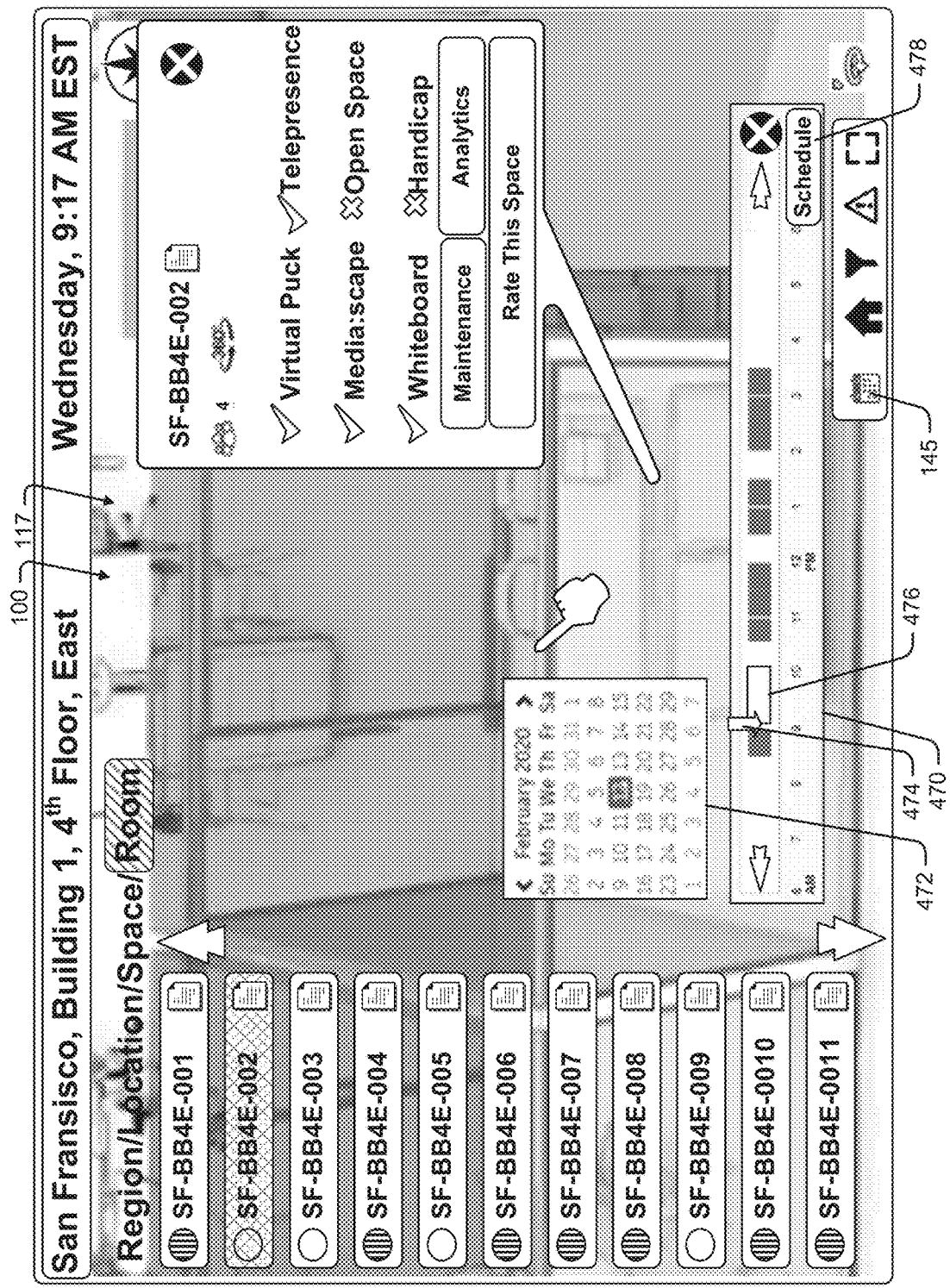
FIG. 18 is similar to FIG. 13, albeit showing scheduling tools that are consistent with at least some aspects of the present disclosure.

In addition to being used to find and/or reserve rooms/affordances for immediate use, the disclosed system can also be used to schedule room/affordance use for future activities. To this end, referring now to FIG. 18, to schedule future room/affordance use, a user can simply select schedule icon 145 to open up a space schedule timeline window 470 and a date selection window 472. Future scheduling tools may be accessed in other ways in other embodiments (e.g., see the "Schedule" option 364 in FIG. 6, the "Schedule" option 681 in FIG. 13, the "Schedule" options in FIG. 16, etc.). In FIG. 18, date selection window 470 includes a calendar tool for selecting a date on which the user wants to schedule use of room 104. The default date is the current date so if the user wants to schedule use on the current date the user can simply ignore window 472.

Timeline window 470 presents a timeline including the current time of day indicated by arrow 474 and showing time slots when the associated room 104 is available and when the room is reserved for use by others. An hour default period is automatically presented as shown via an hour bar icon 476 for scheduling the next hour of use of room 104, assuming that the room is not scheduled for use by another user during that period. Window 470 also includes a selectable schedule icon 478 selectable to schedule room 104 for the default period 476. In at least some cases the user can move icon 248 to the right on the number line to change the time the user is attempting to schedule (e.g., to select a later time). In some cases the user can extend of shorten the bar 476 duration by selecting an edge of the bar and dragging that edge toward or away from the opposite edge. Thus, the FIG. 18 tools can be used to schedule current use of room 104 as well as use during future periods.

Figure 19:
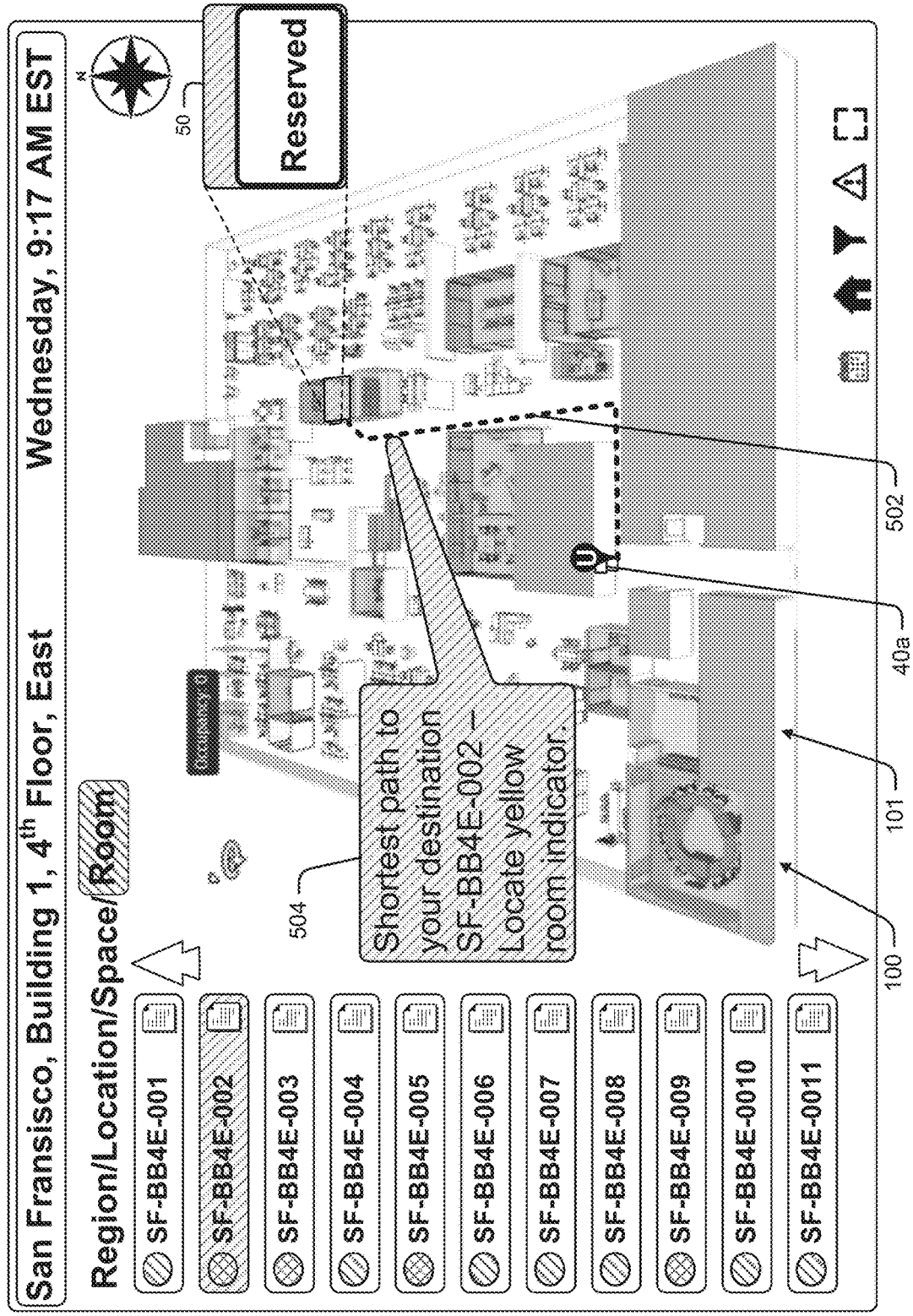
FIG. 19 is similar to FIG. 5, albeit showing a different screen shot with a different view of a VW representation and also showing guidance information to a user.

Whenever a user indicates a desire to schedule immediate use of a room using one of the kiosks 40a, 40b or another user interface (e.g., one of the threshold interfaces 50), server 20 may provide a "path" overlay on the VW representation showing the user the fastest way to get to the scheduled room. To this end, see FIG. 19 where a user has selected room 104 for immediate use. As shown, a path overlay 502 is provided indicating the fastest path to the reserved room 104. In addition, server 20 presents a popup message at 504 instructing the user to follow the overlay path to room 104. The popup message is colored yellow (e.g., right down to left cross hatching) and server 20 colors a threshold interface indicator light the same yellow color to guide the user to her reserved room 104. Message 104 also instructs the user to locate the yellow room indicator which appears outside room 104 as presented via the threshold interface. Again, in at least some embodiments, the threshold interface indicator will be designed and located so that it is visible at remote locations so that once a user is in the general vicinity of the indicator, if the indicator is illuminated, the indicator should be easily identifiable.

Figure 20:
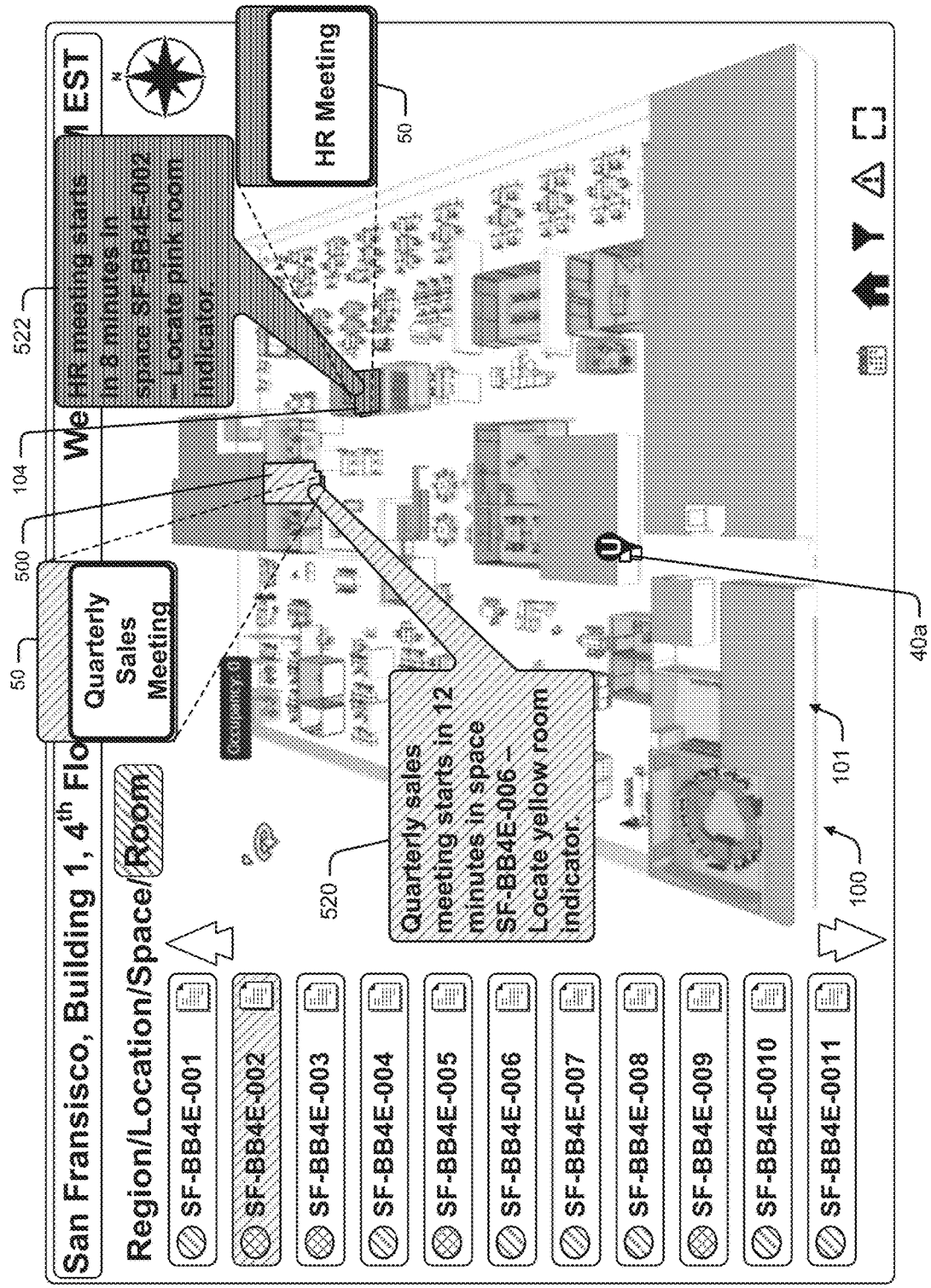
FIG. 20 is similar to FIG. 19, albeit showing different guidance information to a user.

In at least some cases where imminent meetings or room use is prescheduled when users arrive at a kiosk, kiosk 40a will automatically present guiding information for locating rooms reserved for those specific meetings. For instance, referring to FIG. 20, assume a quarterly sales meeting is scheduled to start in room 500 in 12 minutes and a human resources ("HR") meeting is scheduled to start in room 104 in 8 minutes. Here, as shown in FIG. 20, server 20 may color rooms 500 and 104 yellow and pink, respectively, on representation 100, and present guiding popup windows for each of the rooms 500 and 104 as shown at 520 and 522, respectively. In addition, the threshold interface light indicators may be differently colored to present guiding lights to users searching for rooms 500 and 104. Popup window 520 associated with the meeting in room 500 indicates that the quarterly sales meeting will start in 12 minutes and that user's looking for that meeting should look for the yellow room indicator. Similarly, popup window 522 associated with the meeting in room 104 indicates that the HR meeting will start in 8 minutes and that user's looking for that meeting should look for the pink room indicator.

Figure 21:
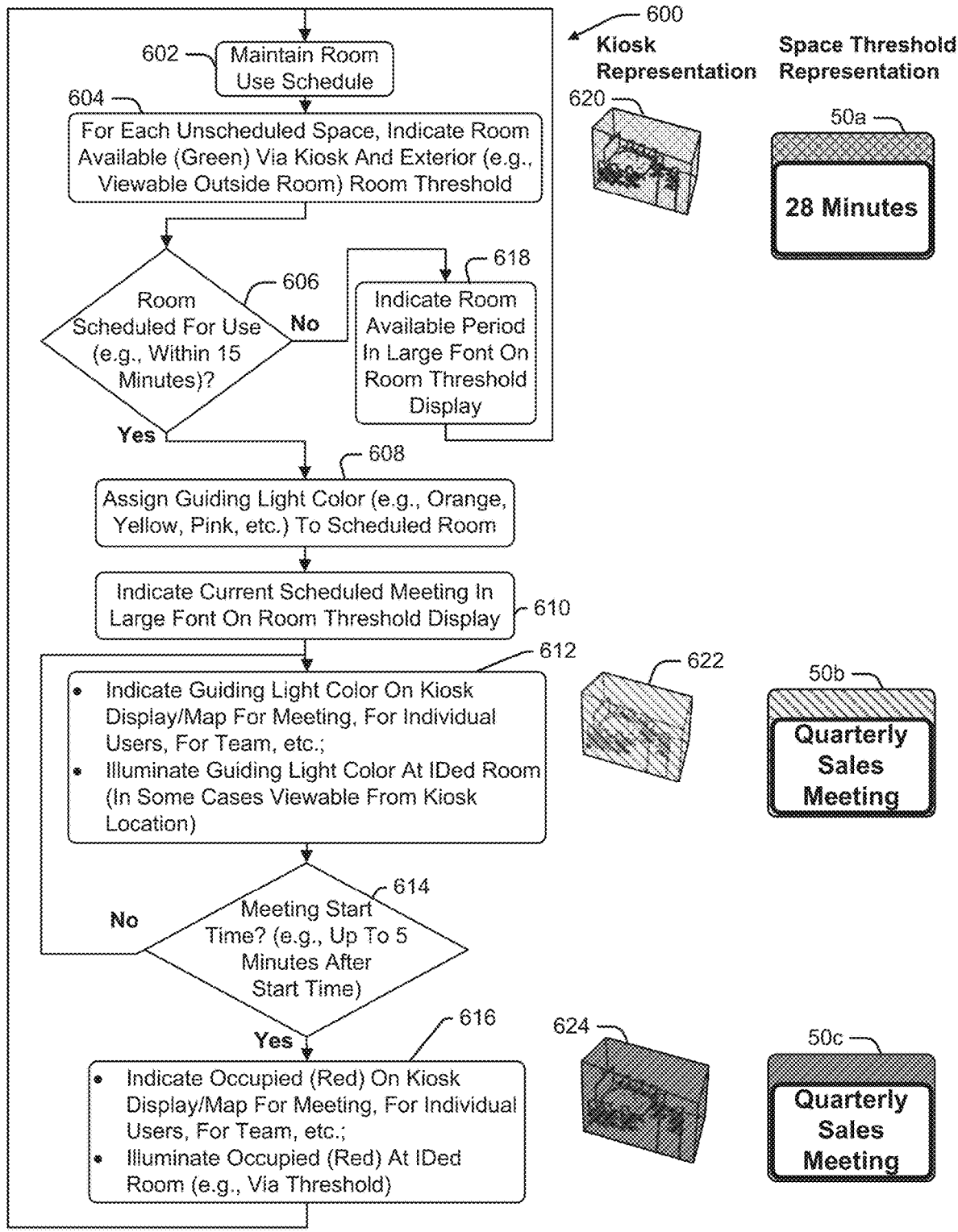
FIG. 21 includes a flow chart showing a space guidance process that is consistent with at least some aspects of the present disclosure.

Referring now to FIG. 21, a process 600 for indicating locations of specific rooms for specific meetings to users arriving at one of the disclosed kiosks is illustrated. At initial process block 602, server 20 maintains a room/space use schedule. Block 604, for each room not scheduled for current of imminent use (e.g., within the next 15 minutes), server 20 indicates that the room is available by highlighting the room green on the kiosk VW representation 100 and also by controlling the threshold interface indicator associated with the room to glow green.

Referring still to FIG. 21, at decision block 606 server 20 determines if a room is scheduled for use in the next 15 minutes. If the room is not scheduled for use in the next 15 minutes, server 20 control passes to block 618 where the server presents available unscheduled time in large font for passersby to see as shown at 50a in FIG. 21. If the room is scheduled for use in the next 15 minutes, control passes to block 608 where server 20 assigns a guiding light color (e.g., orange, yellow, pink, etc.) to the scheduled room. At block

610, server 20 switches the large font information on the threshold interface to indicate the imminent next scheduled meeting (see 50b in FIG. 21). At block 612, server 20 presents a popup window (see 520 in FIG. 20) indicating when the meeting is starting and providing the assigned color indicator to any users arriving for the meeting. At block 612, server 20 also shades the room on representation 100 the guiding light color. In addition, at block 612, server 20 changes the threshold interface indicator color to mirror the guiding light color presented via the kiosk.

Still referring to FIG. 21, at decision block 614, server 20 tracks the start time of the meeting and if the meeting has not started, control passes back up to block 612. Once a meeting starts, server 20 changes the room highlight to red on VW representation 100 and also controls the threshold interface indicator to generate red light indicating current occupancy. At block 614, the meeting start time may be immediately upon the scheduled start time occurring or, in other cases, may be a short period (e.g., 5 minutes) after the scheduled start time so that users arriving late for a meeting can still benefit from the guiding colored light features of the present disclosure.

Figure 22:
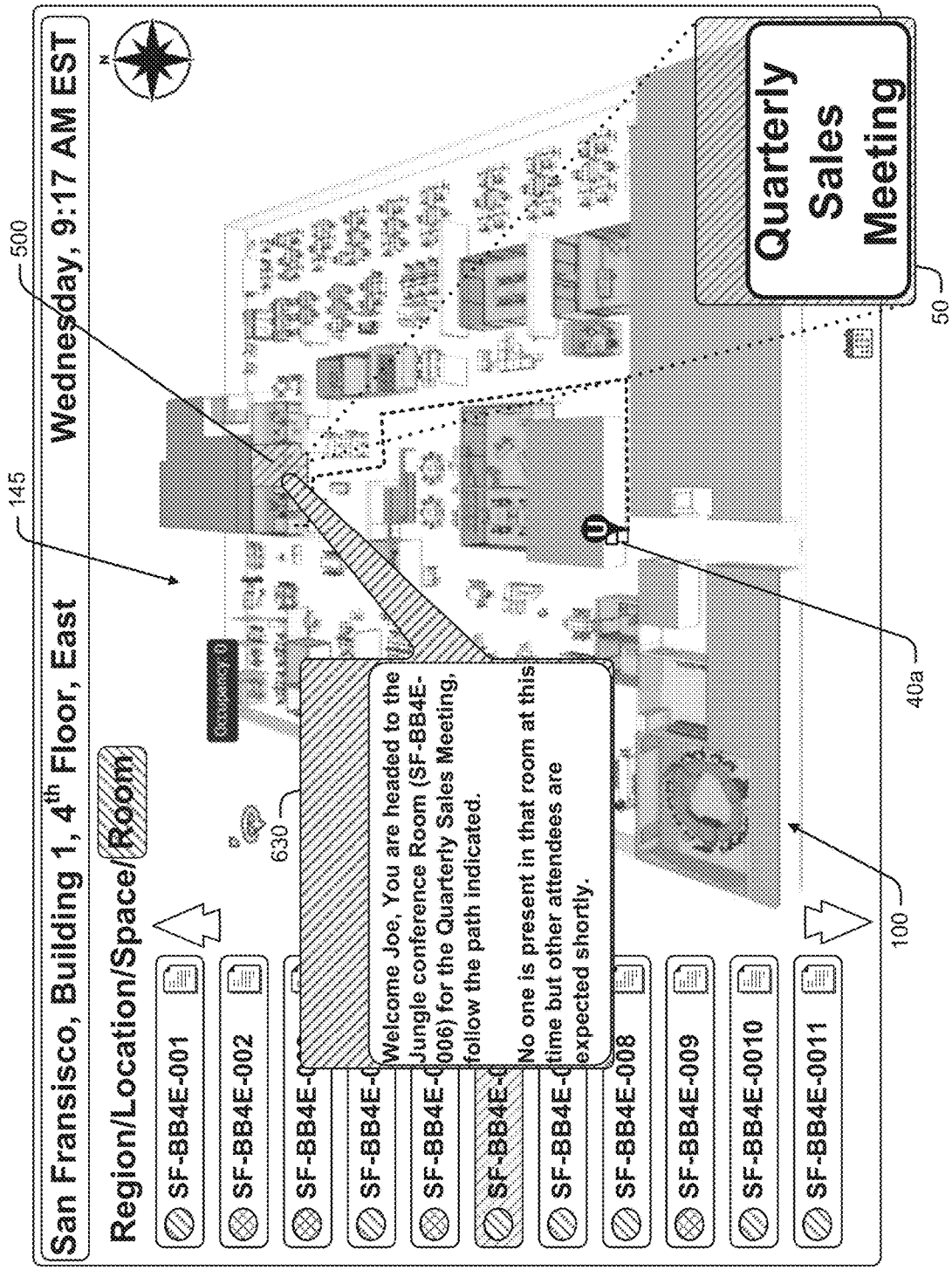
FIG. 22 is similar to FIG. 19, albeit showing different guidance information to a user.

As described above, in at least some cases, the disclosed system will be able to detect identity (e.g., via a portable computing device, identification badge, biometric sensor devices, entry of user ID and password, etc.) of users viewing a system kiosk 40a and, in those cases, it is contemplated that server 20 may automatically serve up user specific room discovery and/or guidance information. For example, where a user arrives at kiosk 40a in FIG. 22 for a meeting scheduled to start in a few minutes in room 500, the system may automatically identify the first user and that the user is scheduled to attend the meeting in room 500 and may present a popup window 630 greeting the user and providing travel instructions to the user indicating the fastest way to get to room 500. Here, in cases where server 20 tracks room occupancies, server 20 may be programmed to indicate if anyone is currently present in room 500. As in other examples above, the popup window, room on representation 100, and threshold interface indicator may all be similarly color coded (e.g., yellow) to provide guidance to the user in finding room 500.

Figure 23:
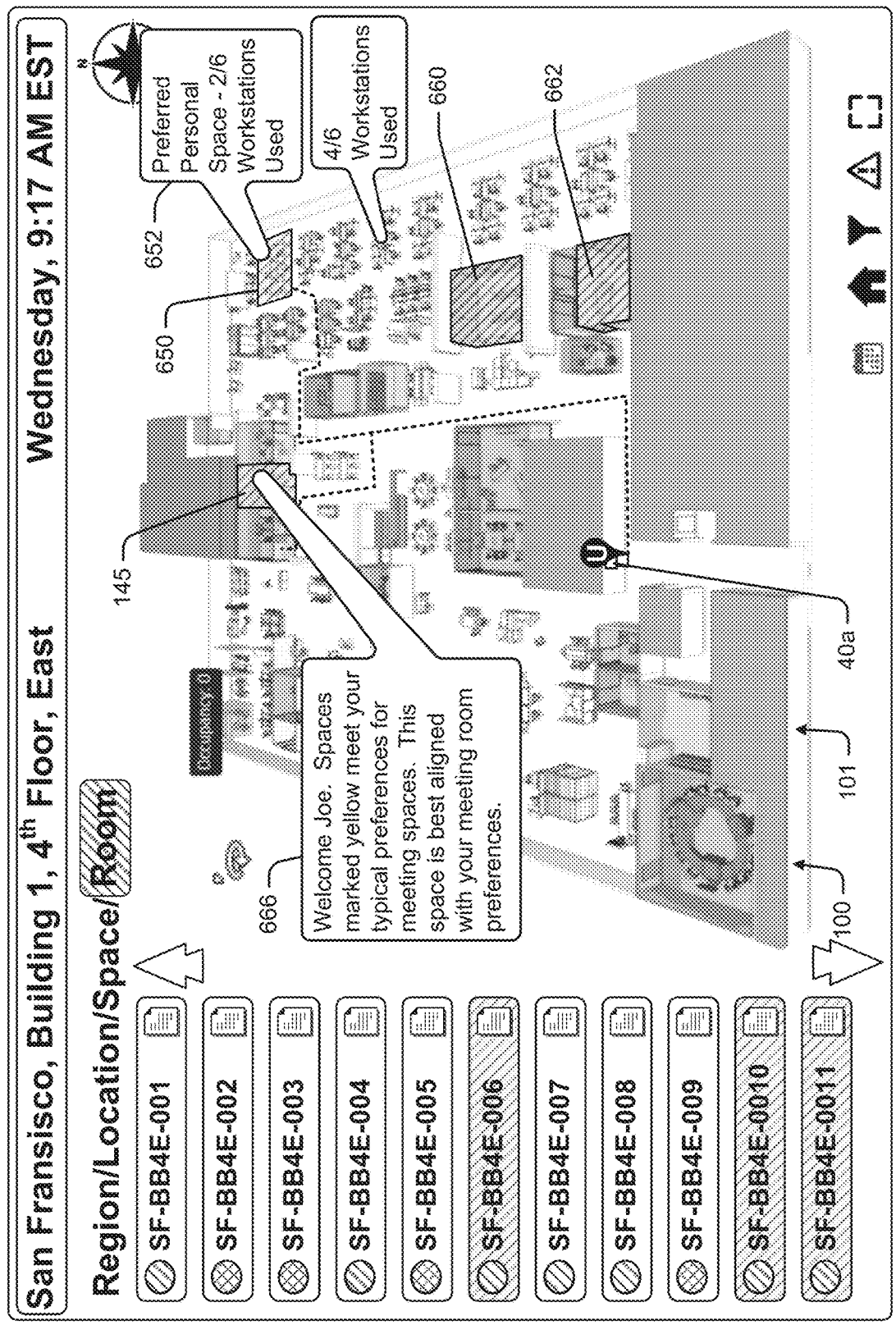
FIG. 23 is similar to FIG. 19, albeit showing different guidance information to a user.

In other cases the system server 20 may automatically provide preferred room and other affordance options to a user that arrives at a kiosk based on user identity. For instance, assume a user arrives at kiosk 40a in FIG. 23 and is not scheduled to attend an imminent meetings in the facility space associated with representation 100. Here, once user identity is known, server 20 may access user preference information (see 68 in FIG. 1) and use the user's room/affordance preferences to identify one or several available rooms or other affordances (e.g., workstations) that best meet the user's preferences.

Where one or a subset of the workstations meet the user's preferences, the system may automatically highlight those options on representation 100 for the user to see. In this regard, see highlighted space 650 and associated popup window 652 indicating the location of preferred workstations. Highlight 650 and indication 652 refer generally to an area and indicate that 2 out of 6 workstations in the area are currently being used to give the user a sense of the crowdedness of the group of 6 stations. In other cases it is contemplated that separate preferred and available workstations may be highlighted on representation 100.

In at least some cases when a user arrives at kiosk 40a and is not prescheduled to use a room or other affordance imminently, server 20 may identify at least one preferred room or affordance of each of at least two different types that is available for use and that can be offered or suggested to the user. For instance, when the user arrives at the kiosk, the user may be in search of a personal workstation or perhaps a conference room for a meeting. Here, server 20 may automatically apply user preferences to two or more different space types (e.g., workstations, small conference rooms, and large conference rooms) and may suggest one of each of the space types that is preferred. To this end, see again FIG. 23 where the server 20 indicates three separate conference rooms 500, 660 and 662 that meet the user's preferences for conference rooms and also indicates area 650 in which preferred workstations are located. Server 20 also indicates via a popup window 666 that room 500 is most aligned with the user's preferences for a conference room. Fastest paths to preferred spaces are overlaid on representation 100 as well.

While BIM model elements have been described in the context of 3D spaces associated with defined rooms above, it should be appreciated that other 3D spaces within representation 100 can be similarly defined as model elements and attributes can be assigned to each of those spaces in a fashion similar to that described above with respect to the room elements. To this end, see, for instance, FIG. 24 where first and second relatively large spaces 700 and 702, respectively, within representation 100 are shown colored yellow and pink, respectively, to indicate first and second spaces that correspond to first and second BIM space model elements. Here, one attribute that may be associated with space 700 may be a level of natural light that exceeds a threshold level while an attribute associated with space 702 may be a level of persistent audio noise that is below a different threshold level.

Figure 24:
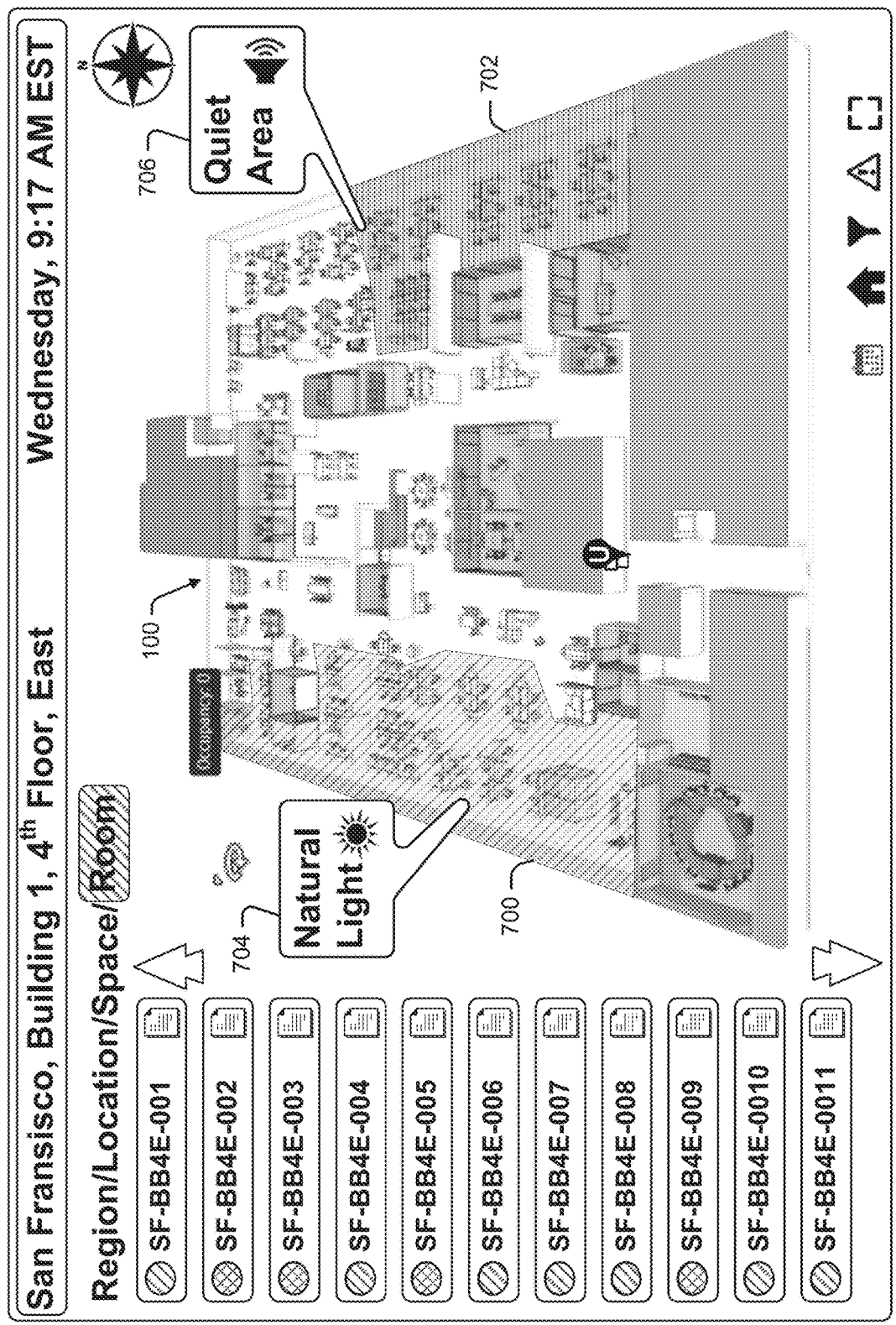
FIG. 24 is similar to FIG. 5, albeit showing a VW representation with attribute zones that is consistent with at least some aspects of the present disclosure.

Once attributes are associated with space model elements, those attributes can be presented to a system user when considering space or affordance selection in a manner similar to that described above with respect to rooms. To this end, see again FIG. 24 where space overlays or highlights are provided on representation 100 to indicate different spaces 700 and 702 and where tags 704 and 706 are associated with spaces 700 and 702, respectively, indicating natural light and audio noise attributes associated with those spaces. In FIG. 24, spaces 700 and 702 are shown to include areas that do not include conference rooms and to only include non-overlapping areas. In other cases, however, spaces akin to 700 and 702 may overlap each other or include one or more rooms within VW representation 100.

In at least some cases it is contemplated that server 20 may be programmed to automatically adapt at least some 3D volumes of model space elements where one or more attributes define an element. For example, in the FIG. 24 representation where instantaneous noise level defines space 702, noise levels in different locations often change throughout a typical day, are different on different days of the week, etc. In at least some cases sensors within the real world space associated with representation 100 may detect noise levels at many locations throughout the space and those noise levels may be used to adjust the shape and size of the model space element 702 and, therefore, the shape and size of space element 702 on representation 100. In these cases, where overlay 702 is driven by the 3D volume corresponding to the BIM model element, the shape and size of the overlay on representation 100 may change dynamically to represent current noise volume conditions throughout the space associated with representation 100. Many other dynamic or static space related attributes may be associated with model space elements within the VW representation and used to drive attribute overlays applied to the representation. For instance, visual traffic level, temperature level, air flow, privacy level, etc., may each or all be presented on one or a series of VW representations to help users make informed space selection decisions.

In still other cases, a system processor may use prior detected environmental characteristics and associated use characteristics and times to assess likely space characteristics during subsequent periods of time to provide even better guidance on space selection to users. For instance, where a user or a team needs a space for a five hour period and strongly prefers minimal noise, the system may automatically attempt to an available space that, based on prior detected characteristics over similar durations (e.g., Monday morning from 7 until noon), should meet the group's preference for minimal noise. Here, the system may only suggest spaces and periods that meet or at least best meet the user's preferences.

Going one step further, in the above example, the system may be further programmed to look at space schedules of all spaces within a facility area and prior sensed environmental characteristics to identify optimized spaces and times for specific meetings that are most likely to meet group or user preferences. For instance, if the area surrounding a particular conference space is low noise most of the time but is relatively noisy when three adjacent conference spaces are simultaneously occupied, the system may automatically rule out that particular space for a team when adjacent spaces are occupied for at least a portion of a period when a team needs a quite space. Thus, here, when a team needs a conference space in a quiet environment for 5 hours, a system processor would identify all conference spaces available for a five hour period having a capacity that can accommodate the team and for each period, would assess likely noise levels based on schedules of adjacent spaces as well as sensed noise/sound data during prior periods when adjacent spaces were occupied, and would only suggest conference spaces that are quiet during 5 hour periods. This concept of assessing likely future space characteristics based on prior sensed characteristics and future schedules is referred to generally herein as "predictive space guidance". Other predictive space guidance concepts are contemplated (e.g., level of natural light based on prior detected characteristics and weather forecasts, space temperatures based on prior detected characteristics and weather forecasts, etc.).

Figure 26:
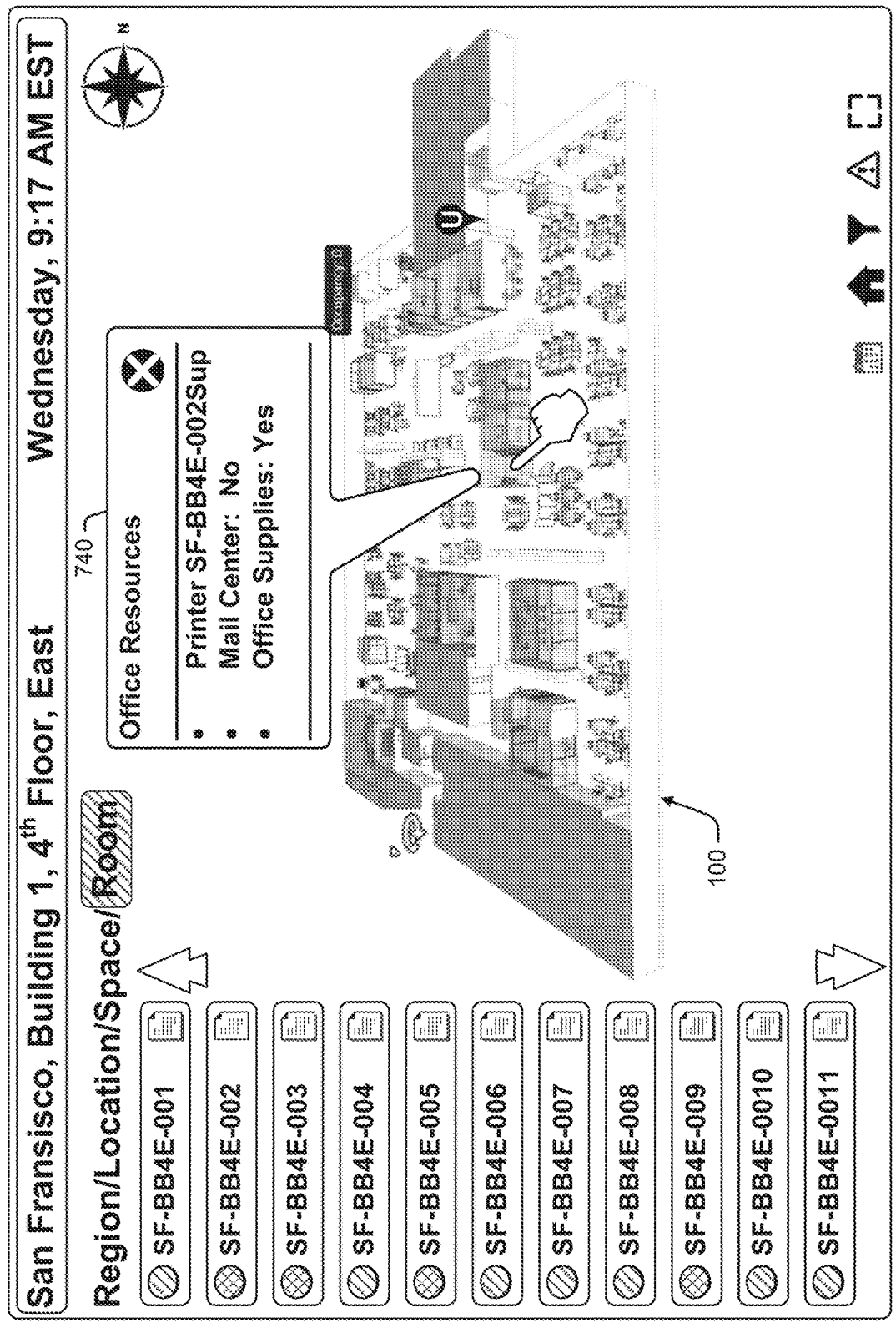
FIG. 26 is similar to FIG. 9, albeit showing a supply room information window.

While views of representation 100 are described above in the context of large kiosks 40*a*, 40*b*, etc., in at least some cases it is contemplated that similar views may be presented to space users via other interface devices. For instance, representation views and interface tools may be presented via threshold interfaces 50 or even via portable hand held smart phone or other computing devices. By providing other interfaces to the disclosed system, users can search for space rooms and affordances at any time and do not have to be located at kiosk locations. For example, assume a user is located in room 104 in FIG. 26 and needs to print out a document. Initially unaware of which printer is closest to room 104, the user may access a facility view as shown and see that space 106 adjacent room 104 is a supply room (e.g., is colored blue) and may select that room on the interface to access information related thereto. As shown, when room 106 is selected, an informational window 740 opens up and presents information related to that space including a printer identifier (e.g., SF-BB4E-002Sup), and other information. Here, the user can print to the identified printer and then retrieve the printed document from the supply room location next door. Other mobile wayfinding features and aspects are contemplated.

Figure 25:
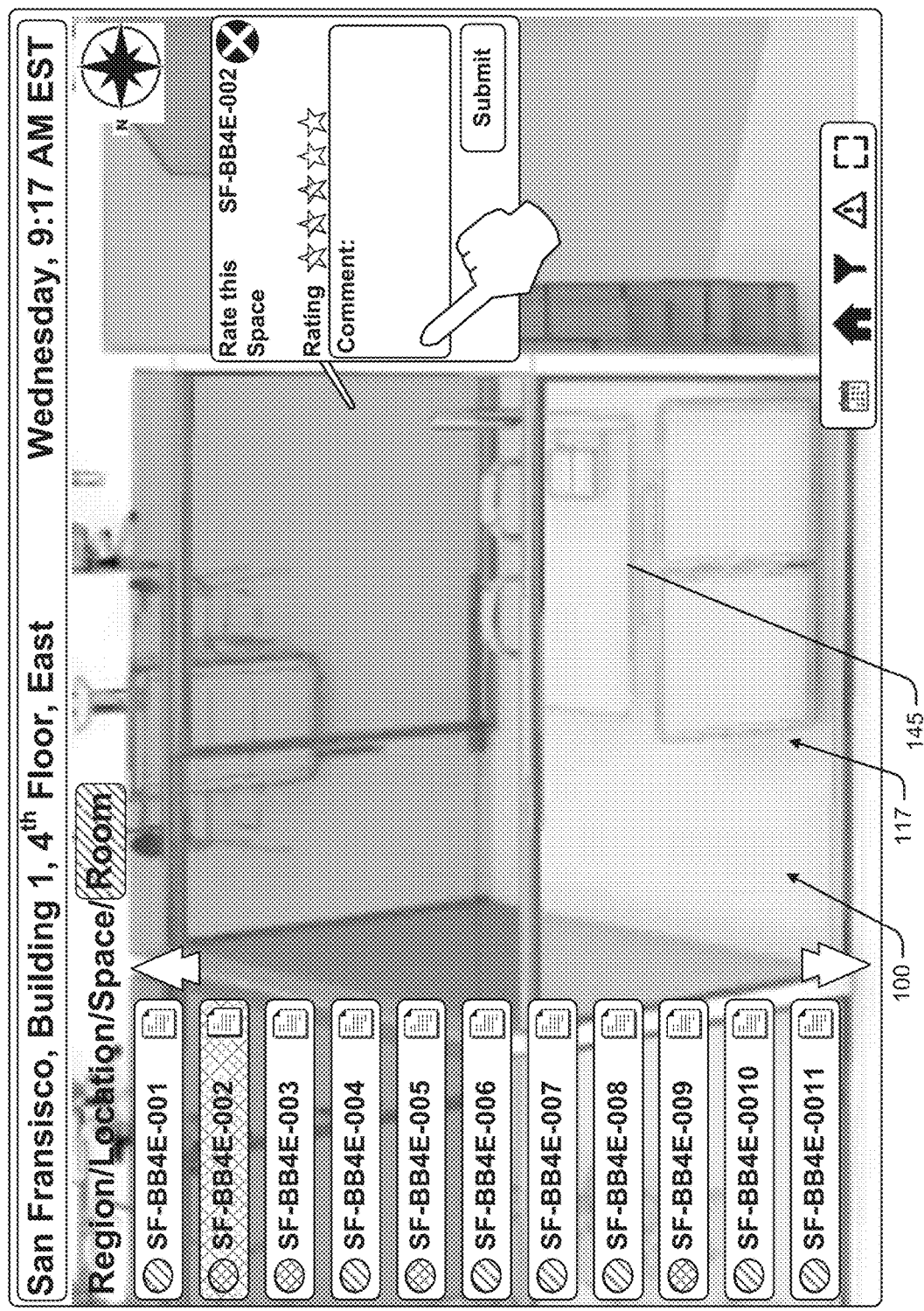
FIG. 25 is similar to FIG. 13, albeit showing a space rating tool that is consistent with at least some aspects of the present disclosure.

Referring again to FIG. 3, in at least some cases user room rating attributes (see last item in list 76) will be assigned to different rooms. Those ratings may be used by server 20 to train on a specific user's room and affordance preferences and may also be accessible by other space users when selecting rooms for different types of activities. Referring again to FIG. 9, in at least some cases when a user accesses room information in a popup window 670, the window 670 may present a space rating icon 680 that is selectable to providing space rating tools. When icon 680 is selected, a popup rating window 690 as shown in FIG. 25 may be opened where a user can rate the space (e.g., select a number of starts out of 5) and provide comments that are then memorialized as part of the ratings information stored in attributes specification 66. Other ways of accessing the space and room ratings tools are contemplated.

2. Maintenance Interfaces

While the disclosed system is particularly useful for providing space and room related information to users that are seeking specific spaces to use to facilitate specific activities, once the system is provided for space discovery purposes, the system can also be used to provide space related views to other users for other purposes. Importantly, while the costs associated with developing and maintaining a full space viewing system for other purposes may not be justifiable, when the underlying system for space discovery is used to develop those views, the cost factor is essentially eliminated.

One general group of people that operate in facility spaces that can benefit from different space views akin to the views described above includes maintenance personnel such as, for instance IT specialists responsible for maintaining IT affordances in working order and janitors/cleaning personnel that clean rooms and other spaces between uses. For example, in the case of an IT specialist, when a telepresence system in a facility room stops working, the specialist needs to be notified, know the location of the system that malfunctioned and also understand how the specialist can work maintenance of the system into his schedule as efficiently as possible given other IT related maintenance demands. Here, when an IT specialist arrives at a kiosk 40*a* within a facility 14 to repair or maintain affordances, the specialist should have access to a space view that enables the specialist to quickly assess locations of all rooms that include malfunctioning IT affordances.

In addition, it would be advantageous if server 20 could order the rooms in an optimized order of maintenance based on one or a combination of factors. For instance, one maintenance order factor could be time since a malfunction has been reported so the order would list maintenance jobs first to last based on order submission date and time. In other cases maintenance order may be selected based on space use so that, for instance, if a first space is used much more than a second space, maintenance in the first space would take precedence over maintenance in the second space. As another instance, where telepresence systems are used much more often than MediaScape systems, telepresence maintenance may take precedence over MediaScape maintenance. As still one other instance, where a first space is scheduled to be used all afternoon and a second space is not, maintenance in the first space may take precedence over maintenance in the second space. Where a space that needs maintenance is currently being used, that space may be placed near the end of the list of maintenance activities to perform.

Figure 27:
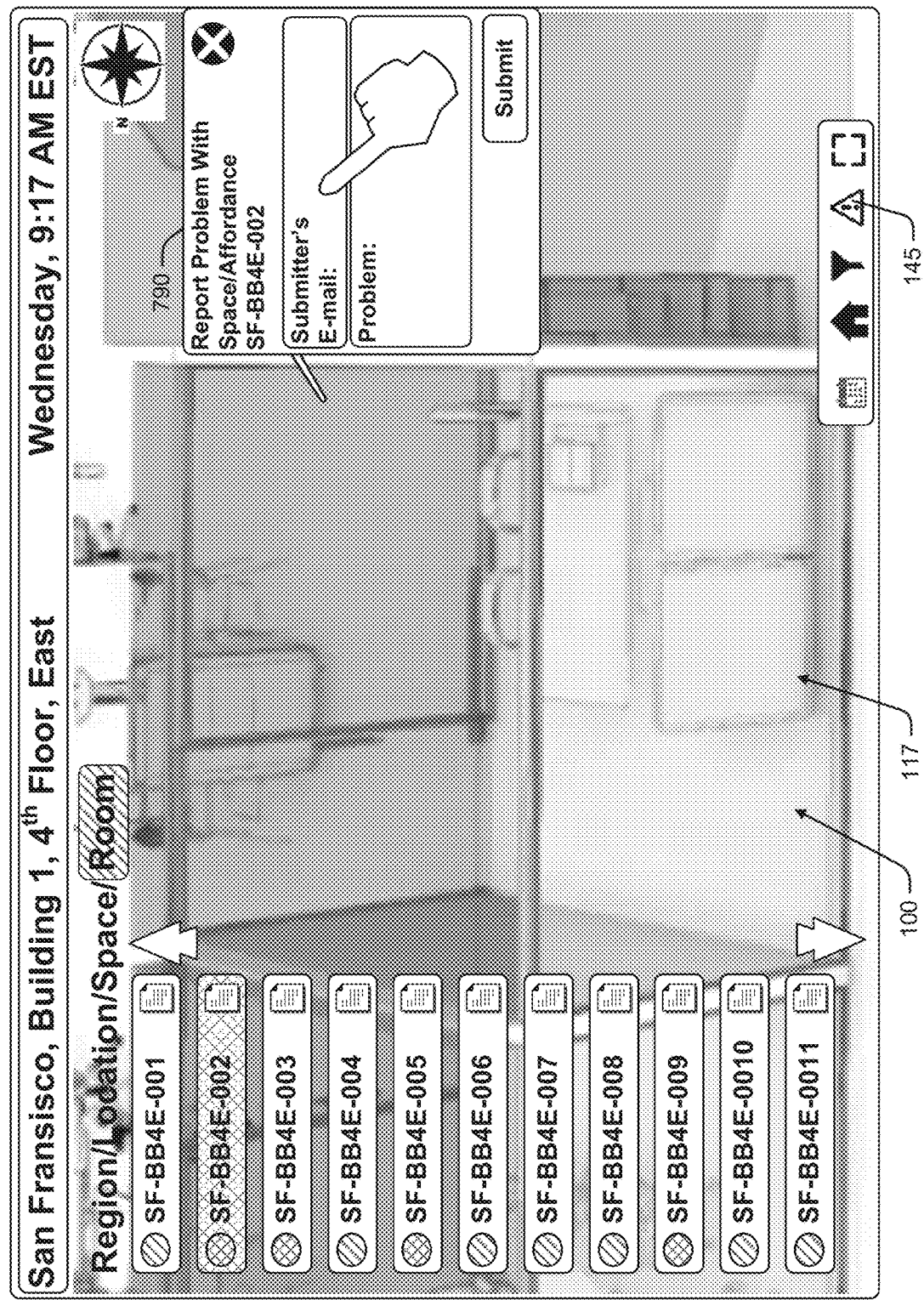
FIG. 27 is similar to FIG. 25, albeit showing a maintenance request tool that is consistent with at least some aspects of the present disclosure.

In some cases IT affordance malfunctions may be identified by users in the course of using affordances and facility spaces. In this regard, see again FIG. 13 where room information popup 670 includes a selectable "maintenance" icon 682 that, when selected, causes server 20 to open up a maintenance reporting popup window 790 as shown in FIG. 27 that includes tools for indicating the nature of the IT problem and information (e.g., an e-mail address) for the user submitting the maintenance request. The request window 790 may force a user to specify all information needed to generate a fulsome request and would be directed to an IT specialist of specialist queue for scheduling. Maintenance requests are stored as temporary space attributes in the maintenance tickets record 72 (see again FIG. 3).

In at least some cases, when a user generates a maintenance request for a room, server 20 may automatically identify other users scheduled to use that room in the future and may automatically generate notifications to each user indicating the nature of the maintenance request. For instance, if the request indicates that a telepresence system malfunctioned, the e-mails may simply include a notice that telepresence in the room may not be operational. Here, the idea is that if users scheduled to use the room in the future need the telepresence system, they would have the opportunity to seek a different space that has an operational telepresence system.

In other cases, server 20 may be programmed to automatically identify one or more other rooms that have operational telepresence systems and may provide e-mails that includes an option to schedule future meetings in one of those spaces. In still other cases where another room with an operational telepresence system is available during the time slot associated with a future meeting, server 20 may automatically reschedule the future meeting for the other room and send e-mail confirmations to meeting invitees.

Figure 28:
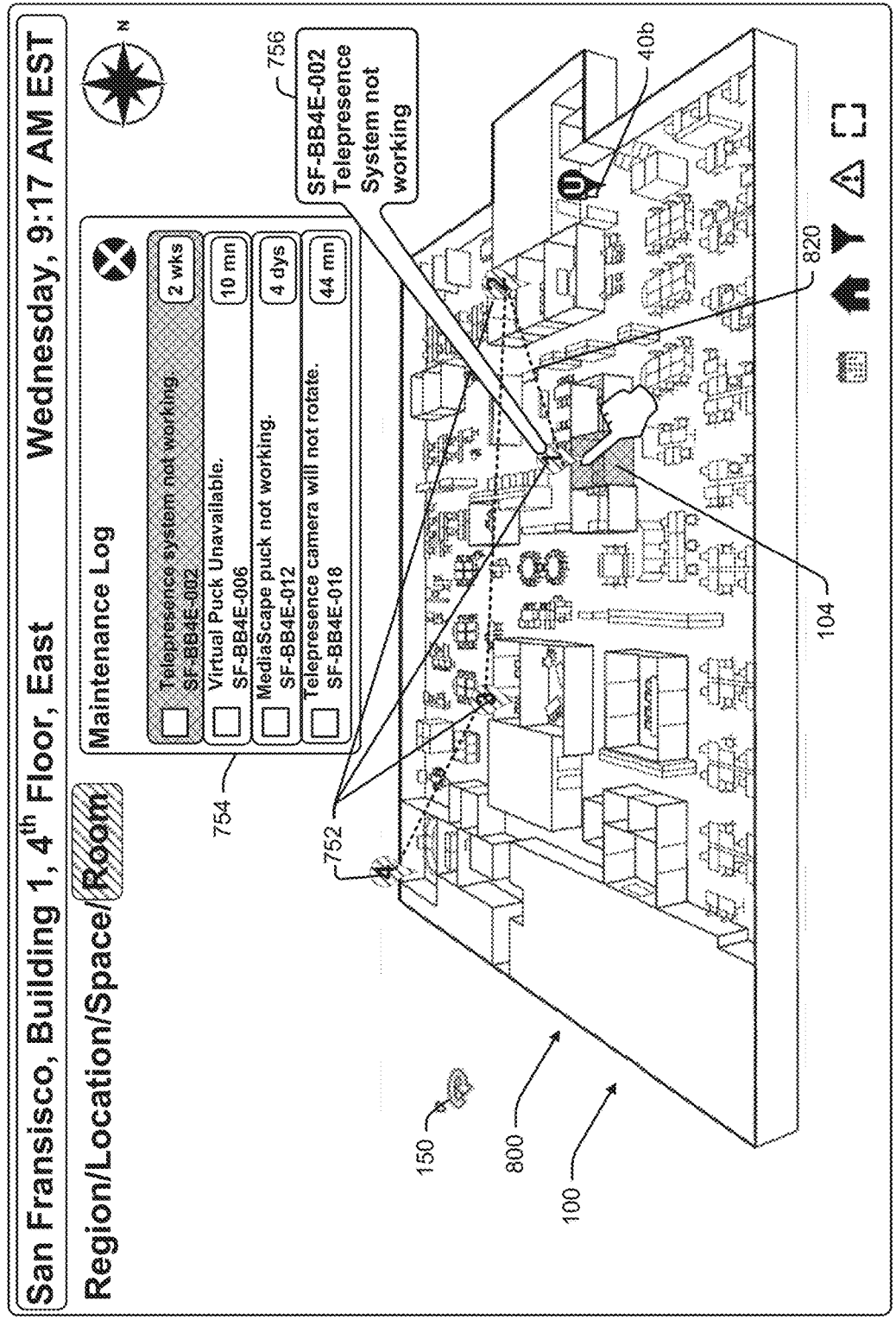
FIG. 28 is an exemplary screen shot that may be presented to an IT specialist that is consistent with at least some aspects of the present disclosure.

Referring now to FIG. 28, an exemplary view 800 that may be presented to an IT specialist upon arriving at one of the facility kiosks (e.g., 40b at the location shown in FIG. 28) is shown. Once server 20 identifies the user as an IT specialist, the server generates view 800 that is designed to aid the IT specialist as opposed to the views above that were generated to aid general space users (e.g., users looking for space to use for meetings or other activities). View 800 shows the fourth floor east wing representation 100 looking east as that is the view most aligned with the location and orientation of kiosk 40b the specialist is using.

The exemplary IT specialist view 800 shows the entire fourth floor east wing representation 100 with overlays and other information added to that representation. A first feature of note is that a room including a first IT affordance to be repaired is highlighted green so that that room 104 stands out on view 800. While not shown, second, third and other rooms in which repairs or maintenance is required may also be highlighted a different color so that those rooms stand out. A second feature of note is that a maintenance log 754 including all IT maintenance tasks to be performed in the facility shown at 800 is presented above representation 800. The exemplary log 754 includes a list of maintenance tasks including two telepresence problems, a Virtual Puck problem and a MediaScape problem where the problems are listed in an order determined by server 20 using whatever rules the system applies for ordering maintenance requests. Each log entry indicates the problem, the room or space in which the problem exists and when the maintenance record was initially generated. Check boxes are provided for each log entry that are selectable by the IT specialist to indicate that requests have been resolved. The first entry is colored green like the room 104 associated therewith in at least some embodiments.

Referring still to FIG. 28, a separate maintenance pin 752 is provided for each room that includes an IT affordance that needs maintenance/repair. The pins shown are numbered to indicate the order of requests that was automatically selected by server 20. If the specialist selects one of the pins (e.g., via tapping the pin), server 20 opens up a maintenance window 756 indicating the nature of the repair to be performed in the associated room 104. While the system suggests an order of repairs/maintenance, the specialist is free to address the maintenance requests in any order preferred. In at least some cases a maintenance order path 820 is overlaid on representation 800 indicating progression from one maintenance activity to a next in the suggested order. Path 820 is FIG. 28 shows straight lines between rooms in which maintenance is to be conducted. In other cases the path may weave through space affordances along hallways and other open spaces within the representation 100.

In at least some cases when an IT specialist is in the facility associated with view 800, server 20 may automatically mark all rooms to be maintained in the next N hours as unavailable for use in the scheduling software to ensure that those rooms are unoccupied when the specialist arrives to maintain or repair affordances therein. In some cases N may be an hour, in other cases it may be 2-3 hours, and in still other cases N may comprise an entire business day. N may change dynamically based on scheduled use of all rooms in the facility (e.g., when most rooms are scheduled, N may be shorter to make sure at least some rooms are available for use when needed). Where there is an order of repair as shown in FIG. 28, server 20 may mark only a next room to be maintained as unavailable (e.g., while the specialist is dealing with a first maintenance request, the room associated with the second request would be unavailable for use while the rooms associated with the third and fourth requests would be available for use, when the specialist is working in the second room, the third room would be unavailable but the fourth would remain available, and so on).

Where a specialist is working in one room and a next room becomes occupied by a user prior to the specialist finishing up in the first room, server 20 may automatically switch the maintenance order so that the specialist is directed to a different room to maintain affordances, rerouting the specialist back to the second room once it is again unoccupied and the specialist has time to address the second room request.

While not shown, in at least some cases it is contemplated that way finding colors may be assigned to different threshold interfaces to help guide IT specialists about within a facility from room to room between maintenance activities as described above with respect to the general space user guidance.

While space users may generate IT maintenance requests, in at least some cases IT affordances themselves or server 20 may detect malfunctions and automatically generate maintenance records akin to those shown in window 754 in FIG. 28.

In the case of janitorial services, whenever possible, facility spaces should be clean and stocked with supplies whenever users enter the spaces to initiate meetings or other activities. In cases where rooms and spaces are heavily scheduled, there are only small time windows between space uses during which spaces can be cleaned and refreshed. It seems like it would be easy for a janitor to just arrive at the scheduled end times of meeting to clean up rooms and then be gone prior to initiation of the next meeting. Unfortunately, in reality, in many cases meetings or other activities run over scheduled end times and therefore cleaning periods between meetings do not exist. The result is that rooms are often only cleaned after two, three, or more consecutive meetings occur in the same space or at the end of a morning or day.

The disclosed system can operate more effectively by providing a cleaning plan to facility janitors that guides the janitors from room to room in a coordinated fashion based on room schedules as well as sensed space occupancy and space use statistics. Thus, for example, as a simple rule, server 20 may detect when a space has not been cleaned between three consecutive meetings and may schedule the space for a cleaning after the third meeting has ended to make sure that each facility room is cleaned at least after every third meeting. As another simple rule, where a first space has not been cleaned between three consecutive meetings and a second space was cleaned just prior to a current meeting, server 20 may schedule cleaning of the first space prior to the second space at the end of the current meeting. As still another simple rule, server 20 may schedule cleanings of spaces that are used for longer meetings prior to scheduling cleanings for spaces that are used for shorter meetings. Many other cleaning scheduling rules are contemplated.

Figure 29:
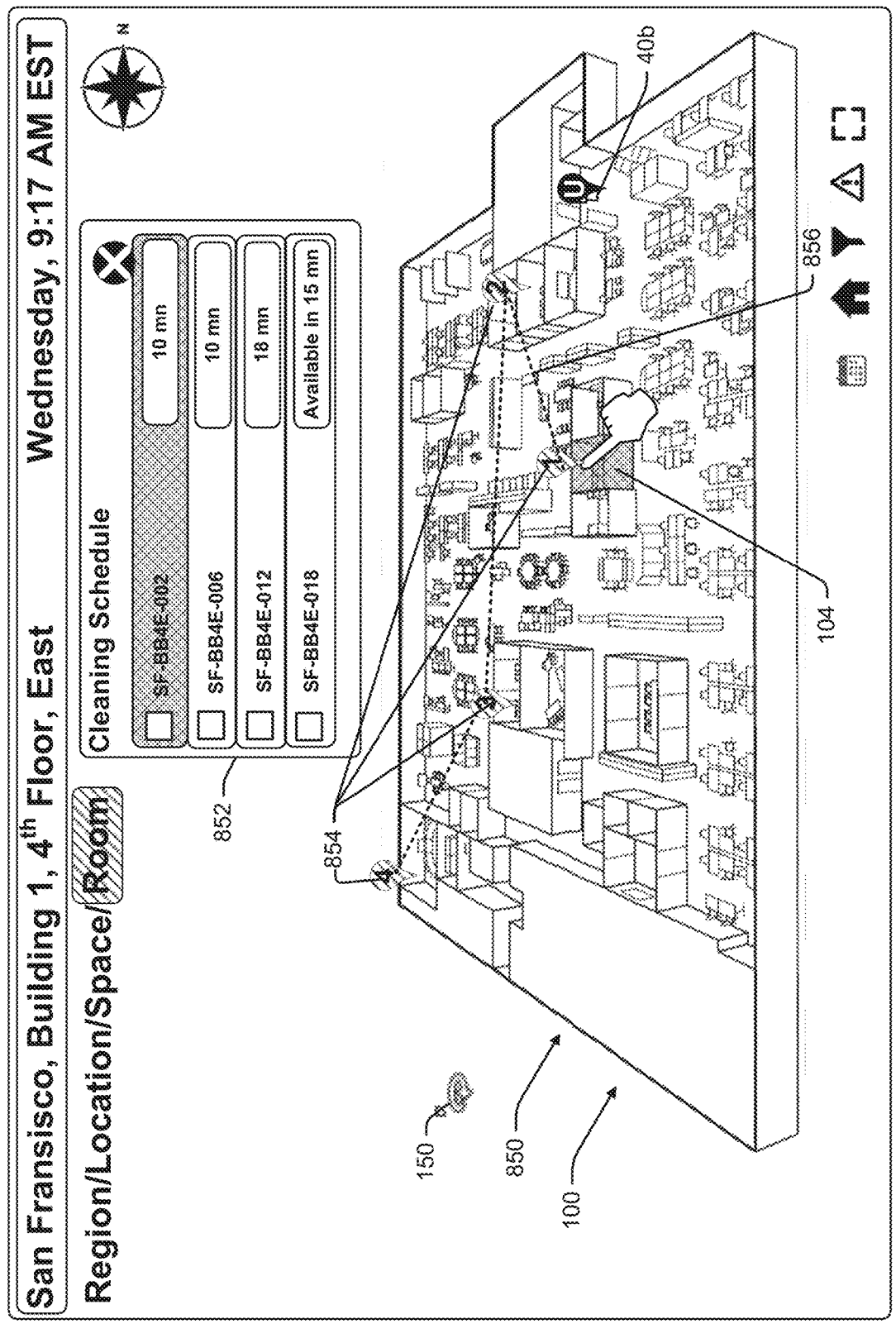
FIG. 29 is similar to FIG. 28, albeit showing a screen shot that may be presented to a facility janitor.

As in the case of the IR specialists view shown in FIG. 28, a special janitor's view may be generated by providing special overlays on top of VW representation 100. Referring to FIG. 29, an exemplary janitor's view 850 is illustrated that, again, shows a complete 3D representation 100 from an east facing perspective. Here, a cleaning request list is presented in window 852 that hovers above view 850 where an ordered list of cleaning requests is presented. A time prior to next scheduled space use is presented for each cleaning request indicating the start time of a next scheduled use for the room or space associated with the request. In the case of the last request listed, the room (e.g., SF-BB4E-018) is currently occupied and the time indication indicates a scheduled end time for the current activity in the room. The ordered list may be the result of server 20 applying a set of rules. Again, a path between rooms associated with requests is illustrated at 856 and consecutive jobs are numbered. There may be many more rooms that need cleaning but the system, in at least some cases, will limit the list of requests to a small number associated with rooms/spaces that should be cleaned as soon as possible.

While not shown, it should be appreciated that maintenance type views may be available for other types of facility employees. For instance, a facility manager responsible for ordering new furniture and other affordances may have an interface akin to the IT specialist's interface shown in FIG. 28 where furniture and other malfunctions or damage is reported and the manager uses space views to manage repair and/or replacement. Here, once a facility manager is identified, server 20 would automatically present a space view with overlays and other information to support the facility manager's space related tasks.

3. Space Designer Interfaces

Space use statistics are useful to space use designers when assessing which rooms and affordances are preferred by users so that the designers can modify or replace underperforming spaces to increase use and user satisfaction. In at least some embodiments it is contemplated that server 20 will be programmed to present special statistical space use views to space designers. To this end, see, for instance, FIG. 30 that shows a designers view 900 of VW representation 100 that indicates percent usage of different rooms within the facility space. Here, view 900 includes a percent usage tag for each represented facility space and relative usage can be ascertained in a glanceable fashion. In addition, rooms that are utilized less than 15% of the time are colored red while rooms used more than 50% of the time are colored green to give the designer some perspective on locations of underperforming spaces as well as spaces that perform well. The space usage statistics are gleaned from the use statistics record 67 (see again FIG. 3).

Figure 30:
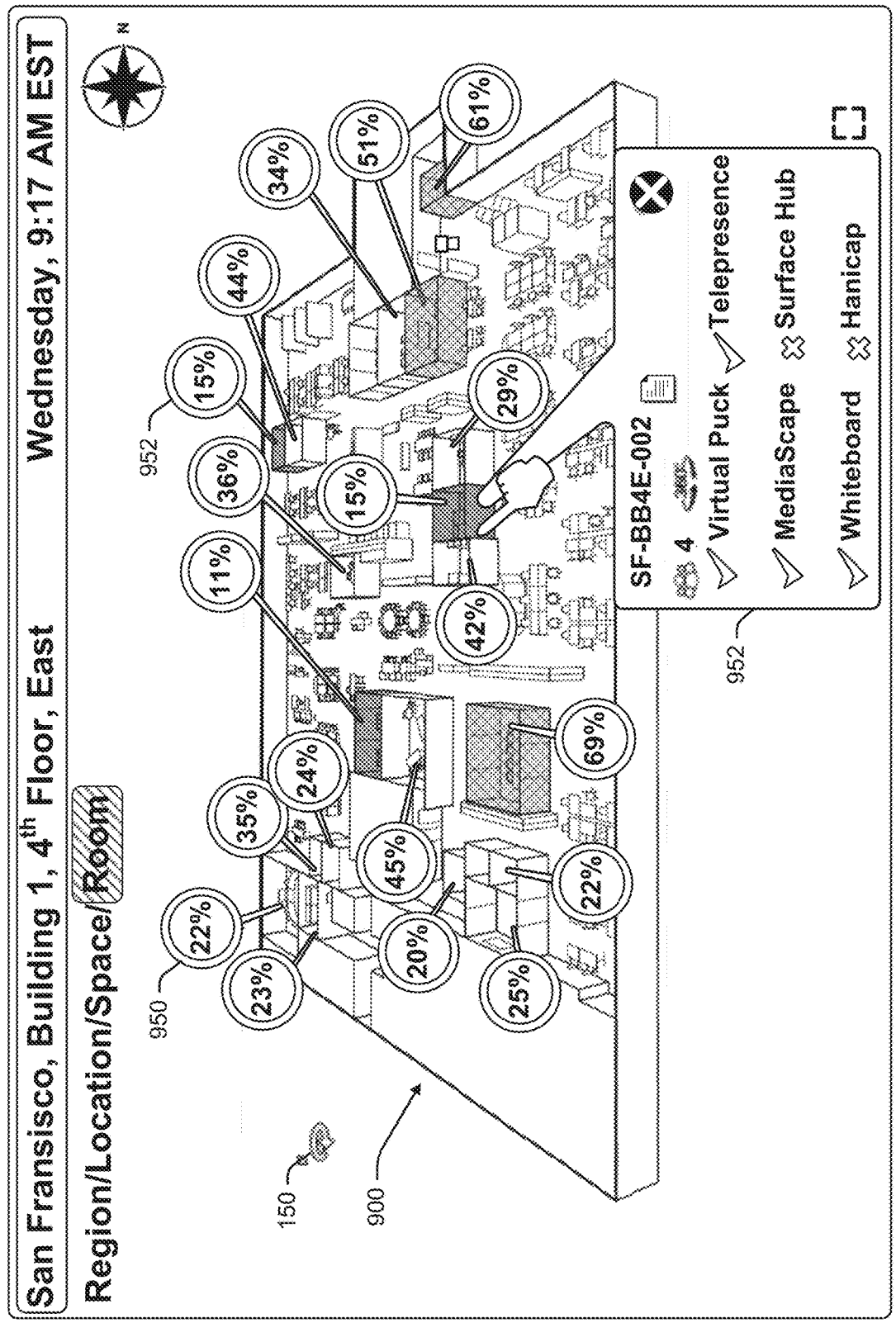
FIG. 30 is similar to FIG. 28, albeit showing a screen shot that may be presented to a space designer.

Icon 150 can be used to rotate view 900 and to change elevation. In addition, again, a user can zoom in on different portions of the larger view 900 and the percent use tags will remain associated with the different spaces. In this way, a designer can see percent use as well as visually and glanceably see different space characteristics and why one space may outperform other similar spaces in ways akin to a general space user looking at spaces and preferring one space to others in the VW representation/views described above. As shown in FIG. 30, the designer may select any room (e.g., tap the room representation on the kiosk display) to open a room attributes window 902 that indicates different attributes of the room selected. Again, percentage use tags in at least some embodiments are positioned on the view 900 so that none of the tags obscures observation of any of the conference or meeting spaces. In other cases, while not shown, all of the tags may be presented at locations that are outside the VW representation (e.g., above or below that representations) with thin fingers or lines connecting each tag with an associated space in the representation. For instance, see tags 950 and 952 that are located above the view 900. Here, when a user rotates the view 900 to a different perspective, the tags would likewise be repositioned so that none obscures observation of view 900.

Figure 31:
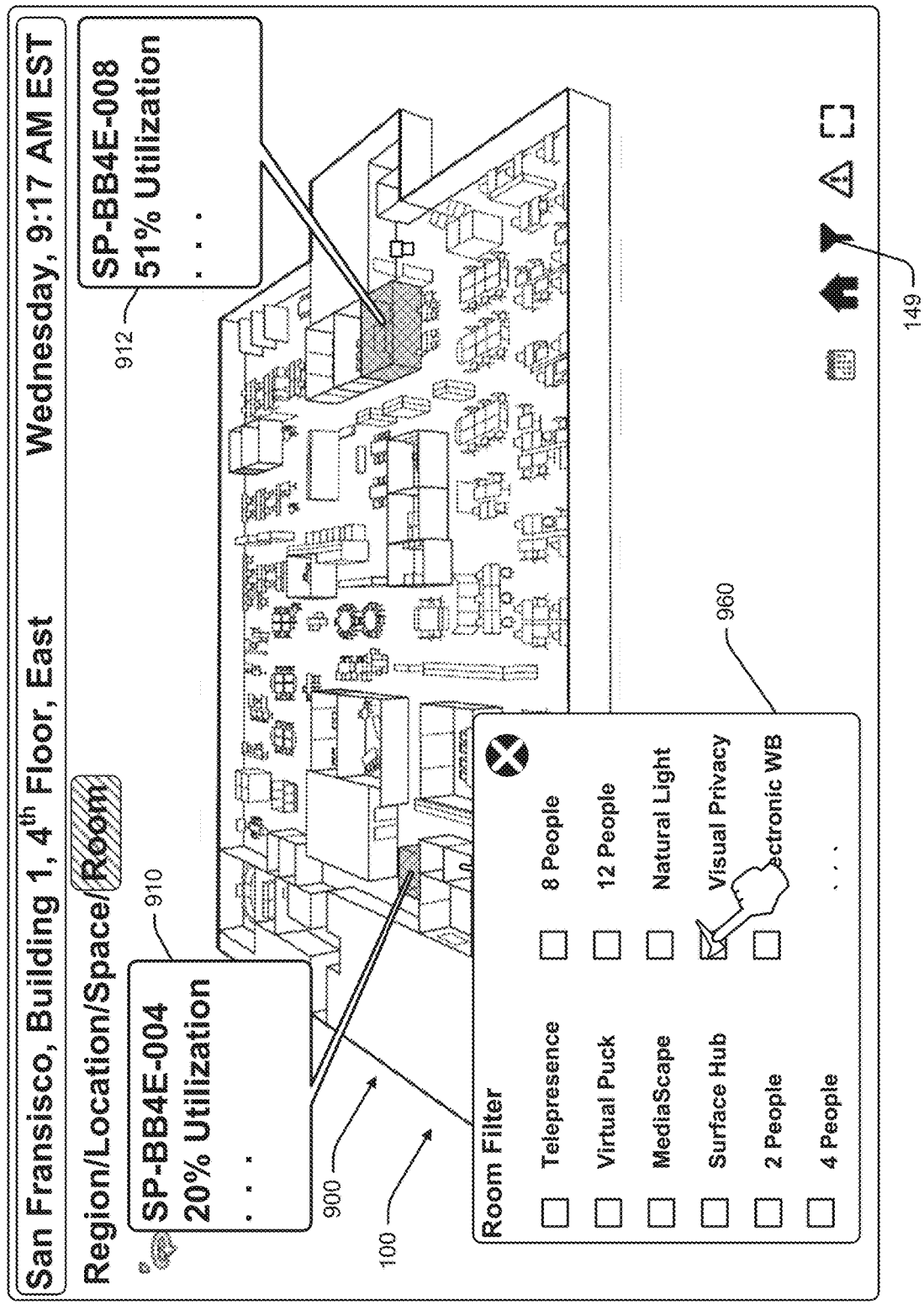
FIG. 31 is similar to FIG. 30, albeit showing a screen shot where a filter option has been applied to generate a subset of statistical information that is presented to a user.

In at least some cases, as seen in FIG. 31, filter icon 149 may be selected to open up a filter window 960 where a designer can select different attributes or sets of attributes causing server 20 to highlight rooms with those attributes and present room use statistics for each. In FIG. 31, visual privacy has been selected and server 20 identifies rooms in representation 100 that have visual privacy attributes, highlights representations of those rooms green and provides more detailed statistical tags 910, 912 for each of those rooms for user consideration. Other filter options or combinations may be selected by the user to change statistics viewed. In at least some cases server 20 may be able to present affordance use statistics for different affordances in different rooms.

While the invention may be susceptible to various modifications and alternative forms, specific embodiments have been shown by way of example in the drawings and have been described in detail herein. However, it should be understood that the invention is not intended to be limited to the particular forms disclosed. For example, while at least some general user interfaces described above indicate different room or space states with a limited number of color overlays or highlighting so that the interfaces are extremely intuitive to use and threshold interfaces likewise use a limited number of illumination colors to indicate states (e.g., green indicating available and red indicating not available), in other embodiments many other colors or other ways to visually distinguish may be used to indicate other space or room characteristics or states in other embodiments. For instance, another color or a blinking red color may indicate a room that is scheduled to be vacated within the next 10 minutes, another visual effect may indicate a room scheduled to be used for a meeting within 10 minutes, another visual effect may distinguish available and reservable rooms from available and non-reservable rooms, another visual effect may indicate locations of space users that are on a specific team or in a specific department, etc.

As another example, in at least some cases a default kiosk view may be the general space user views described above and other views like a designer's view, an IT specialist's view, a janitor's view, etc., only be provided automatically when a user of one of those types is detected adjacent the kiosk. In other cases, any user may be able to access any of the user type views via a selection tool presented on a kiosk display.

In some cases where a user selects a space for use that does not fit perceived requirements well, server 20 may be programmed to attempt to guide the user to select a different space. For instance, where a first user arrives at a kiosk for a meeting that is scheduled to include the first user and three other invitees and the user selects a 12 capacity room, the system may automatically request a confirmation that the user's selection was intended and may include an admonishment that the relatively large capacity room should be used for larger meetings with more attendees.

Referring again to FIG. 19, while threshold interface indicator illumination and guidance tags 504 may be similarly colored as part of a space guidance system, in other cases a common image may be provided as a background in a tag 504 and as a background image via the threshold interface display screen so that users that remember images well can use those common images as an additional guiding tool for finding space.

In some embodiments server 20 may route a user by a rest room and a refreshment room on her way to a room to use to enable the user to use those resources if desired. This is especially true in cases where a user is prescheduled for an activity in a space and arrives early for the prescheduled activity.

In some embodiments when a user is identified at a kiosk and server 20 uses user preferences to identify an optimized room or space or several rooms or spaces that meet the user's preferences, server 20 may automatically change the VW view to best show one, a subset of all of the identified spaces. Similarly, server 20 may automatically zoom in to an optimized view of a space or room for the user to see visually perceivable space and affordance features of preferred spaces or rooms.

Figure 32:
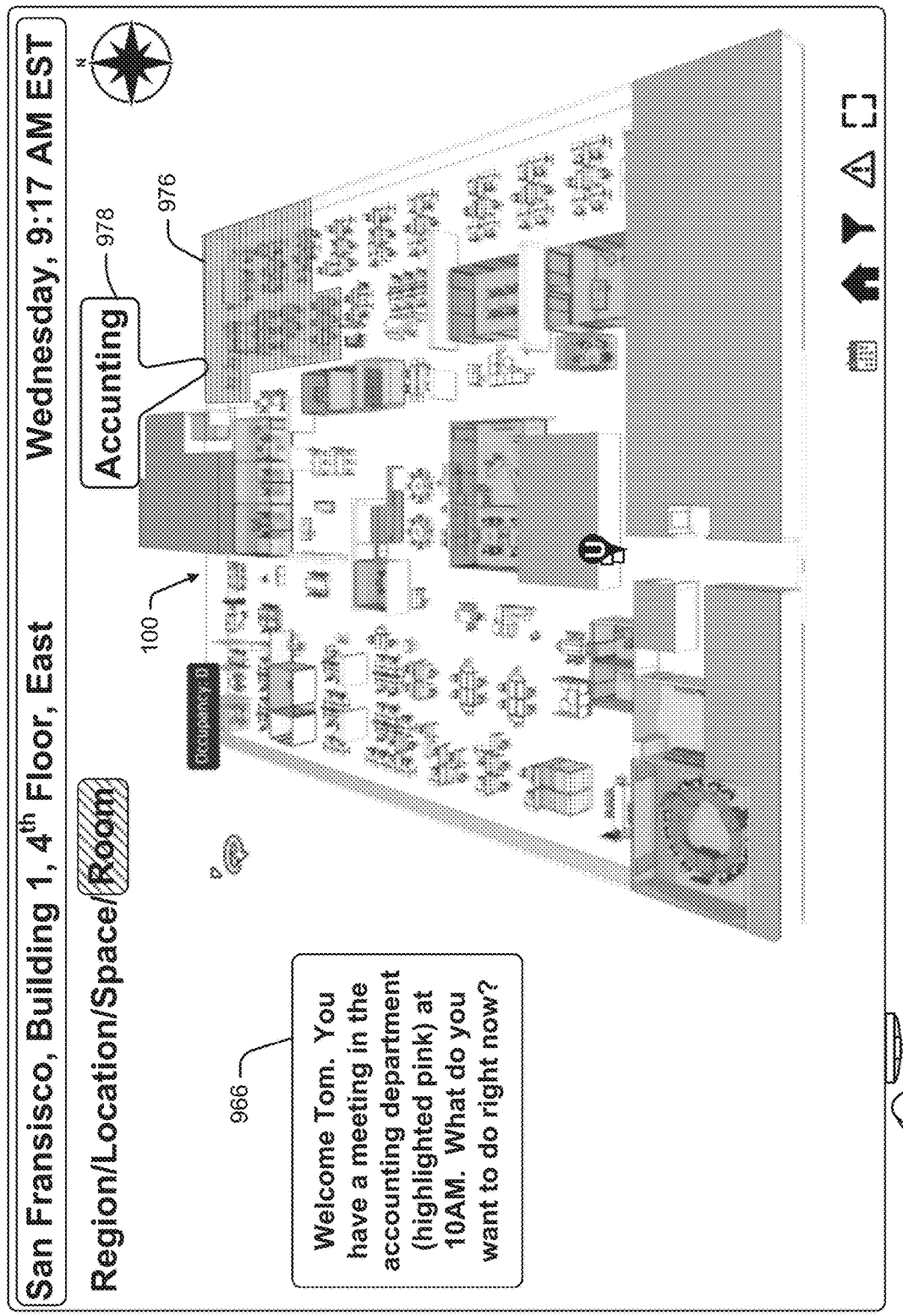
FIG. 32 is similar to FIG. 24, albeit showing a screen shot that automatically shows a user at an interface the location of an accounting department that may be of interest to the user.

In addition to indicating locations of occupied and unoccupied spaces as well as different environmental characteristics of spaces within a facility, the system may also be set up to present other way finding information based on locations of different groups of people or enterprise departments. For instance, the system may be set up to present information to a user on the location of a human resources department, a legal department, an accounting department, a specific team of people, etc. To this end, see, for example, FIG. 32 where it is assumed one of the disclosed systems recognizes that a specific user is located proximate one of the system kiosks. As shown, in this example the kiosk includes a speaker 960 and a microphone 962 as user interface devices. Here, after determining the user's identity, the system automatically determines the user has a next scheduled meeting in the accounting department at 10 AM. The system greets the user audibly and with a text message 966, "Welcome Tom. You have a meeting in the accounting department (highlighted pink) at 10 AM. What do you want to do right now?" In addition, the system overlays a pink highlight 976 (e.g., left to right hatching) on a portion of the representation associated with the accounting department and provides a tag 978 that calls out the accounting department on the representation. When the user verbally responds "I need to find the legal department", referring to FIG. 33, the system generates an audible and visual response 970 indicating "The legal department is highlighted yellow. Zoom into see available workstations", highlights the location of the legal department 972 and provides a tag 974 calling out the space associated with the legal department on the representation.

Figure 33:
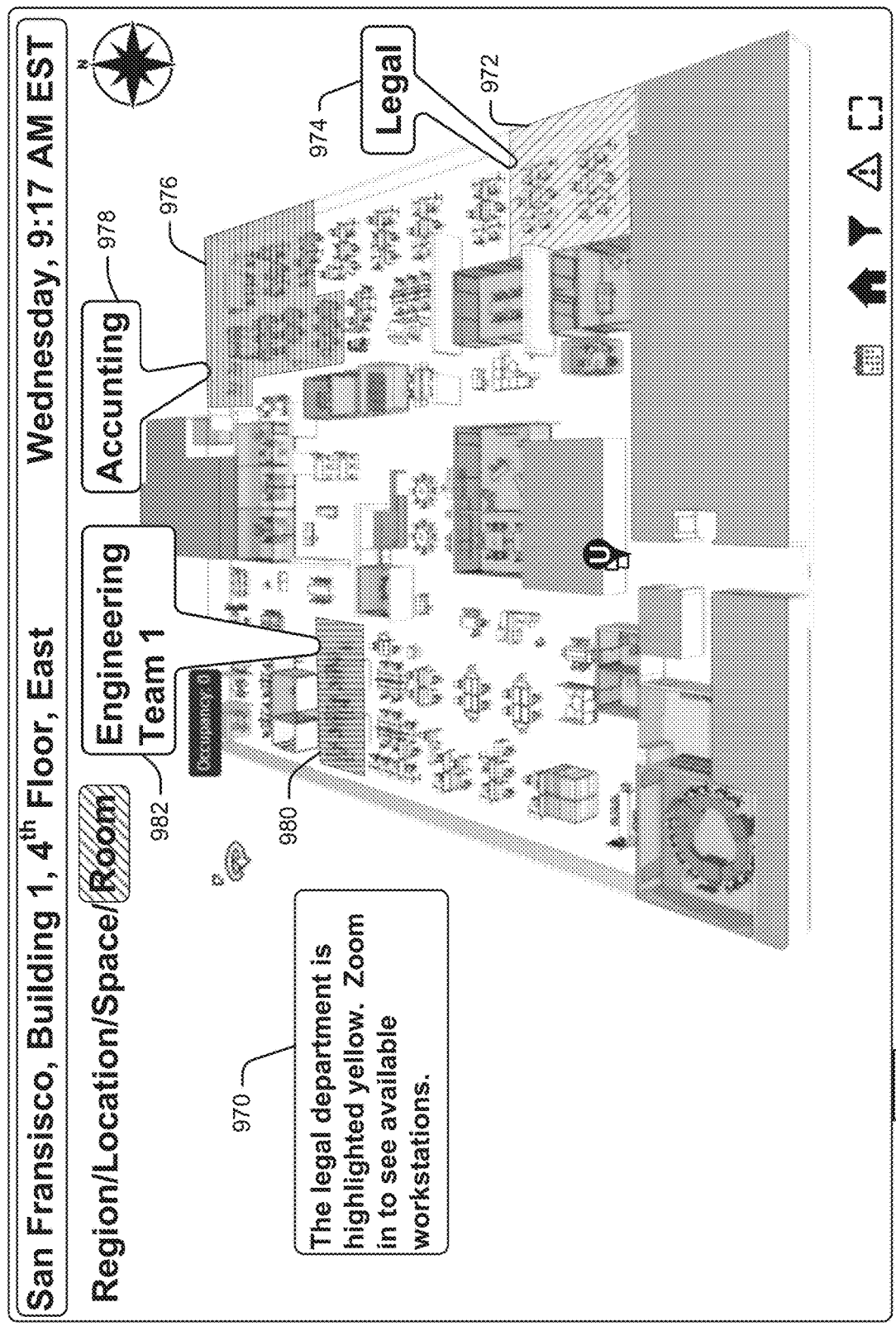
FIG. 33 is similar to FIG. 32, albeit showing another screen shot that indicates a facility area associated with a legal department as well as the area associated with an accounting department and a temporary area associated with an engineering team that is consistent with at least some aspects of the present disclosure.

Referring still to FIG. 33, in at least some cases a space designer will specify the locations of different enterprise departments, teams, etc., top drive views like the view shown. In at least some cases the system may automatically assess team or department locations if those locations are dynamic. For instance, assume an entire engineering team for a specific product is relocating to the fourth floor east space shown in FIG. 33. Here, the system may automatically identify workstations occupied by specific team members and then automatically define a facility space associated with the team to provide direction to any other team member arriving at one of the system kiosks or using some other way finding interface (e.g., a smart phone, tablet, laptop, etc.). For instance, in FIG. 33, a temporary Engineering Team 1 space is shown highlighted aqua (e.g., vertical cross hatched) to indicate an area in which most members of an Engineering Team 1 team are associated with workstations. An associated tag 982 calls out the team area.

Thus, the invention is to cover all modifications, equivalents, and alternatives falling within the spirit and scope of the invention as defined by the following appended claims. To apprise the public of the scope of this invention, the following claims are made:

What is claimed is:

1. A system for discovering space characteristics, the system comprising:
   a data store storing a facility information dataset corresponding to a physical world facility including physical world spaces, the facility information dataset including a 3D virtual world (VW) representation of the physical world facility, and a plurality of volume specifications, one volume specification for each of a plurality of volumetric portions of the 3D VW representation wherein each volumetric portion corresponds to a different one of the physical world spaces;
   an interface device including a display screen located within the physical world facility associated with the 3D VW representation;
   occupancy sensors within the physical world facility for detecting occupancy of the physical world spaces corresponding to the volumetric portions of the 3D VW representation;
   a processor linked to the interface device, the data store, and the occupancy sensors, the processor programmed to perform the steps of:
   accessing the 3D VW representation of the physical world facility;
   presenting a first view of the 3D VW representation via the display screen as a space discovery tool for a user to view;
   visually distinguishing volumetric portions of the 3D VW representation corresponding to physical world spaces that are currently unoccupied from volumetric portions of the 3D VW representation corresponding to physical world spaces that are currently occupied;

receiving user input via the interface device to change the first view of the 3D VW representation on the display screen; and changing the first view of the 3D VW representation on the display screen to a second view based on the received user input; and wherein the physical world spaces associated with the volumetric portions of the 3D VW representation can be scheduled and wherein the processor has access to scheduling information related to the physical world spaces and wherein the processor is programmed to further perform the steps of (i) identify an available unscheduled duration for at least a subset of the physical world spaces using the scheduling information and (ii) simultaneously present a time available tag for each of a plurality of the volumetric portions of the 3D VW representation that are associated with physical world spaces that are unoccupied on the display screen, each tag spatially associated with a different one of the volumetric portions and presenting an amount of time that the associated physical world space is available for use prior to a next scheduled use of the associated physical world space.

2. The system of claim 1 wherein the first view is from a first perspective angle and the second view is from a second perspective angle.

3. The system of claim 1 wherein the first view is from a first perspective elevation and the second view is from a second perspective elevation.

4. The system of claim 1 wherein the first view shows an entire view of the 3D VW representation and the second view shows a zoomed in view of a portion of the entire 3D VW representation.

5. A system for discovering space characteristics, the system comprising:

a data store storing a facility information dataset corresponding to a physical world facility that includes a plurality of physical world spaces, the facility information dataset including a 3D virtual world (VW) representation of the physical world facility that includes a separate volumetric portion for each physical world space and a separate volume specification for each of the volumetric portions;

an interface device including a display screen located within the physical world facility associated with the 3D VW representation;

occupancy sensors within the physical world facility for detecting occupancy of the physical world spaces;

a processor linked to the interface device, the data store, and the occupancy sensors, the processor programmed to perform the steps of:

accessing the 3D VW representation of the physical world facility;

presenting a first view of the 3D VW representation via the display screen as a space discovery tool for a user to view;

visually distinguishing volumetric portions of the 3D VW representation corresponding to physical world spaces that are currently occupied from portions of the 3D VW representation corresponding to physical world spaces that are unoccupied;

presenting a filter window via the display screen including a list of selectable attributes associated with the volumetric portions of the 3D VW representation that are preferred by a user;

receiving selection of at least a subset of the selectable attributes via the filter window;

identifying a set of the physical world spaces that are unoccupied and have the subset of selectable attributes; and for each volumetric portion of the 3D VW representation corresponding to a physical world space that is unoccupied and has the subset of selectable attributes, presenting a tag spatially associated with the volumetric portion on the 3D VW representation.

6. The system of claim 5 wherein the physical world facility information dataset includes a first set of attributes associated with a first volumetric portion of the 3D VW representation, the processor further programmed to receive an input selecting the first volumetric portion and in response to receiving the selection of the first volumetric portion, presenting at least a subset of the first set of attributes via the display screen.

7. The system of claim 5 wherein the processor visually distinguishes volumetric portions of the 3D VW representation corresponding to physical world spaces that are currently unoccupied in a first way and visually distinguishes volumetric portions of the 3D VW representation corresponding to physical world spaces that are currently occupied in a second way that is different than the first way.

8. The system of claim 7 wherein the first way is by overlaying a first color highlight and the second way is by overlaying a second color highlight.

9. The system of claim 5 wherein at least portions of the 3D VW representation are not included in the volumetric portions.

10. The system of claim 5 wherein physical world spaces associated with the volumetric portions of the 3D VW representation can be scheduled, wherein the processor has access to scheduling information related to those physical world spaces, and wherein the processor is programmed to identify an available unscheduled duration for each of those physical world spaces using the scheduling information.

11. The system of claim 10 wherein the processor is further programed to present a time available tag for at least a subset of the volumetric portions of the 3D VW representation that are associated with the physical world spaces that are unoccupied on the display screen, each tag spatially associated with a different one of the volumetric portions.

12. The system of claim 5 wherein each of at least a subset of the volumetric portions corresponds to a separate conference room within the physical world facility.

13. The system of claim 5 wherein each tag includes a selectable schedule icon which, when selected, facilitates scheduling of the facility physical world space associated with the volumetric portion of the 3D VW representation associated with the tag that includes the selected icon.

14. The system of claim 5 wherein the 3D VW representation includes a plurality of 3D parametric representations of affordances located within the physical world facility associated with the 3D VW representation.

15. A system for discovering space characteristics, the system comprising:

a data store storing a facility information dataset corresponding to a physical world facility that includes a plurality of physical world spaces, the facility information dataset including a 3D virtual world (VW) representation of the physical world facility that includes a separate volumetric portion for each physical world space and a separate volume specification for each of the volumetric portions, wherein each of the physical world spaces can be scheduled;

an interface device including a display screen located within the physical world facility associated with the 3D VW representation;

occupancy sensors within the physical world facility for detecting occupancy of the physical world spaces;

a processor linked to the interface device, the data store, and the occupancy sensors, the processor having access to scheduling information related to the physical world spaces and programmed to perform the steps of:

accessing the 3D VW representation of the physical world facility;

presenting a view of the 3D VW representation via the display screen as a space discovery tool for a user to view;

identifying an available unscheduled duration for at least a subset of the physical world spaces using the scheduling information; and simultaneously presenting a time available tag for each of a plurality of the volumetric portions of the 3D VW representation that are associated with physical world spaces that are available for use on the display screen, each tag spatially associated with a different one of the volumetric portions and presenting an amount of time that the associated physical world space is available for use prior to a next scheduled use of the associated physical world space.

16. The system of claim 15 wherein each tag includes a schedule icon which is selectable by a user, the processor further programmed to, upon selection of one of the schedule icons, automatically schedule the physical world space associated with the selected tag for use by a user.

17. The system of claim 15 wherein the processor is further programmed to detect user presence within the physical world spaces and visually distinguish volumetric portions of the 3D VW representation that are associated with physical world spaces that are occupied from portions of the 3D VW representation that are associated with physical world spaces that are unoccupied.

18. The system of claim 17 wherein the portions of the 3D VW representation that are associated with physical world spaces that are occupied are visually distinguished via a first color shading and the portions of the 3D VW representation that are associated with physical world spaces that are unoccupied are visually distinguished via a second color shading.

19. The system of claim 15 wherein a database stores characteristics of the physical world spaces associated with each of the volumetric portions of each of the 3D VW representation, the processor further programmed to, upon selection of one of the volumetric portions, accessing the stored characteristics of the physical world space associated with the selected volumetric portions and presenting the stored characteristics via the interface device within a sub-window adjacent the selected volumetric portion.

20. The system of claim 19 wherein the characteristics include a list of affordances associated with each of the physical world spaces.

* * * * *